(12) United States Patent
Tanaka et al.

(10) Patent No.: US 7,594,099 B2
(45) Date of Patent: Sep. 22, 2009

(54) PROCESSOR EXECUTING SIMD INSTRUCTIONS

(75) Inventors: Tetsuya Tanaka, Soraku-gun (JP);
Hazuki Okabayashi, Hirakata (JP);
Taketo Heishi, Osaka (JP); Hajime Ogawa, Suita (JP); Tsuneyuki Suzuki, Takatsuki (JP); Tokuzo Kiyohara, Osaka (JP); Takeshi Tanaka, Neyagawa (JP); Hideshi Nishida, Nishinomiya (JP); Masaki Maeda, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 11/896,368

(22) Filed: Aug. 31, 2007

(65) Prior Publication Data

US 2008/0046687 A1 Feb. 21, 2008

Related U.S. Application Data

(62) Division of application No. 10/668,358, filed on Sep. 24, 2003, now Pat. No. 7,281,117.

(30) Foreign Application Priority Data

Sep. 25, 2002 (JP) ............................. 2002-280077

(51) Int. Cl.
*G06F 9/305* (2006.01)
(52) U.S. Cl. ..................................... 712/223
(58) Field of Classification Search ................. 712/223
See application file for complete search history.

(56) References Cited

U.S. PATENT DOCUMENTS

| 5,036,454 A | 7/1991 | Rau et al. |
| 5,303,355 A | 4/1994 | Gergen et al. |
| 5,590,352 A | 12/1996 | Zuraski, Jr. et al. |
| 5,793,658 A * | 8/1998 | Adiletta ...................... 708/402 |

(Continued)

FOREIGN PATENT DOCUMENTS

| EP | 0 679 991 | 11/1995 |
| JP | 62-156742 | 7/1987 |
| JP | 07-295811 | 11/1995 |
| JP | 10-055274 | 2/1998 |
| JP | 10-512988 | 12/1998 |

(Continued)

OTHER PUBLICATIONS

Patterson, David. Hennessy, John. "Computer Architecture: A Quantitative Approach". Morgan-Kaufmann Publishers, Second Edition, 1996, pp. 127-130, Appendices B3-B7 and C1-C5.

(Continued)

*Primary Examiner*—Eddie P Chan
*Assistant Examiner*—Robert E Fennema
(74) *Attorney, Agent, or Firm*—Wenderoth, Lind & Ponack, L.L.P.

(57) ABSTRACT

A processor according to the present invention includes a decoding unit 20, an operation unit 40 and others. When the decoding unit 20 decodes Instruction vcchk, the operation unit 40 and the like judges whether vector condition flags VC0~VC3 (110) of a condition flag register (CFR) 32 are all zero or not, and (i) sets condition flags C4 and C5 of the condition flag register (CFR) 32 to 1 and 0, respectively, when all of the vector condition flags VC0~VC3 are zero, and (ii) sets the condition flags C4 and C5 to 0 and 1, respectively, when not all the vector condition flags are zero. Then, the vector condition flags VC0~VC3 are stored in the condition flags C0~C3.

2 Claims, 71 Drawing Sheets

```
          Binary   Decimal
          ┌──┴──┐  ┌─┴─┐
    Ra : 0 0 . 1 0 0 0  (+0.5)

Rb :       1 1 1   ⎫ Absolute
                       ⎬ value
    +              1   ⎭
         ─────────────────
    Rc : 0 1 . 0 0 0 0  (+1)
         (To be masked)
```

(a)   When Ra ≧ 0

U.S. PATENT DOCUMENTS

| | | | |
|---|---|---|---|
| 5,915,109 | A | 6/1999 | Nakakimura et al. |
| 6,260,137 | B1 | 7/2001 | Fleck et al. |
| 6,829,696 | B1 | 12/2004 | Balmer et al. |
| 6,904,510 | B1 | 6/2005 | Sijstermans |
| 7,124,160 | B2 * | 10/2006 | Saulsbury et al. ........... 708/490 |
| 2001/0016898 | A1 | 8/2001 | Ito et al. |
| 2003/0097389 | A1 | 5/2003 | Saulsbury et al. |
| 2003/0158881 | A1 | 8/2003 | Liao et al. |

FOREIGN PATENT DOCUMENTS

| | | |
|---|---|---|
| JP | 2000-020486 | 1/2000 |
| JP | 2000-047998 | 2/2000 |
| JP | 2001-516916 | 10/2001 |
| JP | 2002-527812 | 8/2002 |
| WO | 97/09679 | 3/1997 |
| WO | 99/14663 | 3/1999 |
| WO | 00/22511 | 4/2000 |

OTHER PUBLICATIONS

Probin, Robert. Ball, Stuart. "Introduction to AltiVec Assembly Language". Mar. 1, 1999, p. 1-19.
Office Action issued Dec. 22, 2008 in U.S. Appl. No. 11/896,369.
Office Action issued Oct. 15, 2008 in U.S. Appl. No. 11/896,371.
Office Action issued May 30, 2008 in U.S. Appl. No. 11/896,370.
Craig Hansen, "Architecture of a Broadband Mediaprocessor", pp. 334-340, Feb. 25, 1996.

* cited by examiner

Fig. 11

| Bit | 31 | 30 | 29 | 28 | 27 | 26 | 25 | 24 |
|---|---|---|---|---|---|---|---|---|
| Bit name | reserved | SWE | FXP | reserved | IH | EH | PL | PL |
| Bit | 23 | 22 | 21 | 20 | 19 | 18 | 17 | 16 |
| Bit name | FIE3 | FIE2 | FIE1 | FIE0 | reserved | reserved | AEE | IE |
| Bit | 15 | 14 | 13 | 12 | 11 | 10 | 9 | 8 |
| Bit name | Reserved | | | | | | | |
| Bit | 7 | 6 | 5 | 4 | 3 | 2 | 1 | 0 |
| Bit name | IM[7:0] | | | | | | | |

Fig. 12

| Bit | 31 | 30 | 29 | 28 | 27 | 26 | 25 | 24 |
|---|---|---|---|---|---|---|---|---|
| Bit name | ALN | ALN | reserved | reserved | BPO | BPO | BPO | BPO |
| Bit | 23 | 22 | 21 | 20 | 19 | 18 | 17 | 16 |
| Bit name | reserved | reserved | reserved | reserved | VC3 | VC2 | VC1 | VC0 |
| Bit | 15 | 14 | 13 | 12 | 11 | 10 | 9 | 8 |
| Bit name | reserved | reserved | reserved | reserved | reserved | reserved | OVS | CAS |
| Bit | 7 | 6 | 5 | 4 | 3 | 2 | 1 | 0 |
| Bit name | C7 | C6 | C5 | C4 | C3 | C2 | C1 | C0 |

32

Fig. 13A
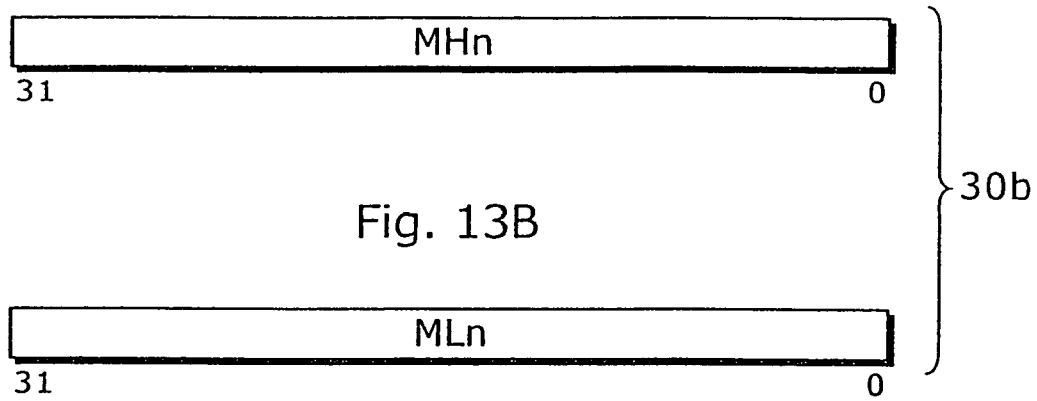
Fig. 13B
Fig. 14
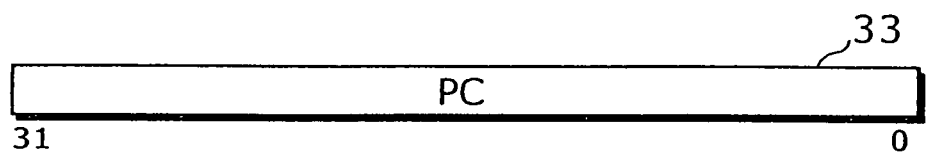
Fig. 15
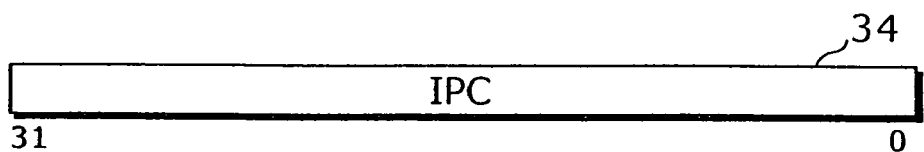
Fig. 16
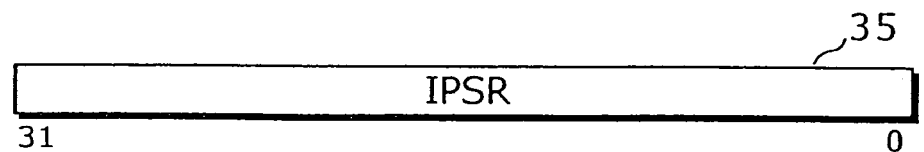

Fig. 21

| Category | SIMD | Size | Instruction | Operand | CFR | PSR | Typical behavior | Operation unit | 31:16 |
|---|---|---|---|---|---|---|---|---|---|
| ALU add system | SINGLE | Word | add | Rc, Ra, Rb | | | | | 32 |
| | | | | Rb, Ra, i12s | | | | | |
| | | | | SP, i19s | | | | | |
| | | | | Ra2, Rb2 | | | | | 16 |
| | | | | Rc3, Ra3, Rb3 | | | | | |
| | | | | Ra2, i05s | | | | | |
| | | | | SP, i11s | | | | | |
| | | | addu | Rb, GP, i16u | | | | | 32 |
| | | | | Rb, SP, i16u | | | | | |
| | | | | Ra3, SP, i08u | | | | | 16 |
| | | | addc | Rc, Ra, Rb | W:cas, c0:c1 | | Addition with carry | | |
| | | | addvw | Rc, Ra, Rb | W:ovs | | Addition with overflow | | |
| | | | adds | Rc, Ra, Rb | | | Ra + Rb → >>1 Rc | | 32 |
| | | | addsr | Rc, Ra, Rb | | | Ra + Rb + 1 → >>1 Rc | | |
| | | | s1add | Rc, Ra, Rb | | | Ra + >>1 Rb → Rc | | 16 |
| | | | | Rc3, Ra3, Rb3 | | | | | 32 |
| | | | s2add | Rc, Ra, Rb | | | (>>2) | | 16 |
| | | | | Rc3, Ra3, Rb3 | | | | | |
| | | | addmsk | Rc, Ra, Rb | R:BP0 | | Ra [CFR.BP0] + Rb → Rc | | |
| | | | addarvw | Rc, Ra, Rb | | | | | |
| | | Half word | faddvh | Rc, Ra, Rb | W:ovs | | | | |
| | SIMD | Half word | vaddh | Rc, Ra, Rb | | | Ra[16|16] + Rb[16|16] → [16|16] Rc | A | 32 |
| | | | vaddhvh | Rc, Ra, Rb | W:ovs | | | | |
| | | | vsaddh | Rb, Ra, i08s | | | [16|16] +Immediate+Immediate value value → [16|16] Rb | | |
| | | | vaddsh | Rc, Ra, Rb | | | Ra[16|16] + Rb[16|16] → >>1 >>1 [16|16] Rc | | |
| | | | vaddsrh | Rc, Ra, Rb | | | (+ 1) (+ 1) (With rounding) | | |
| | | | vaddhvc | Rc, Ra, Rb | R:VC | | | | |
| | | | vaddrhvc | Rc, Ra, Rb | | | | | |
| | | | vxaddh | Rc, Ra, Rb | | | Ra[16×16] + Rb[16|16] → [16|16] Rc | | |
| | | | vxaddhvh | Rc, Ra, Rb | W:ovs | | | | |
| | | | vhaddh | Rc, Ra, Rb | | | Ra[16|16] + Rb[16] → [16|16] Rc | | |
| | | | vhaddhvh | Rc, Ra, Rb | W:ovs | | | | |
| | | | vladdh | Rc, Ra, Rb | | | Ra[16|16] + Rb[16] → [16|16] Rc | | |
| | | | vladdhvh | Rc, Ra, Rb | W:ovs | | | | |
| | | Byte | vaddb | Rc, Ra, Rb | | | Ra[8|8|8|8] + Rb[8|8|8|8] → [8|8|8|8] Rc | | |
| | | | vsaddb | Rb, Ra, i08s | | | (Immediate value) | | |
| | | | vaddsb | Rc, Ra, Rb | | | Ra[8|8|8|8] + Rb[8|8|8|8] → >>1 >>1 [8|8|8|8] Rc | | |
| | | | vaddsrb | Rc, Ra, Rb | | | (+ 1)(+ 1)(+ 1)(+ 1) >>1 >>1 (With rounding) | | |

Fig. 22

| Category | SIMD Size | | Instruction | Operand | CFR | PSR | Typical behavior | Operation unit |
|---|---|---|---|---|---|---|---|---|
| ALU sub system | SINGLE | Word | sub | Rc, Rb, Ra Rb2, Ra2 Rc3, Rb3, Ra3 | | | | 31 16 / 32 16 |
| | | | rsub | Rb, Ra, i08s Ra2, Rb2 Ra2, i04s | | | Immediate value – Ra → Rb ( Rb2 ) | 32 16 |
| | | | subc | Rc, Rb, Ra | W:cas,c0:c1 | | With carry | |
| | | | subvw | Rc, Rb, Ra | W:ovs | | With overflow | |
| | | | subs | Rc, Rb, Ra | | | Ra – Rb → Rc | |
| | | | submsk | Rc, Rb, Ra | R:BP0 | | Ra / Rb / CFR.BP0 → Rc | |
| | | Half word | fsubvh | Rc, Rb, Ra | | | | |
| | SIMD | | vsubh | Rc, Rb, Ra | | | Ra 16 / Rb 16 → Rc 16 | A |
| | | | vsubhvh | Rc, Rb, Ra | W:ovs | | | |
| | | | vsrsubh | Rb, Ra, i08s | | | Immediate value – 16 / Ra 16 → Rb 16 | |
| | | | vsubsh | Rc, Rb, Ra | | | Ra 16 / Rb 16 → Rc 16 | |
| | | | vxsubh | Rc, Rb, Ra | | | Ra 16 / Rb 16 (crossed) → Rc 16 | |
| | | | vxsubhvh | Rc, Rb, Ra | W:ovs | | | |
| | | | vhsubh | Rc, Rb, Ra | | | Ra 16 / Rb 16 → Rc 16 | |
| | | | vhsubhvh | Rc, Rb, Ra | W:ovs | | | |
| | | | vlsubh | Rc, Rb, Ra | | | Ra 16 / Rb 16 → Rb | |
| | | | vlsubhvh | Rc, Rb, Ra | W:ovs | | | |
| | | Byte | vsubb | Rc, Rb, Ra | | | (Immediate value) Ra 8 8 8 8 / Rb 8 8 8 8 → Rc 8 8 8 8 | |
| | | | vsrsubb | Rb, Ra, i08s | | | | |
| | | | vasubb | Rc, Rb, Ra | R:VC | | | |

Fig. 23

| Category | SIMD | Size | Instruction | Operand | CFR | PSR | Typical behavior | Operation unit | 31 16 |
|---|---|---|---|---|---|---|---|---|---|
| ALU logic system | SINGLE | Word | and | Rc, Ra, Rb | | | AND | A | 32 |
| | | | | Rb, Ra, i08u | | | | | |
| | | | | Ra2, Rb2 | | | | | 16 |
| | | | andn | Rc, Ra, Rb | | | | | 32 |
| | | | | Rb, Ra, i08u | | | | | |
| | | | | Ra2, Rb2 | | | | | 16 |
| | | | or | Rc, Ra, Rb | | | OR | | 32 |
| | | | | Rb, Ra, i08u | | | | | |
| | | | | Ra2, Rb2 | | | | | 16 |
| | | | xor | Rc, Ra, Rb | | | Exclusive OR | | 32 |
| | | | | Rb, Ra, i08u | | | | | |
| | | | | Ra2, Rb2 | | | | | 16 |
| ALU mov system | SINGLE | Word | mov | Rb, Reg32 | | | Reg32 = TAR LR SVR PSR CFR MH0 MH1 ML0 ML1 EPSR IPC IPSR PC EPC PSR0 PSR1 PSR2 PSR3 CFR0 CFR1 CFR2 CFR3 | A | 32 |
| | | | | Reg32, Rb | | | | | |
| | | | | Rb2, Reg16 | | | Reg16 = TAR LR MH0 MH1 | | 16 |
| | | | | Reg16, Rb2 | | | | | |
| | | | | Ra2, Rb | | | | | 32 |
| | | | | Ra, i16s | | | | | 16 |
| | | | | Ra2, i08s | | | | | |
| | | | movp | Rc:Rc+1, Ra, Rb | | | Rc<-Ra;   Rc+1<-Rb; | | 32 |
| | | | movcf | Ck, Cj, Cm, Cn | | | Ci<-Cj;   Cm<-Cn; | | |
| | | | mvclovs | Cm:Cm+1 | W:ovs | | Cm:Cm+1<-CFR.OVS; ~CFR.OVS;   CFR.OVS<-0; | | 16 |
| | | | mvclcas | Cm:Cm+1 | W:cas | | Cm:Cm+1<-CFR.CAS; ~CFR.CAS;   CFR.CAS<-0; | | |
| | | | sethi | Ra, i16s | | | | | 32 |
| ALU max min system | SINGLE | Word | max | Rc, Ra, Rb | W:c0:c1 | | Rc <- max(Ra, Rb) | A | 32 |
| | | | min | Rc, Ra, Rb | W:c0:c1 | | Rc <- min(Ra, Rb) | | |
| | SIMD | Half word | vmaxh | Rc, Ra, Rb | | | | | |
| | | | vminh | Rc, Ra, Rb | | | | | |
| | | Byte | vmaxb | Rc, Ra, Rb | | | | | |
| | | | vminb | Rc, Ra, Rb | | | | | |
| ALU abs system | SINGLE | | abs | Rb, Ra | | | Absolute value | A | 32 |
| | | | absvw | Rb, Ra | W:ovs | | With overflow | | |
| | | | fabsvh | Rb, Ra | W:ovs | | | | |
| | SIMD | Half word | vabshvh | Rb, Ra | W:ovs | | | | |
| ALU neg system | SIN GLE | Word | negvw | Rb, Ra | W:ovs | | | A | 32 |
| | | Half word | fnegvh | Rb, Ra | W:ovs | | | | |
| | SIMD | | vneghvh | Rb, Ra | W:ovs | | | | |
| ALU sum system | SIMD | Half word | vsumh | Rb, Ra | | | Ra [16][16] -> Rb  (+) | A | 32 |
| | | | vsumh2 | Rb, Ra | | | Ra [8][8][8][8] -> [16][16] Rb  (+)(+) | | |
| | | | vsumrh2 | Rb, Ra | | | (Rounding) | | |
| | | Byte | vabssumb | Rc, Ra, Rb | | | | C | |
| ALU other | SIN GLE | | frndvh | Rb, Ra | W:ovs | | Rounding | C | |
| | SIMD | | vfrndvh | Rb, Mn | W:ovs | | | | 32 |
| | | | vsel | Rc, Ra, Rb | R:VC | | | A | |
| | | | vsgnh | Rb, Ra | | | | C | |

Fig. 24

| Category | SIMD Size | Instruction | Operand | CFR | PSR | Typical behavior | Operation unit |
|---|---|---|---|---|---|---|---|
| CMP | SINGLE | cmpCCn | Cm, Ra, Rb, Cn<br>Cm, Ra, i05s, Cn<br>Cm:Cm+1, Ra, Rb, Cn<br>Cm:Cm+1, Ra, i05s, Cn | W:CF | | CC = eq, ne, gt, ge, gtu, geu, le, lt, leu, leu<br>Cm <- result & Cn;<br>(Cm+1 <- ~result & Cn;) | 31 16 |
| | | cmpCCa | Cm:Cm+1, Ra, Rb, Cn<br>Cm:Cm+1, Ra, i05s, Cn | W:CF | | Cm <- result & Cn;<br>Cm+1 <- ~(result & Cn); | 32 |
| | | cmpCCo | Cm:Cm+1, Ra, Rb, Cn<br>Cm:Cm+1, Ra, i05s, Cn | W:CF | | Cm <- result | Cn;<br>Cm+1 <- ~(result | Cn); | 16 |
| | | cmpCC | C6, Ra2, Rb2<br>C6, Ra2, i04s | W:CF | | CC = eq, ne, gt, ge, le, lt<br>C6 <- result | |
| | | tstzn | Cm, Ra, Rb, Cn<br>Cm, Ra, i05u, Cn<br>Cm:Cm+1, Ra, Rb, Cn<br>Cm:Cm+1, Ra, i05u, Cn | W:CF | | Cm <- (Ra & Rb == 0) & Cn;<br>(Cm+1 <- ~(Ra & Rb ==0) & Cn;) | 32 |
| | | tstza | Cm:Cm+1, Ra, Rb, Cn<br>Cm:Cm+1, Ra, i05u, Cn | W:CF | | Cm <- (Ra & Rb == 0) & Cn;<br>Cm+1 <- ~((Ra & Rb == 0) & Cn); | A |
| | | tstzo | Cm:Cm+1, Ra, Rb, Cn<br>Cm:Cm+1, Ra, i05u, Cn | W:CF | | Cm <- (Ra & Rb == 0) | Cn;<br>Cm+1 <- ~((Ra & Rb == 0) | Cn); | |
| | | tstnn | Cm, Ra, Rb, Cn<br>Cm, Ra, i05u, Cn<br>Cm:Cm+1, Ra, Rb, Cn<br>Cm:Cm+1, Ra, i05u, Cn | W:CF | | Cm <- (Ra & Rb != 0) & Cn;<br>(Cm+1 <- ~(Ra & Rb !=0) & Cn;) | |
| | | tstna | Cm:Cm+1, Ra, Rb, Cn<br>Cm:Cm+1, Ra, i05u, Cn | W:CF | | Cm <- (Ra & Rb != 0) & Cn;<br>Cm+1 <- ~((Ra & Rb != 0) & Cn); | |
| | | tstno | Cm:Cm+1, Ra, Rb, Cn<br>Cm:Cm+1, Ra, i05u, Cn | W:CF | | Cm <- (Ra & Rb != 0) | Cn;<br>Cm+1 <- ~((Ra & Rb != 0) | Cn); | |
| | | tstz | C6, Ra2, Rb2<br>C6, Ra2, i04u | W:CF | | C6 <- (Ra2&Rb2 == 0) | 16 |
| | | tstn | C6, Ra2, Rb2<br>C6, Ra2, i04u | W:CF | | C6 <- (Ra2&Rb2 != 0) | 32 |
| | SIMD Half word | vcmpCCh<br>vscmpCCh | Ra, Rb<br>Ra, i05s | W:CF | | CC = eq, ne, gt, le, ge, lt | |
| | Byte | vcmpCCb<br>vscmpCCb | Ra, Rb<br>Ra, i05s | W:CF | | CC = eq, ne, gt, le ge, lt | |

Fig. 25

| Category | SIMD | Size | Instruction | Operand | CFR | PSR | Typical behavior | Operation unit | 31 16 |
|---|---|---|---|---|---|---|---|---|---|
| mul system | SINGLE | Word×Word | mul | Mm, Rc, Ra, Rb<br>Mm, Rb, Ra, i08s | | | Ra × Rb (Immediate value) → MHm MLm Rc | X2 | |
| | | | mulu | Mm, Rc, Ra, Rb<br>Mm, Rb, Ra, i08s | | | Unsigned multiplication | | |
| | | | fmulww | Mm, Rc, Ra, Rb | | fxp | Fixed point operation | | |
| | | Word× Half word | hmul | Mm, Rc, Ra, Rb | | | Ra × Rb 16 → MHm MLm Rc | | |
| | | | lmul | Mm, Rc, Ra, Rb | | | ( 16 ) | | |
| | | | fmulhww | Mm, Rc, Ra, Rb | | fxp | Ra × Rb 16 → MHm MLm 16 16 Rc | X1 | |
| | | Half word× Half word | fmulhw | Mm, Rc, Ra, Rb | | fxp | Ra 16 × Rb 16 → MHm MLm Rc | | |
| | | | fmulhh | Mm, Rc, Ra, Rb | | fxp | Ra 16 × Rb 16 → MHm MLm 16 16 Rc | | |
| | | | fmulhhr | Mm, Rc, Ra, Rb | | fxp | With rounding | | |
| | SIMD | HALF WORD × HALF WORD | vmul | Mm, Rc, Ra, Rb | | | Ra 16 16 (1)× ×(2) Rb 16 16 → MHm MLm (1)(2)(1)(2) Rc (1)(2) | | 32 |
| | | | vfmulw | Mm, Rc, Ra, Rb | | fxp | Ra 16 16 (1)× ×(2) Rb 16 16 → MHm MLm (1)(2)(1)(2) Rc (1) | | |
| | | | vfmulh | Mm, Rc, Ra, Rb | | fxp | Ra 16 16 (1)× ×(2) Rb 16 16 → MHm MLm (1)(2)(1)(2) Rc (1)(2) | | |
| | | | vfmulhr | Mm, Rc, Ra, Rb | | fxp | With rounding | | |
| | | | vxmul | Mm, Rc, Ra, Rb | | | Ra 16 16 (1)× ×(2) Rb 16 16 → MHm MLm (1)(2)(1)(2) Rc (1)(2) | | |
| | | | vxfmulw | Mm, Rc, Ra, Rb | | fxp | Ra 16 16 (1)× ×(2) Rb 16 16 → MHm MLm (1)(2)(1)(2) Rc (1) | X2 | |
| | | | vxfmulh | Mm, Rc, Ra, Rb | | fxp | Ra 16 16 (1)× ×(2) Rb 16 16 → MHm MLm (1)(2)(1)(2) Rc (1)(2) | | |
| | | | vxfmulhr | Mm, Rc, Ra, Rb | | fxp | With rounding | | |
| | | | vhmul | Mm, Rc, Ra, Rb | | | Ra 16 16 (1)× ×(2) Rb 16 16 → MHm MLm (1)(2)(1)(2) Rc (1)(2) | | |
| | | | vhfmulw | Mm, Rc, Ra, Rb | | fxp | Ra 16 16 (1)× ×(2) Rb 16 → MHm MLm (1)(2)(1)(2) Rc (1) | | |
| | | | vhfmulh | Mm, Rc, Ra, Rb | | fxp | Ra 16 16 (1)× ×(2) Rb 16 16 → MHm MLm (1)(2)(1)(2) Rc (1)(2) | | |
| | | | vhfmulhr | Mm, Rc, Ra, Rb | | fxp | With rounding | | |
| | | | vlmul | Mm, Rc, Ra, Rb | | | Ra 16 16 (1)× ×(2) Rb 16 → MHm MLm (1)(2)(1)(2) Rc (1)(2) | | |
| | | | vlfmulw | Mm, Rc, Ra, Rb | | fxp | Ra 16 16 (1)× ×(2) Rb 16 → MHm MLm (1)(2)(1)(2) Rc (1) | | |
| | | | vlfmulh | Mm, Rc, Ra, Rb | | fxp | Ra 16 16 (1)× ×(2) Rb 16 → MHm MLm (1)(2)(1)(2) Rc (1)(2) | | |
| | | | vlfmulhr | Mm, Rc, Ra, Rb | | fxp | With rounding | | |
| | | Word× Half word | vpfmulhww | Mm, Rc:Rc+1, Ra, Rb<br>Mm, Rc:Rc+1, Ra, Rb | | fxp<br>fxp | | | |

Fig. 26

| Category | SIMD | Size | Instructi | Operand | CFR | PSR | Typical behavior | Operation unit | 31 16 |
|---|---|---|---|---|---|---|---|---|---|
| mac system | SINGLE | Word×Word | mac | Mm, Rc, Ra, Rb, Mn<br>MO, Rc, Ra, Rb, Rx | | | Sum of products operation using mul | X2 | 32 |
| | | | fmacww | Mm, Rc, Ra, Rb, Mn<br>MO, Rc, Ra, Rb, Rx | | fxp | Sum of products operation using fmulww | | |
| | | Word ×Half word | hmac | Mm, Rc, Ra, Rb, Mn<br>MO, Rc, Ra, Rb, Rx | | | Sum of products operation using hmul | X1 | 16 |
| | | | lmac | Mm, Rc, Ra, Rb, Mn<br>MO, Rc, Ra, Rb, Rx | | | Sum of products operation using lmul | | 32 |
| | | | fmachww | Mm, Rc, Ra, Rb, Mn<br>MO, Rc, Ra, Rb, Rx | | fxp | Sum of products operation using fmulhww | | 16 |
| | | | fmachw | Mm, Rc, Ra, Rb, Mn<br>MO, Rc, Ra, Rb, Rx | | fxp | Sum of products operation using fmulhw | | |
| | | Half word ×Half word | fmachh | Mm, Rc, Ra, Rb, Mn<br>MO, Rc, Ra, Rb, Rx | | fxp | Sum of products operation using fmulhh | | 32 |
| | | | fmachhr | Mm, Rc, Ra, Rb, Mn<br>MO, Rc, Ra, Rb, Rx | | fxp | With rounding | | |
| | SIMD | HALF WORD × HALF WORD | vmac | Mm, Rc, Ra, Rb, Mn<br>MO, Rc, Ra, Rb, Rx | | | Sum of products operation using vmul | X2 | 16 |
| | | | vfmacw | Mm, Rc, Ra, Rb, Mn | | fxp | Sum of products operation using vfmulw | | 32 |
| | | | | | | | | | 16 |
| | | | vxmac | Mm, Rc, Ra, Rb, Mn<br>MO, Rc, Ra, Rb, Rx | | | Sum of products operation using vxmul | | |
| | | | vxfmacw | Mm, Rc, Ra, Rb, Mn | | fxp | Sum of products operation using vxfmulw | | |
| | | | vxfmach | Mm, Rc, Ra, Rb, Mn<br>MO, Rc, Ra, Rb, Rx | | fxp | Sum of products operation using vxfmulh | | |
| | | | vxfmachr | Mm, Rc, Ra, Rb, Mn<br>MO, Rc, Ra, Rb, Rx | | fxp | With rounding | | |
| | | | vhmac | Mm, Rc, Ra, Rb, Mn<br>MO, Rc, Ra, Rb, Rx | | | Sum of products operation using vhmul | | |
| | | | vhfmacw | Mm, Rc, Ra, Rb, Mn | | fxp | Sum of products operation using vhfmulw | | |
| | | | vhfmach | Mm, Rc, Ra, Rb, Mn<br>MO, Rc, Ra, Rb, Rx | | fxp | Sum of products operation using vhfmulh | | 32 |
| | | | vhfmachr | Mm, Rc, Ra, Rb, Mn<br>MO, Rc, Ra, Rb, Rx | | fxp | | | |
| | | WORD | vlmac | Mm, Rc, Ra, Rb, Mn<br>MO, Rc, Ra, Rb, Rx | | | Sum of products operation using vlmul | | |
| | | | vlfmacw | Mm, Rc, Ra, Rb, Mn | | fxp | Sum of products operation using vlfmulw | | |
| | | | vfmach | Mm, Rc, Ra, Rb, Mn<br>MO, Rc, Ra, Rb, Rx | | fxp | Sum of products operation using vfmulh | | |
| | | | vfmachr | Mm, Rc, Ra, Rb, Mn<br>MO, Rc, Ra, Rb, Rx | | fxp | With rounding | | |
| | | | vlfmach | Mm, Rc, Ra, Rb, Mn<br>Mm, Rc, Ra, Rb, Mn | | fxp | Sum of products operation using vlfmulh | | |
| | | | vlfmachr | Mm, Rc, Ra, Rb, Mn<br>MO, Rc, Ra, Rb, Rx | | fxp | With rounding | | |
| | | Word× Half word | vpfmachww | Mm, Rc:Rc+1, Ra, Rb, Mn | | fxp | | | |

Fig. 27

| Category | SIMD | Size | Instruction | Operand | CFR | PSR | Typical behavior | Operation unit 31:16 |
|---|---|---|---|---|---|---|---|---|
| msu system | SINGLE | Word×Word | msu | Mm, Rc, Ra, Rb, Mn<br>M0, Rc, Ra, Rb, Rx | | | Difference of products operation using mul | X2 |
| | | | fmsuww | Mm, Rc, Ra, Rb, Mn<br>M0, Rc, Ra, Rb, Rx | | fxp | Difference of products operation using fmulww | |
| | | Word×Half word | hmsu | Mm, Rc, Ra, Rb, Mn<br>M0, Rc, Ra, Rb, Rx | | | Difference of products operation using hmul | |
| | | | lmsu | Mm, Rc, Ra, Rb, Mn<br>M0, Rc, Ra, Rb, Rx | | | Difference of products operation using lmul | X1 |
| | | | fmsuhww | Mm, Rc, Ra, Rb, Mn<br>M0, Rc, Ra, Rb, Rx | | fxp | Difference of products operation using fmulhww | |
| | | | fmsuhw | Mm, Rc, Ra, Rb, Mn<br>M0, Rc, Ra, Rb, Rx | | fxp | Difference of products operation using fmulhw | |
| | | Half word×Half word | fmsuhh | Mm, Rc, Ra, Rb, Mn<br>M0, Rc, Ra, Rb, Rx | | fxp | Difference of products operation using fmulhh | |
| | | | fmsuhhr | Mm, Rc, Ra, Rb, Mn<br>M0, Rc, Ra, Rb, Rx | | fxp | With rounding | |
| | HALF | | vmsu | Mm, Rc, Ra, Rb, Mn<br>M0, Rc, Ra, Rb, Rx | | | Difference of products operation using vmul | 32 |
| | | | vfmsuw | Mm, Rc, Ra, Rb, Mn | | fxp | Difference of products operation using vfmul | |
| | | | vfmsuh | Mm, Rc, Ra, Rb, Mn<br>M0, Rc, Ra, Rb, Rx | | fxp | Difference of products operation using vfmulh | |
| | WORD | X | vxmsu | Mm, Rc, Ra, Rb, Mn<br>M0, Rc, Ra, Rb, Rx | | | Difference of products operation using vxmul | |
| | | | vxfmsuw | Mm, Rc, Ra, Rb, Mn | | fxp | Difference of products operation using vxfmulw | |
| | | | vxfmsuh | Mm, Rc, Ra, Rb, Mn<br>M0, Rc, Ra, Rb, Rx | | fxp | Difference of products operation using vxfmulh | X2 |
| | | H | vhmsu | Mm, Rc, Ra, Rb, Mn<br>M0, Rc, Ra, Rb, Rx | | | Difference of products operation using vhmul | |
| | | A L F | vhfmsuw | Mm, Rc, Ra, Rb, Mn | | fxp | Difference of products operation using vhfmulw | |
| | | | vhfmsuh | Mm, Rc, Ra, Rb, Mn<br>M0, Rc, Ra, Rb, Rx | | fxp | Difference of products operation using vhfmulh | |
| | | W O R D | vlmsu | Mm, Rc, Ra, Rb, Mn<br>M0, Rc, Ra, Rb, Rx | | | Difference of products operation using vlmul | |
| | | | vlfmsuw | Mm, Rc, Ra, Rb, Mn | | fxp | Difference of products operation using vlfmulw | |
| | | | vlfmsuh | Mm, Rc, Ra, Rb, Mn<br>M0, Rc, Ra, Rb, Rx | | fxp | Difference of products operation using vlfmulh | |

Fig. 28

| Category | SIMD | Size | Instructi | Operand | CFR | PSR | Typical behavior | Operation unit | 31 16 |
|---|---|---|---|---|---|---|---|---|---|
| MEM ld system | SINGLE | Word | ld | Rb, (Ra, d10u)<br>Rb, (GP, d13u)<br>Rb, (SP, d13u)<br>Rb, (Ra+) i10s | | | Register ← Memory<br>32 ← 32 | M | 32 |
| | | | | Rb2, (Ra2)<br>Rb2, (Ra2, d05u)<br>Rb2, (GP, d06u)<br>Rb2, (SP, d06u)<br>Rb2, (Ra2+) | | | | | 16 |
| | | Half word | ldh | Rb, (Ra, d09u)<br>Rb, (GP, d12u)<br>Rb, (SP, d12u)<br>Rb, (Ra+) i09s | | | 32 ← 16 | | 32 |
| | | | | Rb2, (Ra2)<br>Rb3, (Ra3, d04u)<br>Rb2, (GP, d05u)<br>Rb2, (SP, d05u)<br>Rb2, (Ra2+) | | | | | 16 |
| | | | ldhu | Rb, (Ra, d09u)<br>Rb, (GP, d12u)<br>Rb, (SP, d12u)<br>Rb, (Ra+) i09s | | | | | |
| | | Byte | ldb | Rb, (Ra, d08u)<br>Rb, (GP, d11u)<br>Rb, (SP, d11u)<br>Rb, (Ra+) i08s | | | Register ← Memory<br>32 ← 8 | | 32 |
| | | | ldbu | Rb, (Ra, d08u)<br>Rb, (GP, d11u)<br>Rb, (SP, d11u)<br>Rb, (Ra+) i08s | | | | | |
| | | Byte-><br>Half word | ldbh<br>ldbuh | Rb, (Ra+) i07s<br>Rb, (Ra+) i07s | | | 16 16 ← 8 8 | | |
| | | PAIR Word | ldp | Rb:Rb+1, (Ra, d11u)<br>LR:SVR, (Ra, d11u)<br>TAR:UDR, (Ra, d11u)<br>Rb:Rb+1, (GP, d14u)<br>LR:SVR, (GP, d14u)<br>TAR:UDR, (GP, d14u)<br>Rb:Rb+1, (SP, d14u)<br>LR:SVR, (SP, d14u)<br>TAR:UDR, (SP, d14u)<br>Rb:Rb+1, (Ra+) i11s<br>Rb:Rb+1, (SP, d07u)<br>LR:SVR, (SP, d07u)<br>Rb2:Re2, (Ra2+) | | | 32 ← 32<br>32 ← 32 | | 16 |
| | | Half word | ldhp | Rb:Rb+1, (Ra, d10u)<br>Rb:Rb+1, (Ra+) i10s | | | 32 ← 16 16<br>32 | | 32 |
| | | | | Rb2:Re2, (Ra2+) | | | | | 16 |
| | | Byte | ldbp | Rb:Rb+1, (Ra, d09u)<br>Rb:Rb+1, (Ra+) i09s | | | 32 ← 8 8<br>32 | | 32 |
| | | Byte-><br>Half word | ldbhp<br>ldbuhp | Rb:Rb+1, (Ra+) i07s<br>Rb:Rb+1, (Ra+) i07s | | | 16 16 ← 8 8 8 8<br>16 16 | | |

Fig. 29

| Category | SIMD | Size | Instruction | Operand | CFR | PSR | Typical behavior | Operation unit | 31 16 |
|---|---|---|---|---|---|---|---|---|---|
| MEM store system | S I N G L E | Word | st | (Ra, d10u), Rb<br>(GP, d13u), Rb<br>(SP, d13u), Rb<br>(Ra+)i10s, Rb | | | Register 32 → Memory 32 | M | 32 |
| | | | | (Ra2), Rb2<br>(Ra2, d05u), Rb2<br>(GP, d06u), Rb2<br>(SP, d06u), Rb2<br>(Ra2+), Rb2 | | | | | 16 |
| | | Half word | sth | (Ra, d09u), Rb<br>(GP, d12u), Rb<br>(SP, d12u), Rb<br>(Ra+)i09s, Rb | | | 16 → 16 | | 32 |
| | | | | (Ra2), Rb2<br>(Ra2, d04u), Rb2<br>(GP, d05u), Rb2<br>(SP, d05u), Rb2<br>(Ra2+), Rb2 | | | | | 16 |
| | | Byte | stb | (Ra, d08u), Rb<br>(GP, d11u), Rb<br>(SP, d11u), Rb<br>(Ra+)i08s, Rb | | | 8 → 8 | | |
| | | Byte-><br>Half word | stbh | (Ra+)i07s, Rb | | | 8 8 → 16 | | |
| | P A I R | Word | stp | (Ra, d11u), Rb:Rb+1<br>(Ra, d11u), LR:SVR<br>(Ra, d11u), TAR:UDR<br>(GP, d14u), Rb:Rb+1<br>(GP, d14u), LR:SVR<br>(GP, d14u), TAR:UDR<br>(SP, d14u), Rb:Rb+1<br>(SP, d14u), LR:SVR<br>(SP, d14u), TAR:UDR<br>(Ra+)i11s, Rb:Rb+1 | | | 32<br>32 → 32<br>32 | | 32 |
| | | | | (SP, d07u), Rb:Re<br>(SP, d07u), LR:SVR<br>(Ra2+), Rb2:Re2 | | | | | 16 |
| | | Half word | sthp | (Ra, d10u), Rb:Rb+1<br>(Ra+)i10s, Rb:Rb+1 | | | 16<br>16 → 32 | | 32 |
| | | | | (Ra2+), Rb2:Re2 | | | | | 16 |
| | | Byte | stbp | (Ra, d09u), Rb:Rb+1<br>(Ra+)i09s, Rb:Rb+1 | | | 8<br>8 → 16 | | 32 |
| | | Byte-><br>Half word | stbhp | (Ra+)i07s, Rb:Rb+1 | | | 8 8<br>8 8 → 32 | | |

Fig. 30

| Category | SIMD | Size | Instruction | Operand | CFR | PSR | Typical behavior | Operation unit |
|---|---|---|---|---|---|---|---|---|
| BRA | | | setlr | d09s | | | Set LR | 31<br>16 |
| | | | | C5, d09s | | | Store instruction fetched from LR in branch buffer | 32 |
| | | | settar | d09s | | | Set TAR | 16 |
| | | | | C6, d09s | W:c6 | | Store instruction fetched from TAR in branch buffer | 32 |
| | | | | C6, C2:C4, d09s | W:c2:c4, c6 | | | |
| | | | | C6, Cm, d09s | W:c6, cm | | | |
| | | | | C6, C4, d09s | W:c6 | | | |
| | | | setbb | LR | | | Store instruction fetched from LR in branch buffer | 16 |
| | | | | TAR | | | Store instruction fetched from TAE in branch buffer | 32 |
| | | | jloop | C5, LR, Ra, i08s | W:c5 | | Only predicate [c5] | B |
| | | | | C6, TAR, Ra, i08s | W:c6 | | Only predicate [c6] | |
| | | | | C6, C2:C4, TAR, Ra, i08s | W:c2:c4, c6 | | | |
| | | | | C6, Cm, TAR, Ra, i08s | W:c6, cm | | | |
| | | | | C6, TAR, Ra2 | W:c6 | | | |
| | | | | C6, C2:C4, TAR, Ra2 | W:c2:c4, c6 | | | |
| | | | | C6, Cm, TAR, Ra2 | W:c6 | | | |
| | | | jmp | TAR | | | | |
| | | | | LR | | | | |
| | | | jmpl | TAR | R:CF | | | |
| | | | | LR | | | | |
| | | | jmpf | TAR | | | | |
| | | | | LR | | | | |
| | | | | Cm, TAR | | | | |
| | | | | C6, C2:C4, TAR | | | | |
| | | | jmpr | LR | | | | |
| | | | br | d20s | | | | 32 |
| | | | | d09s | | | Only predicates [c6][c7] | 16 |
| | | | brl | d20s | R:CF | | | 32 |
| | | | | d09s | | | | 16 |
| | | | rti | | | W:PSR<br>R:eh | | |

Fig. 31

| Category | SIMD | Size | Instruction | Operand | CFR | PSR | Typical behavior | Operation unit | |
|---|---|---|---|---|---|---|---|---|---|
| BS asl system | SINGLE | Word | asl | Rc, Ra, Rb<br>Rb, Ra, i05u<br>Ra2, i04u | | | Left shift<br><<Rb[0:4] Ra → Rc | S1 | 31/16 |
| | | | faslvw | Rc, Ra, Rb<br>Rb, Ra, i05u<br>Rc, Ra, Rb<br>Rb, Ra, i05u | W:ovs | | With saturation<br><<Rb[0:4] Ra → Rc | S2 | 32/16 |
| | | Pair word | aslp | Mn, Ra, Mn, Rb<br>Mn, Rb, Mn, i06u<br>Mn, Rc, MHn, Ra, Rb<br>Mn, Rb, MHn, Ra, i06u | | | <<Ra[0:4] MHn→MHm, Rb→MLm | S2 | 32 |
| | | | faslpvw | Mn, Ra, Mn, Rb<br>Mn, Rb, Mn, i06u | W:ovs | | With saturation<br><<Rb[0:4] MHn→MHm, Rb→MLm | S2 | |
| | SIMD | Word | vasl | Mn, Ra, Mn, Rb<br>Mn, Rb, Mn, i05u | | | MHn (1) (2) MLm (1) (2)<br>(1)<<Ra[0:4] (2)<<Ra[0:4] → MHm Rb MLm | S2 | 32 |
| | | | vfaslvw | Mn, Ra, Mn, Rb<br>Mn, Rb, Mn, i05u | W:ovs | | MHn (1) (2) MLm (1) (2)<br>(1)<<Ra[0:4] (2)<<Ra[0:4] → MHm Rb MLm With saturation | S2 | |
| | | Half word | vaslh | Rc, Ra, Rb<br>Rb, Ra, i04u | | | <<Rb[0:3] <<Rb[0:3]<br>Ra (1) (2) → Rc (1) (2) | | |
| | | | vfaslvh | Rc, Ra, Rb<br>Rb, Ra, i04u | W:ovs | | <<Rb[0:3] <<Rb[0:3]<br>Ra (1) (2) → Rc (1) (2) With saturation | | |
| | | Byte | vaslb | Rc, Ra, Rb<br>Rb, Ra, i03u | | | <<Rb[0:2] <<Rb[0:2]<br>Ra (1) (2) (3) (4) → Rc (1) (2) (3) (4)<br><<Rb[0:2] <<Rb[0:2] | | |
| BS asr system | SINGLE | Word | asr | Rc, Ra, Rb<br>Rb, Ra, i05u<br>Ra2, i04u | | | Arithmetic shift right<br>>>Rb[0:4] Ra → Rc | S1 | 32/16 |
| | | Pair word | asrp | Mn, Ra, Mn, Rb<br>Mn, Rb, Mn, i06u<br>Mn, Rc, MHn, Ra, Rb<br>Mn, Rb, MHn, Ra, i06u | | | >>Ra[0:4] MHn→MHm, Rb→MLm | S1 | 32 |
| | SIMD | Word | vasr | Mn, Ra, Mn, Rb<br>Mn, Rb, Mn, i05u | | | MHn (1) (2) MLm (1) (2)<br>(1)>>Ra[0:4](2)>>Ra[0:4] → MHm Rb MLm | S2 | 32 |
| | | Half word | vasrh | Rc, Ra, Rb<br>Rb, Ra, i04u | | | >>Ra[0:4]<br>Ra (1) (2) → Rc (1) (2) | | |
| | | Byte | vasrb | Rc, Ra, Rb<br>Rb, Ra, i03u | | | >>Rb[0:2] >>Rb[0:2]<br>Ra (1) (2) (3) (4) → Rc (1) (2) (3) (4)<br>>>Rb[0:2] >>Rb[0:2] | S1 | |

Fig. 32

| Category | SIMD | Size | Instruction | Operand | CFR | PSR | Typical behavior | Operation unit | 31 16 |
|---|---|---|---|---|---|---|---|---|---|
| BS lsr system | SINGLE | Word | lsr | Rc, Ra, Rb<br>Rb, Ra, i05u | | | Logical shift right<br>>>>Rb[0:4]<br>Ra → Rc | S1 | 32 |
| | | Pair word | lsrp | Mn, Ra, Mn, Rb<br>Mn, Rb, Mn, i06u<br>Mn, Rc, MHn, Ra, Rb<br>Mn, Rb, MHn, Ra, i06u | | | >>>Ra[0:4]<br>MHn → MLn<br>Rb | S2 | 32 |
| | SIMD | Word | vlsr | Mn, Ra, Mn, Rb<br>Mn, Rb, Mn, i05u | | | MLn<br>(1) (2) (1) (2)<br>(1)>>>Ra[0:4] (2)>>>Ra[0:4]<br>Rb | | |
| | | Half word | vlsrh | Rc, Ra, Rb<br>Rb, Ra, i04u | | | >>>Rb[0:3] >>>Rb[0:3]<br>Ra (1) (2)<br>Rc | S1 | 32 |
| | | Byte | vlsrb | Rc, Ra, Rb<br>Rb, Ra, i03u | | | >>>Rb[0:2] >>>Rb[0:2]<br>Ra (1) (2) (3) (4) Rc<br>>>>Rb[0:2] >>>Rb[0:2] | | |
| BS rotate system | SINGLE | Word | rol | Rc, Ra, Rb<br>Rb, Ra, i05u | | | Ra<br><<Rb[4:0] → Rc | S1 | 32 |
| | SIMD | Half word | vrolh | Rc, Ra, Rb<br>Rb, Ra, i04u | | | | | |
| | | Byte | vrolb | Rc, Ra, Rb<br>Rb, Ra, i03u | | | | | |
| BS ext system | SINGLE | Word | extw | Mn, Rb, Ra | | | MLn<br>s... Ra<br>Rc | C | 32 |
| | | Half word | exth | Ra2 | | | Ra2 s...(1) Ra2 | S2 | 32 |
| | | | exthu | Ra2 | | | Ra2 u...(1) Ra2 | | |
| | | Byte | extb | Ra2 | | | Ra2 s...(1) Ra2 | | 16 |
| | | | extbu | Ra2 | | | Ra2 u...(1) Ra2 | | |
| | SIMD | Half word | vexth | Mn, Rb, Ra | | | MLn<br>s...(1) (2)<br>Ra Rb | C | 32 |

Fig. 33

| Category | SIMD Size | Instruction | Operand | CFR | PSR | Typical behavior | Operation unit 31 1b |
|---|---|---|---|---|---|---|---|
| CNV valn system | | valn | Rc, Ra, Rb | R:aln[1:0] | | << (CFR.ALN[1:0] << 3) [63:32] Ra Rb → Rb | 32 |
| | SIMD | valn1 | Rc, Ra, Rb | | | Ra (1) Rb (2) → Rc (1) (2) | C |
| | | valn2 | Rc, Ra, Rb | | | Ra (1) Rb (2) → Rc (1) (2) | |
| | | valn3 | Rc, Ra, Rb | | | Ra (1) Rb (2) → Rc (1) (2) | |
| | | valnvc1 | Rc, Ra, Rb | R:VC0 | | | |
| | | valnvc2 | Rc, Ra, Rb | R:VC0 | | | |
| | | valnvc3 | Rc, Ra, Rb | R:VC0 | | | |
| | | valnvc4 | Rc, Ra, Rb | R:VC0 | | | |

Fig. 34

| Category | SIMD | Size | Instruction | Operand | CFR | PSR | Typical behavior | Operation unit | 31 16 |
|---|---|---|---|---|---|---|---|---|---|
| CNV | SINGLE | | bcnt1 | Rb, Ra | | | Count the number of 1s | C | 32 |
| | | | bseq0 | Rb, Ra | | | Count number of values from MSB until first 0 is reached | | |
| | | | bseq1 | Rb, Ra | | | Count number of values from MSB until first 1 is reached | | |
| | | | bseq | Rb, Ra | | | Count number of values from MSB until first -1 is reached | | |
| | | | mskbrvh | Rc, Ra, Rb | R:BP0 | | Rb → Rc (CFR.BPO 0… ←Invert→, Ra) | | |
| | | | byterev | Rb, Ra | | | Inv Inv Inv Inv → Rb | | |
| | | | mskbrvb | Rc, Ra, Rb | R:BP0 | | Rb → Rc (CFR.BPO 0… Invert, Ra) | | |
| | SIMD | Half word | vintllh | Rc, Ra, Rb | | | Ra(1), Rb(2) → (1)(2) Rc | | |
| | | | vintlhh | Rc, Ra, Rb | | | Ra(1), Rb(2) → (1)(2) Rc | | |
| | | Byte | vintllb | Rc, Ra, Rb | | | Ra(1)(3), Rb(2)(4) → (1)(2)(3)(4) Rc | | |
| | | | vintlhb | Rc, Ra, Rb | | | Ra(1)(3), Rb(2)(4) → (1)(2)(3)(4) Rc | | |
| | | Half word | vhunpkh | Rb:Rb+1, Ra | | | Ra(1)(2) → (1)00… Rb, (2)00… Rb+1 | | |
| | | Byte | vhunpkb | Rb:Rb+1, Ra | | | Ra(1)(2)(3)(4) → (1)00…(2)00… Rb, (3)00…(4)00… Rb+1 | | |
| | | Half word | vlunpkh | Rb:Rb+1, Ra | | | Ra(1)(2) → ss…(1) Rb, ss…(2) Rb+1 | | |
| | | | vlunpkhu | Rb:Rb+1, Ra | | | Ra(1)(2) → 00…(1) Rb, 00…(2) Rb+1 | | |
| | | Byte | vlunpkb | Rb:Rb+1, Ra | | | Ra(1)(2)(3)(4) → ss…(1)ss…(2) Rb, ss…(3)ss…(4) Rb+1 | | |
| | | | vlunpkbu | Rb:Rb+1, Ra | | | Ra(1)(2)(3)(4) → 00…(1)00…(2) Rb, 00…(3)00…(4) Rb+1 | | |
| | | Half word | vunpk1 | Rb, Mn | | | MHn MLn (1)(2) → (1)(2) Rb | | |
| | | | vunpk2 | Rb, Mn | | | MHn MLn (1)(2) → (1)(2) Rb | | |
| | | Byte | vstovh | Rb, Ra | | | Ra(1) → (1)(1) Rb | | |
| | | | vstovb | Rb, Ra | | · | Ra(1) → (1)(1)(1)(1) Rb | | |
| | | | vhpkb | Rc, Ra, Rb | | | Ra(1)(2), Rb(3)(4) → (1)(2)(3)(4) Rc | | |

Fig. 35

| Category | SIMD Size | | Instruction | Operand | CFR | PSR | Typical behavior | Operation unit | 31 16 |
|---|---|---|---|---|---|---|---|---|---|
| SAT vlpk system | SIMD | Word-> Half word | vlpkh | Rc, Ra, Rb | | | With saturation | | |
| | | | vlpkhu | Rc, Ra, Rb | | | With unsigned saturation | C | 32 |
| | | Half word-> Byte | vlpkb | Rc, Ra, Rb | | | With saturation | | |
| | | | vlpkbu | Rc, Ra, Rb | | | With unsigned saturation | | |
| SAT sat system | SINGLE | Word | satw | Mn, Rb, Mn | | | Word saturation | | |
| | | | sath | Rb, Ra | | | Half wordsaturation | | |
| | | | satb | Rb, Ra | | | Bytesaturation | | |
| | | | satbu | Rb, Ra | | | Unsigned byte saturation | | |
| | | | sat9 | Rb, Ra | | | 9-bit saturation | | |
| | | | sat12 | Rb, Ra | | | 12-bit saturation | | |
| | SIMD | Half word | vsath | Mn, Rb, Mn | | | With saturation | C | 32 |
| | | | vsath8 | Rb, Ra | | | Signed 8-bit saturation | | |
| | | | vsath8u | Rb, Ra | | | Unigned 8-bit saturation | | |
| | | | vsath9 | Rb, Ra | | | 9-bit saturation | | |
| | | | vsath12 | Rb, Ra | | | 12-bit saturation | | |

Fig. 36

| Category | SIMD Size | Instruction | Operand | CFR | PSR | Typical behavior | Operation unit | 31 16 |
|---|---|---|---|---|---|---|---|---|
| MSK | | mskgen | Rc, Rb | | | Generate mask Rb[12:8]Rb[4:0] or Rb[4:0] Rb[12:8] | | 32 |
| | | | Rb, I05U, i05u | | | | S2 | 32 |
| | | msk | Rc, Ra, Rb | | | Ra or Rb[4:0] Rb[12:8] | | |
| | | | Rb, Ra, I05U, i05u | | | Rb | | 32 |
| EXTR | | extr | Rc, Ra, Rb | | | Rb[12:8] Rb[4:0] With sign extension | S2 | 32 |
| | | | Rb, Ra, I05U, i05u | | | Ra | | |
| | | extru | Rc, Ra, Rb | | | Rb s...(0...) (Without sign extension) | | |
| | | | Rb, Ra, I05U, i05u | | | | | |
| DIV | | div | MHm, Rc, MHn, Ra, Rb | W:ovs | | Division | DIV | 32 |
| | | divu | MHm, Rc, MHn, Ra, Rb | | | | | |
| | | piNI | | | W:ih,ie,f R:PSR | Software interrupt N=0~7 | | 32 |
| | | piN | | | W:ih,ie,p R:PSR | Software interrupt N=0~7 | B | 16 |
| | | scN | | | W:ih,ie,p R:PSR | System call N=0~7 | | |
| | | ldstb | Rb, (Ra) | | | load bus lock | | 32 |
| | | rd | Rb, (Ra) | | R:eee | External register read | | 16 |
| | | | Rb, (d11u) | | | | M | 32 |
| | | | Rb2, (Ra2) | | | | | |
| | | wt | (Ra), Rb | | R:eee | External register write | | 16 |
| ETC | | | (d11u), Rb | | | | | |
| | | | (Ra2), Rb2 | | | | | |
| | | dpref | (Ra, d11u) | | | Pre-fetch | | |
| | | dbgmN | i18u | | | N=0~3 | DBGM | |
| | | vcchk | | W:CF R:VC | | VC flag check | | 32 |
| | | vmpsw | | | | VMP switching | B | |
| | | vmpsw | LR | | | | | |
| | | vmpintd1 | | | W:ie | VMP switching disabled | | |
| | | vmpintd2 | | | | | | |
| | | vmpintd3 | | | | | | |
| | | vmpinte1 | | | W:ie | | | |
| | | vmpinte2 | | | W:ie | VMP switching enabled | | |
| | | vmpinte3 | | | | | | |
| | | nop | | | | no operation | A | 16 |

Fig. 38 vcchk

| Behavior | if (VC3:VC2:VC1:VC0==0b0000) {<br>   C4:C5 <- 1:0;<br>} else {<br>    C4:C5 <- 0:1;<br>}<br>C3:C2:C1:C0 <- VC3:VC2:VC1:VC0;<br><br>Judge whether VC0~VC3 are all 0, and output judgment result to C4 and C5.<br>Move VC0~VC3 to C0~C3. |
|---|---|
| Assembler mnemonic | Format | Affecting flag | Affected flag |
| vcchk | 16bit | C0,C1,C2,C3,C4,C5 | VC0,VC1,VC2,VC3 |
| Remarks | | | |
| | | | |

Fig. 40 stbh (Ra),Rb

| Behavior | => stbh (Ra+)0,Rb<br><br>H(Ra) <- Rb[23:16]:Rb[7:0];<br><br>Store 2 items of byte data stored in Rb into address indicated by Ra. 2 items of byte data are stored in 16 ~ 23 bits and 0 ~ 7 bits in Rb. |||||
|---|---|---|---|---|
| Assembler mnemonic || Format | Affecting flag | Affected flag |
| stbh (Ra),Rb || 32bit synonym | — | PSR.AEE |
| Remarks |||||
| Misalignment exception occurs when Ra is not aligned to 2 bytes. |||||

Fig. 42 stbhp (Ra+),Rb:Rb+1

| Behavior | => stbhp (Ra+)4,Rb:Rb+1<br><br>W(Ra) <- Rb[23:16]:Rb[7:0]:Rb+1[23:16]:Rb+1[7:0];<br>Ra <- Ra+sext(4);<br><br>Store 4 items of byte data stored in Rb and Rb+1 to address indicated by Ra. 4 items of byte data are stored in 16 ~ 23 bits and 0 ~ 7 bits in Rb and Rb+1.<br>Furthermore, add 4 to Ra and store result in Ra. | | |
|---|---|---|---|
| Assembler mnemonic | Format | Affecting flag | Affected flag |
| stbhp (Ra+),Rb:Rb+1 | 32bit synonym | — | PSR.AEE |
| Remarks | | | |
| Misalignment exception occurs when Ra is not aligned to 2 bytes. | | | |

Fig. 44 sethi Ra,I16

| Behavior | Ra <- (uext(I16) << 16)+uext(Ra[15:0]);<br><br>Store immediate value (I16) to higher 16 bits of Ra. Lower 16 bits of Ra is not affected by this. | | | |
|---|---|---|---|---|
| Assembler mnemonic | | Format | Affecting flag | Affected flag |
| sethi Ra,I16 | | 32bit | — | — |
| Remarks | | | | |
| I16 is an unsigned value. | | | | |

Fig. 46 vaddhvc Rc,Ra,Rb

| Behavior | Rc[31:16] <- Ra[31:16] + Ra[31:16], if (VC2 == 0); Rc[31:16] <- Ra[31:16] + Rb[31:16], if (VC2 == 1); Rc[15: 0] <- Ra[15: 0] + Ra[15: 0], if (VC2 == 0); Rc[15: 0] <- Ra[15: 0] + Rb[15: 0], if (VC2 == 1); Used for motion compensation in image processing. Handle each register in half word vector format. Add Ra with Ra or Rb. Whether added with Ra or Rb depends on VC2. |
|---|---|
| Assembler mnemonic | Format | Affecting flag | Affected flag |
| vaddhvc  Rc,Ra,Rb | 32bit | — | VC2 |
| Remarks | | | |
|  | | | |

Fig. 49 vaddrhvc Rc,Ra,Rb

| Behavior | Rc[31:16] <- Ra[31:16] + Ra[31:16] + sext16(1), if (VC2 == 0); Rc[31:16] <- Ra[31:16] + Rb[31:16] + sext16(1), if (VC2 == 1); Rc[15: 0] <- Ra[15: 0] + Ra[15: 0] + sext16(1), if (VC2 == 0); Rc[15: 0] <- Ra[15: 0] + Rb[15: 0] + sext16(1), if (VC2 == 1); Handle each register in half word vector format. Add Ra with Ra or Rb, and further add 1 for rounding purposes. Whether added with Ra or Rb depends on VC2. |||| 
|---|---|---|---|---|
| Assembler mnemonic | Format | Affecting flag | Affected flag |
| vaddrhvc Rc,Ra,Rb | 32bit | — | VC2 |
| Remarks ||||
|  ||||

Fig. 51 vsgnh Rb,Ra

| | |
|---|---|
| Behavior | Rb[31:16] <- 0x0001, if (Ra[31:16] > 0);<br>Rb[31:16] <- 0x0000, if (Ra[31:16] == 0);<br>Rb[31:16] <- 0xffff, if (Ra[31:16] < 0);<br>Rb[15: 0] <- 0x0001, if (Ra[15: 0] > 0);<br>Rb[15: 0] <- 0x0000, if (Ra[15: 0] == 0);<br>Rb[15: 0] <- 0xffff, if (Ra[15: 0] < 0);<br><br>Used for inverse quantization in image processing.<br>Handle each register in half word vector format.<br>Output 1 when value held in Ra is positive, output -1 when value held in Ra is negative, and output 0 when value held in Ra is 0. |

| Assembler mnemonic | Format | Affecting flag | Affected flag |
|---|---|---|---|
| vsgnh Rb,Ra | 32bit | — | — |
| Remarks | | | |
| | | | |

Fig. 53 valnvc1 Rc,Ra,Rb

| Behavior | tmp [87: 0] <- Ra:Rb << (CFR.ALN[1:0] << 3 ); <br> tmp2[31: 0] <- tmp[63:32]; <br> Rc <- tmp2[31:24]:tmp2[31:24]:tmp2[23:16]:tmp2[23:16], <br>     if (VC0 == 0); <br> Rc <- tmp2[31:24]:tmp2[23:16]:tmp2[23:16]:tmp2[15: 8], <br>     if (VC0 == 1); <br><br> Used for motion compensation in image processing. <br> Perform byte alignment according to CFR.ALN, and take out different byte data depending on value of VC0. |
|---|---|
| Assembler mnemonic | Format | Affecting flag | Affected flag |
| valnvc1 Rc,Ra,Rb | 32bit | — | CFR.ALN,VC0 |
| Remarks ||||
|  ||||

Fig. 54 valnvc2 Rc,Ra,Rb

| Behavior | tmp [87: 0] <- Ra:Rb << (CFR.ALN[1:0] << 3 );<br><br>tmp2[31: 0] <- tmp[47:16];<br><br>Rc <- tmp2[31:24]:tmp2[31:24]:tmp2[23:16]:tmp2[23:16],<br>      if (VC0 == 0);<br><br>Rc <- tmp2[31:24]:tmp2[23:16]:tmp2[23:16]:tmp2[15: 8],<br>      if (VC0 == 1);<br><br>Used for motion compensation in image processing.<br>Perform byte alignment according to CFR.ALN, and take out different byte data depending on value of VC0. |
|---|---|
| Assembler mnemonic | Format | Affecting flag | Affected flag |
| valnvc2 Rc,Ra,Rb | 32bit | — | CFR.ALN,VC0 |
| Remarks |||||
|  |||||

Fig. 55 valnvc3 Rc,Ra,Rb

| Behavior | tmp [87: 0] <- Ra:Rb << (CFR.ALN[1:0] << 3 );<br><br>tmp2[31: 0] <- tmp[63:32];<br><br>Rc <- tmp2[31:24]:tmp2[31:24]:tmp2[23:16]:tmp2[23:16],<br><br>if (VC0 == 0);<br><br>Rc <- tmp2[31:24]:tmp2[15: 8]:tmp2[23:16]:tmp2[ 7: 0],<br><br>if (VC0 == 1);<br><br>Used for motion compensation in image processing.<br><br>Perform byte alignment according to CFR.ALN, and take out different byte data depending on value of VC0. |
|---|---|

| Assembler mnemonic | Format | Affecting flag | Affected flag |
|---|---|---|---|
| valnvc3  Rc,Ra,Rb | 32bit | — | CFR.ALN,VC0 |
| Remarks ||||
|  ||||

Fig. 56 valnvc4 Rc,Ra,Rb

| Behavior | tmp [87: 0] <- Ra:Rb << (CFR.ALN[1:0] << 3 );<br><br>tmp2[31: 0] <- tmp[47:16];<br><br>Rc <- tmp2[31:24]:tmp2[31:24]:tmp2[23:16]:tmp2[23:16],<br>        if (VC0 == 0);<br><br>Rc <- tmp2[31:24]:tmp2[15: 8]:tmp2[23:16]:tmp2[ 7: 0],<br>        if (VC0 == 1);<br><br>Used for motion compensation in image processing.<br><br>Perform byte alignment according to CFR.ALN, and take out different byte data depending on value of VC0. |
|---|---|
| Assembler mnemonic | Format | Affecting flag | Affected flag |
| valnvc4 Rc,Ra,Rb | 32bit | — | CFR.ALN,VC0 |
| Remarks |||||
| tmp2[ 7: 0] is 0x00 when CFR.ALN[1:0]==3. |||||

Fig. 58 addarvw Rc,Ra,Rb

| Behavior | tmp[32:0] <- sext33(Ra) + sext33(Rb) + uext33(~(Ra[31:31])); Rc <- tmp[31:0]; Rc <- 0x7fff_ffff, CFR.OVS <- 1,                 if ( tmp[32:0] > 0x0_7fff_ffff[32:0] ); Rc <- 0x8000_0000, CFR.OVS <- 1,                 if ( tmp[32:0] < 0x1_8000_0000[32:0] );  Round up absolute values in image processing. Add Ra and Rb. Further add 1 if value held in Ra is positive. |
|---|---|

| Assembler mnemonic | Format | Affecting flag | Affected flag |
|---|---|---|---|
| addarvw Rc,Ra,Rb | 32bit | CFR.OVS | — |

| Remarks |
|---|
| When rounding an absolute value (away from zero), a value resulted from padding, with 1, bits lower than a target bit to be rounded shall be stored in Rb |
| ex. Rb <- 0x0000_7fff   (when rounded to MSB 16 bits) |

Ra : 00.1000 (+0.5) [Binary / Decimal]

Rb :      111  |Absolute value

+         1

———————————
Rc : [01].0000 (+1)
     (To be masked)

(a)   When Ra≧0

Ra : 11.1000 (-0.5) [Binary / Decimal]

Rb :      111  |Absolute value

+

———————————
Rc : [11].1111 (-1)
     (To be masked)

(b)   When Ra<0

Fig. 61 movp Rc:Rc+1,Ra,Rb

| Behavior | Rc <- Ra;<br>Rc+1 <- Rb;<br><br>Move Ra to Rc and Rb to Rc+1. | | |
|---|---|---|---|
| Assembler mnemonic | Format | Affecting flag | Affected flag |
| movp Rc:Rc+1,Ra,Rb | 32bit | — | — |
| Remarks | | | |
| Rc shall be an even number. | | | |

Fig. 62 jloop C6,Cm,TAR,Ra

| Behavior | =>jloop C6,Cm,TAR,Ra,-1<br><br>PC <- TAR; C6 <- (Ra >= 0)? 1:0; Cm <- 1;<br>Ra <- Ra - sext(1);<br><br>Used as part of loop.<br>Following processing is performed:<br>(1) Set 1 to Cm.<br>(2) Add -1 to Ra, and store result in Ra. Set 0 to C6 when Ra becomes smaller than 0.<br>(3) Branch to address specified by TAR. Fill branch instruction buffer with branch target instruction, if there is no branch target instruction filled in branch instruction buffer. |
|---|---|

| Assembler mnemonic | Format | Affecting flag | Affected flag |
|---|---|---|---|
| jloop C6,Cm,TAR,Ra | 32bit synonym | Cm,C6 | — |

| Remarks |
|---|
| ※Behavior when Cm=C6 is undefined. |

Fig. 63 settar C6,Cm,D9

| Behavior | TAR <- PC + (sext(D9[8:1]) <<1 );<br><br>C6 <- 1; Cm <- 0;<br><br>Following processing is performed:<br><br>(1) Store address resulted from adding PC value to displacement value (D9) into TAR.<br><br>(2) Fetch instruction corresponding to such address, and store it in branch instruction buffer.<br><br>(3) Set C6 to 1, and Cm to 0. |
|---|---|
| Assembler mnemonic | Format | Affecting flag | Affected flag |

| Assembler mnemonic | Format | Affecting flag | Affected flag |
|---|---|---|---|
| settar  C6,Cm,D9 | 32bit | Cm,C6 | — |
| Remarks ||||
| D9 is a signed value whose lower 1 bit shall be 0.<br>Behavior when Cm=C6 is undefined. ||||

Fig.64

```
                              settar  C6,C4,LO
A                      LO :
 B A                          [C4]  A
   B A                        [C6]  B
     B A                      [C6]  jloop
       B
```

Fig. 65

```
int func2(int a, int b, int c)
{
        int i;
        int t;

for (i = 0; i < 100; i++) {
                y[i] = x[i] + i;
                t += x[i];
        }
        return t;
}
```

```
            mov     r4, 0
            ld      r6, (gp, _x$ - .MN.gptop)
            ;;
            mov     r1, 98
            settar  C6, C4, L00023    // Reset C4 at the same time
            ld      r5, (gp, _y$ - .MN.gptop)
            ;;
L00023                                //2cycle/iterartion
[C4]        add     r2, r3, r4
[C4]        add     r0, r3, r0
[C6]        ld      r3, (r6+)
            ;;
[C4]        add     r4, r4, 1
[C4]        st      (r5+), r2
[C6]        jloop   C6, C4, tar, r1, -1 // Set C4 at the same time
            ;;
            ret
            ;;
```

Fig. 68 jloop C6,C2:C4,TAR,Ra

| Behavior | => jloop C6,C2:C4,TAR,Ra,-1<br><br>PC <- TAR;<br><br>C2 <- C3, C3 <- C4, C6 <- C4;<br><br>C4 <- (Ra >= 0)? 1 : 0;<br><br>Ra <- Ra - sext(1);<br><br>Used as part of loop. Following processing is performed:<br><br>(1) Transfer C3 to C2, and C4 to C3 and C6.<br><br>(2) Add -1 to Ra, and store result in Ra. Set 0 to C4 when Ra becomes smaller than 0.<br><br>(3) Branch to address specified by TAR. Fill branch instruction buffer with branch target instruction, if there is no branch target instruction filled in branch instruction buffer. |||
|---|---|---|---|
| Assembler mnemonic | Format | Affecting flag | Affected flag |
| jloop C6,C2:C4,TAR,Ra | 32bit synonym | C2,C4,C6,C3 | – |
| Remarks ||||
|  ||||

Fig. 69 settar C6,C2:C4,D9

| Behavior | TAR <- PC + (sext(D9[8:1]) <<1 );<br><br>C2 <- 0; C3 <- 0; C4 <- 1, C6 <- 1;<br><br>Following processing is performed:<br><br>(1) Store address resulted from adding PC value to displacement value (D9) into TAR.<br><br>(2) Fetch instruction corresponding to such address, and store it in branch instruction buffer.<br><br>(3) Set C4 and C6 to1, and C2 and C3 to 0. |
|---|---|
| Assembler mnemonic | Format | Affecting flag | Affected flag |
| settar C6,C2:C4,D9 | 32bit | C2,C4,C6,C3 | — |
| Remarks |||||
| D9 is a signed value whose lower 1 bit shall be 0. |||||

Fig.70A

```
                        settar  C6,C4,LO
A           LO :
B A                     [C4]  A
C B A                   [C3]  B
  C B A                 [C2]  C
    C B                 [C6]  jloop
      C
```

Fig.70B

```
Flag         C4 C3 C2 C6
Instruction  A  B  C  jloop 1  0  0  1      A
             1  1  0  1      B A
             1  1  1  1      C B A
             1  1  1  1        C B A
             0  1  1  1          C B
             0  0  1  1            C
```

Fig.71

```
int x[100], y[100];

int func(int a, int b, int c)
[
    int i:

for (i = 0;i<100; i++){
        y[i] = a* x[i]+b+i:
    }
    return t;
}
```

Fig. 72

```
        mov     r6, 0
        ld      r10, (gp, _x$ - .MN.gptop)
        cmpne   C3, gp, gp          //Set flag
        ;;
        mov     r4, 98
        settar  C6, L00014
        cmpne   C4, gp, gp          //Set flag ld      r9, (gp, _y$ - .MN.gptop)
        cmpne   C5, gp, gp          //Set flag
        ;;
L00014                              //3cycle/iterartion
[C4]    add     r5, r8, r6
[C5]    mac     m0, r8, r7, r0, r1
[C6]    ld      r7, (r10+)
        ;;
[C4]    add     r6, r6, 1
[C4]    st      (r9+), r5
        movcf   C3, C5, C7, C7      // Move flag   C3<-C5
        ;;
        movcf   C4, C5, C5, C6      // Move flags  C4<-C5, C5<-C6 cmpeq   C4, gp, gp          //This instruction required
[C3]    jloop   C6, tar, r4, -1     //L00014
        ;;
        ret
```

Fig. 73

```
        mov     r6, 0
        ld      r10, (gp, _x$ - .MN.gptop)
        ;;
        mov     r4, 98
        settar  C6, C4:C2, L00014
        ld      r9, (gp, _y$ - .MN.gptop)
        ;;
L00014                                  //2cycle/iterartion
[C2]    add     r5, r8, r6
[C3]    mac     m0, r8, r7, r0, r1
[C4]    ld      r7, (r10+)
        ;;
[C2]    add     r6, r6, 1
[C2]    st      (r9+), r5
[C6]    jloop   C6, tar, r4, -1    //L00014
        ;;
        ret
        ;;
```

Fig. 75A

| Assembler Mnemonic | vsada Rc,Ra,Rb,Rx |
|---|---|
| Behavior | Rc <- Rx + sext(abs(uext9[Rb[31:24]]-uext9(Ra[31:24]))<br>+ abs (uext9[Rb[23:16]] − uext9(Ra[23:16]))<br>+ abs (uext9[Rb[15: 8]] − uext9(Ra[15: 8]))<br>+ abs (uext9[Rb[ 7: 0]] − uext9(Ra[ 7: 0]))) |

Fig. 75B

| Assembler Mnemonic | vsada Rc,Ra,Rb |
|---|---|
| Behavior | Rc <- sext(abs(uext9[Rb[31:24]]-uext9(Ra[31:24]))<br>+ abs (uext9[Rb[23:16]] − uext9(Ra[23:16]))<br>+ abs (uext9[Rb[15: 8]] − uext9(Ra[15: 8]))<br>+ abs (uext9[Rb[ 7: 0]] − uext9(Ra[ 7: 0]))) |

Fig. 77A

| Assembler Mnemonic | satss Rc,Ra,Rb |
|---|---|
| Behavior | tmp <- (sext(Ra[31:31] & Rb ) ^ (Ra & Rb);<br>Rc <- Ra;<br>Rc <- Rb ^ (~sext(Ra[31:31])), if( tmp != 0x0000_0000 ); |

Fig. 77B

| Assembler Mnemonic | satsu Rc,Ra,Rb |
|---|---|
| Behavior | tmp <- (Ra & Rb);<br>Rc <- Ra;<br>Rc <- (~Rb) ^ (~sext(Ra[31:31])), if( tmp != 0x0000_0000 ); |

Fig. 79A

| Assembler Mnemonic | bytesel Rc,Ra,Rb,Rx |
|---|---|
| Behavior | Rc[31:24] <- ((Ra:Rb) >>> (Rx[11:9] << 3))[7:0];<br>Rc[23:16] <- ((Ra:Rb) >>> (Rx[ 8: 6] << 3))[7:0];<br>Rc[15:8] <- ((Ra:Rb) >>> (Rx[ 5: 3] << 3))[7:0];<br>Rc[ 7: 0] <- ((Ra:Rb) >>> (Rx[ 2: 0] << 3))[7:0]; |

Fig. 79B

| Rx[n+2:n] | Byte data to be selected |
|---|---|
| 000 | Select first byte (Ra:Rb[63:56]) of Ra |
| 001 | Select second (Ra:Rb[55:48]) of Ra |
| 010 | Select third byte (Ra:Rb[47:40]) of Ra |
| 011 | Select fourth byte (Ra:Rb[39:32]) of Ra |
| 100 | Select first byte (Ra:Rb[31:24]) of Rb |
| 101 | Select second (Ra:Rb[23:16]) of Rb |
| 110 | Select third byte (Ra:Rb[15:8]) of Rb |
| 111 | Select fourth byte (Ra:Rb[7:0]) of Rb |

Fig. 79C

| Assembler Mnemonic | bytesel Rc,Ra,Rb,I12 |
|---|---|
| Behavior | Rc[31:24] <- ((Ra:Rb) >>> (I12[11:9] << 3))[7:0];<br>Rc[23:16] <- ((Ra:Rb) >>> (I12[ 8: 6] << 3))[7:0];<br>Rc[15:8] <- ((Ra:Rb) >>> (I12[ 5: 3] << 3))[7:0];<br>Rc[ 7: 0] <- ((Ra:Rb) >>> (I12[ 2: 0] << 3))[7:0]; |

Fig. 79D

| I12[n+2:n] | Byte data to be selected |
|---|---|
| 000 | Select first byte (Ra:Rb[63:56]) of Ra |
| 001 | Select second byte (Ra:Rb[55:48]) of Ra |
| 010 | Select third byte (Ra:Rb[47:40]) of Ra |
| 011 | Select fourth byte (Ra:Rb[39:32]) of Ra |
| 100 | Select first byte (Ra:Rb[31:24]) of Rb |
| 101 | Select second byte (Ra:Rb[23:16]) of Rb |
| 110 | Select third byte (Ra:Rb[15:8]) of Rb |
| 111 | Select fourth byte (Ra:Rb[7:0]) of Rb |

PROCESSOR EXECUTING SIMD INSTRUCTIONS

This application is a divisional of application Ser. No. 10/668,358, filed Sep. 24, 2003 now U.S. Pat. No. 7,281,117.

BACKGROUND OF THE INVENTION (1) Field of the Invention

The present invention relates to a processor such as a DSP and a CPU, and more particularly to a processor suitable for performing signal processing for sounds, images and others.

(2) Description of the Related Art

With the development in multimedia technologies, processors are increasingly required to be capable of high-speed media processing represented by sound and image signal processing. As existing processors responding to such requirement, there exist Pentium (R)/Pentium (R) III/Pentium 4 (R) MMX/SSE/SSE2 and others produced by the Intel Corporation of the United States supporting SIMD (Single Instruction Multiple Data) instructions. Of them, MMX, for example, is capable of performing the same operations in one instruction on a maximum of eight integers stored in a 64-bit MMX register.

However, there is a problem that such existing processors do not fully satisfy a wide range of requirements concerning media processing.

For example, although capable of operating on multiple data elements in a single instruction and comparing multiple data elements in a single instruction, the existing processors cannot evaluate the results of such comparisons in a single instruction. For example, an existing processor is capable of comparing two data elements stored in 32-bit registers on a byte-by-byte basis, and setting comparison results to four flags. However, it cannot make a judgment on whether all values of these four flags are zero or not in one instruction. For this reason, the processor needs to read out all four flags and execute more than one instruction for judging whether all such values are zero or not. This requires a plurality of instructions for evaluating results every time a comparison is made against another set of pixel values when four pixel values are used as a unit of comparison, resulting in an increased number of instructions and therefore a decreased speed of image processing.

SUMMARY OF THE INVENTION

The present invention has been conceived in view of the above problem, and it is an object of this invention to provide a processor capable of executing sophisticated SIMD operations and a processor capable of high-speed digital signal processing suited for multimedia purposes.

As is obvious from the above explanation, the processor according to the present invention is capable of executing a characteristic SIMD instruction for judging whether or not results of operations performed under a SIMD compare instruction are all zero and setting such results to condition flags. This allows a faster extraction of results of SIMD compare instructions (especially, agreement/disagreement of results), as well as a faster comparison processing to be performed on more than one pixel value as a processing unit and a faster detection of the EOF (End Of File) of a file.

Moreover, the processor according to the present invention is capable of executing a characteristic instruction for storing, into a memory and the like, two pieces of byte data stored in one register (byte data stored in the higher 16 bits and byte data stored in the lower 16 bits). This eliminates the need for data type conversions when byte data is handled in 16-bit SIMD, making a speed of processing faster.

Furthermore, the processor according to the present invention is capable of executing a characteristic instruction for storing an immediate value into the higher 16 bits of a register without changing the lower 16 bits of the register. This instruction, when combined with Instruction "mov Rb, I16", makes it possible for a 32-bit immediate value to be set in a register.

Also, the processor according to the present invention is capable of executing a characteristic instruction for making a switch of objects to be added, depending on the value of a vector condition flag. This makes it possible for a single program to support half-pel motion compensation (motion compensation performed on a per-half-pixel basis) regardless of whether pixels are integer pixels or half pixels.

Moreover, the processor according to the present invention is capable of executing a characteristic instruction for generating a value depending on the sign (positive/negative) of the value held in a register and whether a value held in a register is zero or not. This makes inverse quantization faster in image processing, since 1 is outputted when a certain value is positive, −1 when negative, and 0 when 0.

Furthermore, the processor according to the present invention is capable of executing a characteristic instruction for aligning word data and extracting different word data depending on a vector condition flag. This instruction makes it possible for a single program to support half-pel motion compensation (motion compensation performed on a per-half-pixel basis) regardless of whether pixels are integer pixels or half pixels.

Also, the processor according to the present invention is capable of executing a characteristic instruction for adding two values and further adding 1 when one of the two values is positive. This realizes a faster rounding of an absolute value in image processing.

Moreover, the processor according to the present invention is capable of executing a characteristic instruction for moving values held in arbitrary two registers to two consecutive registers. Since values held in independent two registers are moved in one cycle under this instruction, an effect of reducing the number of cycles in a loop can be achieved. Also, this instruction, which does not involve register renaming (destruction of a register value), is effective when data is moved between loop generations (iterations).

Furthermore, the processor according to the present invention is capable of executing a characteristic instruction for performing branches and setting condition flags (predicates, here) in a loop. This enables a loop to be executed faster by means of PROLOG/EPILOG removal software pipelining.

Also, the processor according to the present invention is capable of executing a characteristic instruction for determining a sum of absolute value differences. This makes the speed faster for summing up absolute value differences in motion prediction as part of image processing.

Moreover, the processor according to the present invention is capable of executing a characteristic instruction for converting a signed value into a saturated signed value at an arbitrary position (digit). This facilitates programming since there is no need for setting a position where saturation is performed to a specific position at the time of assembler programming.

Furthermore, the processor according to the present invention is capable of executing a characteristic instruction for selecting one of the values held in two registers on a word-by-word basis. This allows word data to be stored at an arbitrary position in a register, and therefore enables faster repetitions of data reshuffling. Moreover, this instruction has an effect of increasing the flexibility of SIMD operations.

Also, the processor according to the present invention is capable of executing a characteristic instruction for extending results of a SIMD operation. This allows processing for making data size all the same by performing sign extension or zero extension to be performed in one cycle, after performing the SIMD operations.

Moreover, the processor according to the present invention is capable of executing a characteristic instruction for executing SIMD operations specified by condition flags and the like. This makes it possible for a single program to perform such dynamic processing as one in which the types of operations to be performed are determined depending on results of other processing.

As described above, the processor according to the present invention is capable of performing sophisticated SIMD operations and a wide range of digital signal processing required for multimedia processing at a high speed, and is capable of being employed as a core processor to be commonly used in mobile phone, mobile AV device, digital television, DVD and other devices, the processor according to the present invention is extremely useful in the present age in which the advent of high-performance and cost effective multimedia apparatuses is desired.

Note that it possible to embody the present invention not only as a processor executing the above-mentioned characteristic instructions, but also as an operation processing method intended for a plurality of data elements and the like, and as a program including such characteristic instructions. Also, it should be understood that such a program can be distributed via a recording medium including a CD-ROM and the like as well as via a transmission medium including the internet and the like.

For further information about the technical background to this application, Japanese patent application No. 2002-280077 filed Sep. 25, 2002, is incorporated herein by reference.

BRIEF DESCRIPTION OF THE DRAWINGS

These and other subjects, advantages and features of the invention will become apparent from the following description thereof taken in conjunction with the accompanying drawings that illustrate a specific embodiment of the invention. In the Drawings:

FIG. 11 is a diagram showing a configuration of a program status register (PSR) of the processor.

FIG. 12 is a diagram showing a configuration of a condition flag register (CFR) of the processor.

FIGS. 13A and 13B are diagrams showing configurations of accumulators (M0, M1) of the processor.

FIG. 14 is a diagram showing a configuration of a program counter (PC) of the processor.

FIG. 15 is a diagram showing a configuration of a PC save register (IPC) of the processor.

FIG. 16 is a diagram showing a configuration of a PSR save register (IPSR) of the processor.

FIG. 21 is a diagram explaining an instruction belonging to a category "ALUadd (addition) system)".

FIG. 22 is a diagram explaining an instruction belonging to a category "ALUsub (subtraction) system)".

FIG. 23 is a diagram explaining an instruction belonging to a category "ALUlogic (logical operation) system and others".

FIG. 24 is a diagram explaining an instruction belonging to a category "CMP (comparison operation) system".

FIG. 25 is a diagram explaining an instruction belonging to a category "mul (multiplication) system".

FIG. 26 is a diagram explaining an instruction belonging to a category "mac (sum of products operation) system".

FIG. 27 is a diagram explaining an instruction belonging to a category "msu (difference of products) system".

FIG. 28 is a diagram explaining an instruction belonging to a category "MEMld (load from, memory) system".

FIG. 29 is a diagram explaining an instruction belonging to a category "MEMstore (store in memory) system".

FIG. 30 is a diagram explaining an instruction belonging to a category "BRA (branch) system".

FIG. 31 is a diagram explaining an instruction belonging to a category "BSasl (arithmetic barrel shift) system and others".

FIG. 32 is a diagram explaining an instruction belonging to a category "BSlsr (logical barrel shift) system and others".

FIG. 33 is a diagram explaining an instruction belonging to a category "CNVvaln (arithmetic conversion) system".

FIG. 34 is a diagram explaining an instruction belonging to a category "CNV (general conversion) system".

FIG. 35 is a diagram explaining an instruction belonging to a category "SATvlpk (saturation processing) system".

FIG. 36 is a diagram explaining an instruction belonging to a category "ETC (et cetera) system".

FIG. 38 is a diagram showing a detailed behavior when executing Instruction "vcchk".

FIG. 40 is a diagram showing a detailed behavior when executing Instruction "stbh (Ra),Rb".

FIG. 42 is a diagram showing a detailed behavior when executing Instruction "stbhp (Ra),Rb:Rb+1".

FIG. 44 is a diagram showing a detailed behavior when executing Instruction "sethi Ra,I16".

FIG. 46 is a diagram showing a detailed behavior when executing Instruction "vaddhvc Rc,Ra,Rb".

FIG. 49 is a diagram showing a detailed behavior when executing Instruction "vaddrhvc Rc,Ra,Rb".

FIG. 51 is a diagram showing a detailed behavior when executing Instruction "vsgnh Ra,Rb".

FIG. 53 is a diagram showing a detailed behavior when executing Instruction "valnvc1 Rc,Ra,Rb".

FIG. 54 is a diagram showing a detailed behavior when executing Instruction "valnvc2 Rc,Ra,Rb".

FIG. 55 is a diagram showing a detailed behavior when executing Instruction "valnvc3 Rc,Ra,Rb".

FIG. 56 is a diagram showing a detailed behavior when executing Instruction "valnvc4 Rc,Ra,Rb".

FIG. 58 is a diagram showing a detailed behavior when executing Instruction "addarvw Rc,Rb,Ra".

FIG. 61 is a diagram showing a detailed behavior when executing Instruction "movp Rc:Rc+1,Ra,Rb".

FIG. 62 is a diagram showing a detailed behavior when executing Instruction "jloop C6,Cm,TAR,Ra".

FIG. 63 is a diagram showing a detailed behavior when executing Instruction "settar C6,Cm,D9".

FIG. 64 is a diagram showing PROLOG/EPILOG removal 2-stage software pipelining.

FIG. 65 is a diagram showing a list of a source program written in the C language.

FIG. 66 is a diagram showing an example machine language program created using ordinary instructions "jloop" and "settar".

FIG. 67 is a diagram showing an example machine language program created using Instructions "jloop" and "settar" according to the preferred embodiment of the present invention.

FIG. 68 is a diagram showing a detailed behavior when executing Instruction "jloop C6,C2: C4,TAR,Ra".

FIG. 69 is a diagram showing a detailed behavior when executing Instruction "settar C6,C2: C4,D9".

FIGS. 70A and 70B are diagrams showing PROLOG/EPILOG removal 3-stage software pipelining.

FIG. 71 is a diagram showing a list of a source program written in the C language.

FIG. 72 is a diagram showing an example machine language program created using ordinary instructions "jloop" and "settar".

FIG. 73 is a diagram showing an example machine language program created using Instructions "jloop" and "settar" according to the preferred embodiment of the present invention.

FIG. 75A is a diagram showing Instruction "vsada Rc,Ra,Rb,Rx", and FIG. 75B is a diagram showing Instruction "vsada Rc,Ra,Rb".

FIG. 77A is a diagram showing Instruction "satss Rc,Ra,Rb" and FIG. 77B is a diagram showing Instruction "satsu Rc,Ra,Rb".

FIG. 79A is a diagram showing a detailed behavior when executing Instruction "bytesel Rc,Ra,Rb,Rx", FIG. 79B is a diagram showing a relationship between the register Rx and byte data to be selected, FIG. 79C is a diagram showing a detailed behavior when executing Instruction "bytesel Rc,Ra, Rb,I12", and FIG. 79D is a diagram showing a relationship between an immediate value I12 and byte data to be selected.

DESCRIPTION OF THE PREFERRED EMBODIMENT

An explanation is given for the architecture of the processor according to the present invention. The processor of the present invention is a general-purpose processor which has been developed targeting at the field of AV media signal processing technology, and instructions issued in this processor offer a higher degree of parallelism than ordinary microcomputers. Used as a core common to mobile phones, mobile AV devices, digital televisions, DVDs and other devices, the processor can improve software usability. Furthermore, the present processor allows multiple high-performance media processes to be performed with high cost effectiveness, and provides a development environment for high-level languages intended for improving development efficiency.

Figure 1:
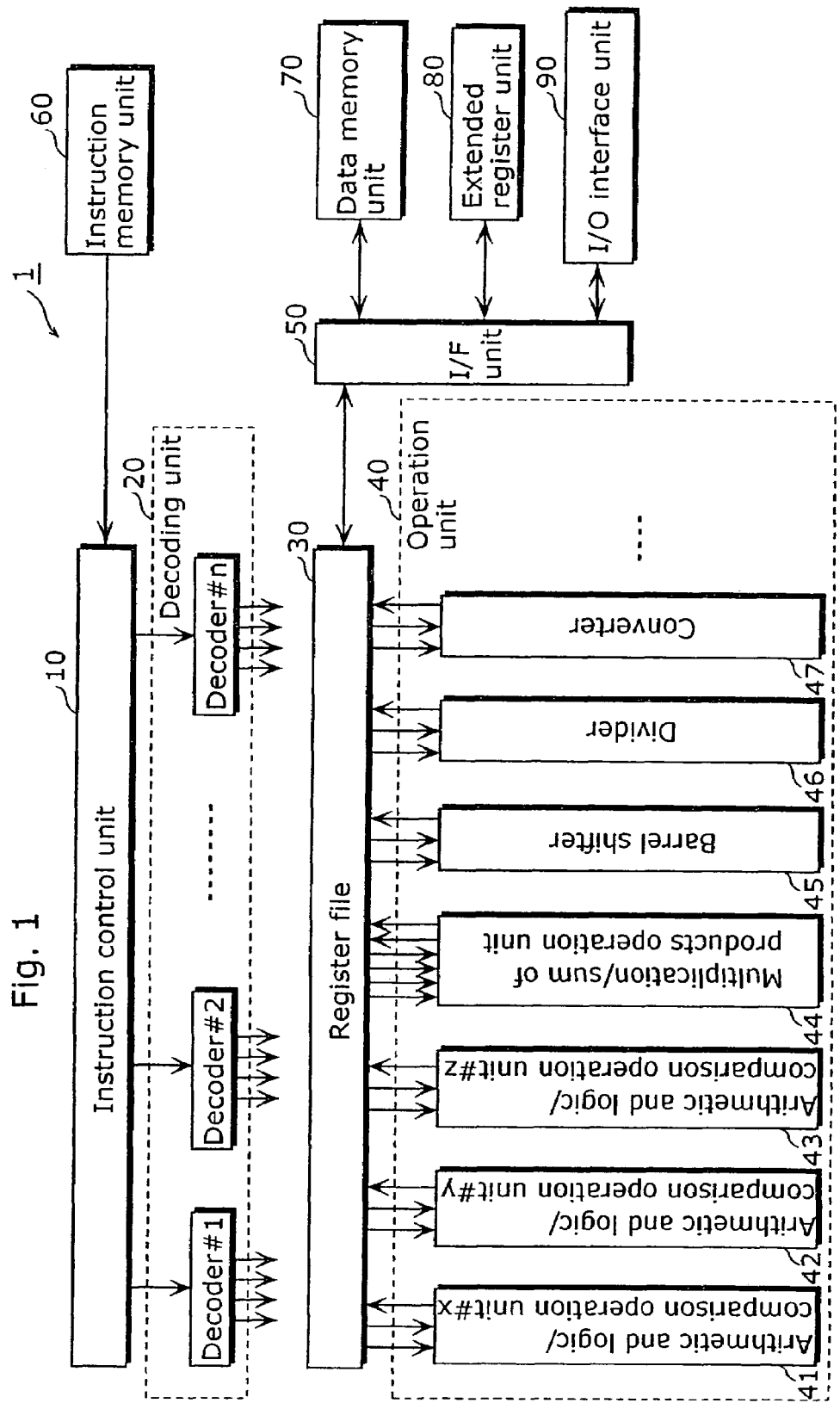
FIG. 1 is a schematic block diagram showing a processor according to the present invention.

FIG. 1 is a schematic block diagram showing the present processor. The processor 1 is comprised of an instruction control unit 10, a decoding unit 20, a register file 30, an operation unit 40, an I/F unit 50, an instruction memory unit 60, a data memory unit 70, an extended register unit 80, and an I/O interface unit 90. The operation unit 40 includes arithmetic and logic/comparison operation units 41~43, a multiplication/sum of products operation unit 44, a barrel shifter 45, a divider 46, and a converter 47 for performing SIMD instructions. The multiplication/sum of products operation unit 44 is capable of handling maximum of 65-bit accumulation so as not to decrease bit precision. The multiplication/sum of products operation unit 44 is also capable of executing SIMD instructions as in the case of the arithmetic and logic/comparison operation units 41~43. Furthermore, the processor 1 is capable of parallel execution of an arithmetic and logic/comparison operation instruction on a maximum of three data elements.

Figure 2:
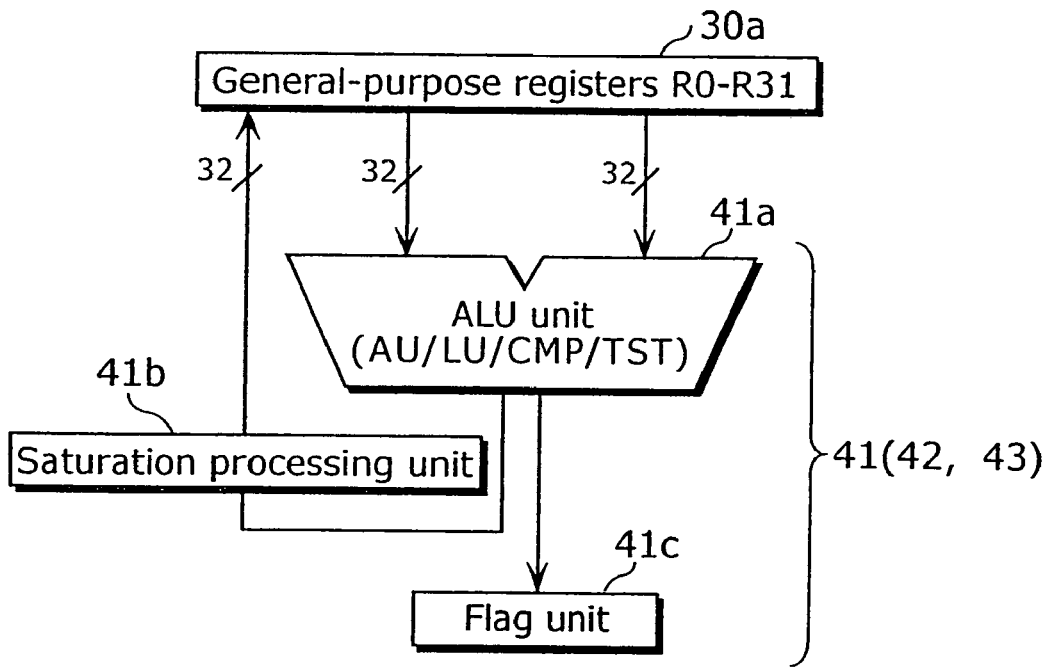
FIG. 2 is a schematic diagram showing arithmetic and logic/comparison operation units of the processor.

FIG. 2 is a schematic diagram showing the arithmetic and logic/comparison operation units 41~43. Each of the arithmetic and logic/comparison operation units 41~43 is made up of an ALU unit 41a, a saturation processing unit 41b, and a flag unit 41c. The ALU unit 41a includes an arithmetic operation unit, a logical operation unit, a comparator, and a TST. The bit widths of operation data to be supported are 8 bits (use four operation units in parallel), 16 bits (use two operation units in parallel) and 32 bits (process 32-bit data using all operation units). For a result of an arithmetic operation, the flag unit 41c and the like detects an overflow and generates a condition flag. For a result of each of the operation units, the comparator and the TST, an arithmetic shift right, saturation by the saturation processing unit 41b, the detection of maximum/minimum values, absolute value generation processing are performed.

Figure 3:
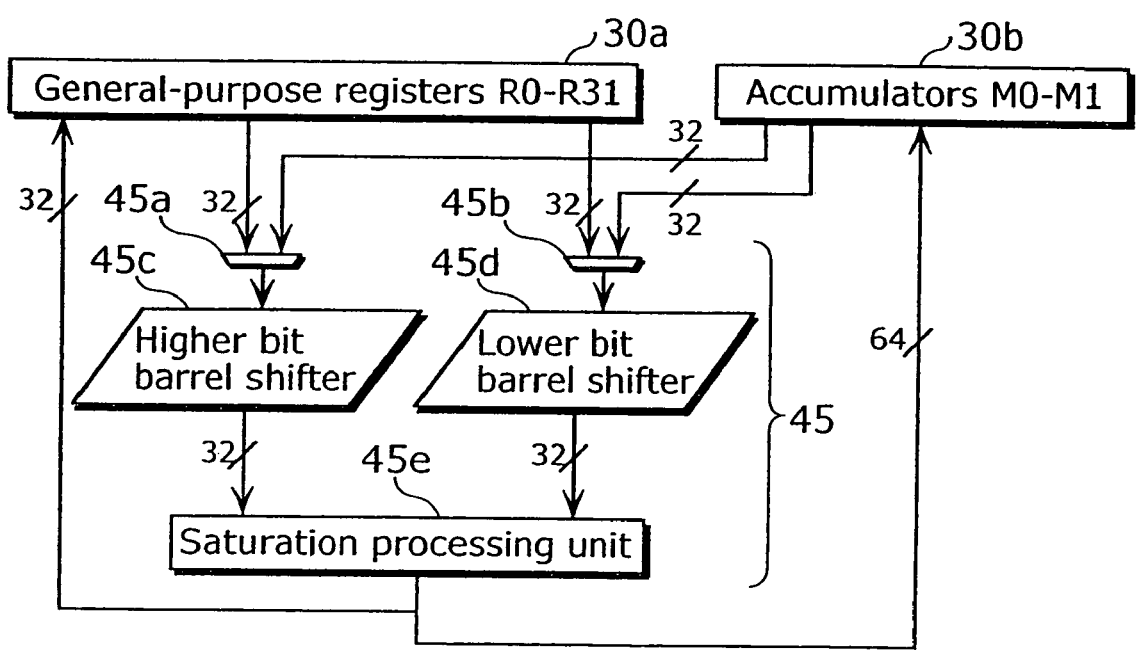
FIG. 3 is a block diagram showing a configuration of a barrel shifter of the processor.

FIG. 3 is a block diagram showing the configuration of the barrel shifter 45. The barrel shifter 45, which is made up of selectors 45a and 45b, a higher bit shifter 45c, a lower bit shifter 45d, and a saturation processing unit 45e, executes an arithmetic shift of data (shift in the 2's complement number system) or a logical shift of data (unsigned shift). Usually, 32-bit or 64-bit data are inputted to and outputted from the barrel shifter 45. The amount of shift of target data stored in the registers 30a and 30b are specified by another register or according to its immediate value. An arithmetic or logical shift in the range of left 63 bits and right 63 bits is performed for the data, which is then outputted in an input bit length.

The barrel shifter 45 is capable of shifting 8-, 16-, 32-, and 64-bit data in response to a SIMD instruction. For example, the barrel shifter 45 can shift four pieces of 8-bit data in parallel.

Arithmetic shift, which is a shift in the 2's complement number system, is performed for aligning decimal points at the time of addition and subtraction, for multiplying a power of 2 (2, the $2^{nd}$ power of 2, the $-1^{st}$ power of 2) and other purposes.

Figure 4:
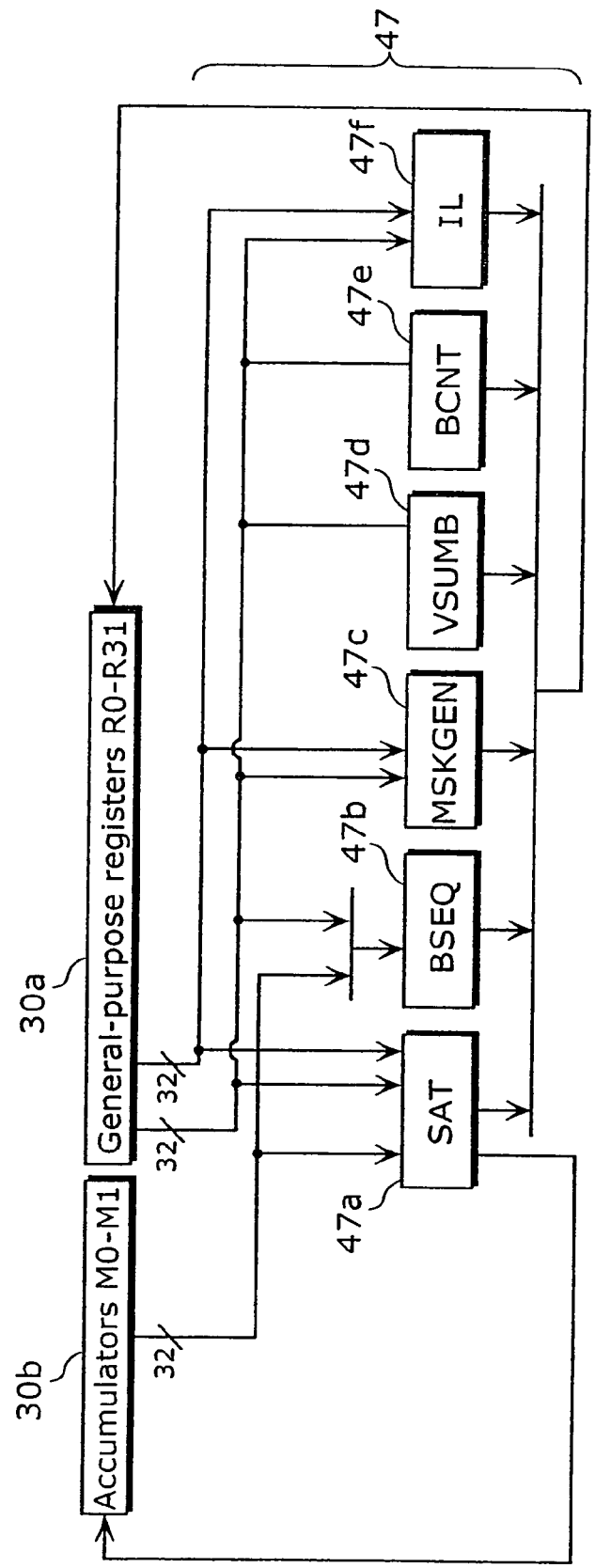
FIG. 4 is a block diagram showing a configuration of a converter of the processor.

FIG. 4 is a block diagram showing the configuration of the converter 47. The converter 47 is made up of a saturation block (SAT) 47a, a BSEQ block 47b, an MSKGEN block 47c, a VSUMB block 47d, a BCNT block 47e, and an IL block 47f.

The saturation block (SAT) 47a performs saturation processing for input data. Having two blocks for the saturation processing of 32-bit data makes it possible to support a SIMD instruction executed for two data elements in parallel.

The BSEQ block 47b counts consecutive 0s or 1s from the MSB.

The MSKGEN block 47c outputs a specified bit segment as 1, while outputting the others as 0.

The VSUMB block 47d divides the input data into specified bit widths, and outputs their total sum.

The BCNT block 47e counts the number of bits in the input data specified as 1.

The IL block 47f divides the input data into specified bit widths, and outputs a value which resulted from exchanging the position of each data block.

Figure 5:
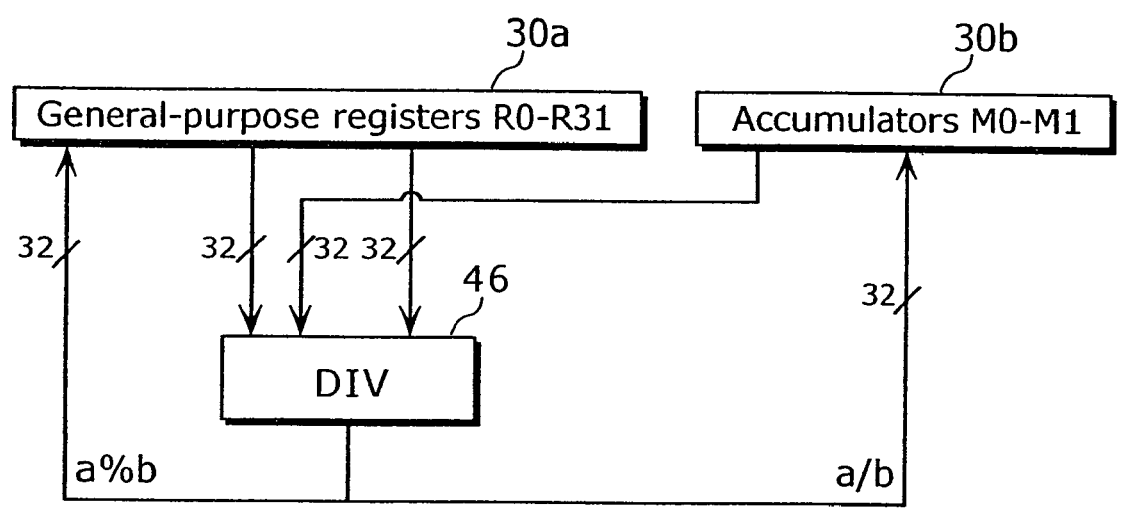
FIG. 5 is a block diagram showing a configuration of a divider of the processor.

FIG. 5 is a block diagram showing the configuration of the divider 46. Letting a dividend be 64 bits and a divisor be 32 bits, the divider 46 outputs 32 bits as a quotient and a modulo, respectively. 34 cycles are involved for obtaining a quotient and a modulo. The divider 46 can handle both singed and unsigned data. Note, however, that an identical setting is made concerning the presence/absence of signs of data serving as a dividend and a divisor. Also, the divider 46 has the capability of outputting an overflow flag, and a 0 division flag.

Figure 6:
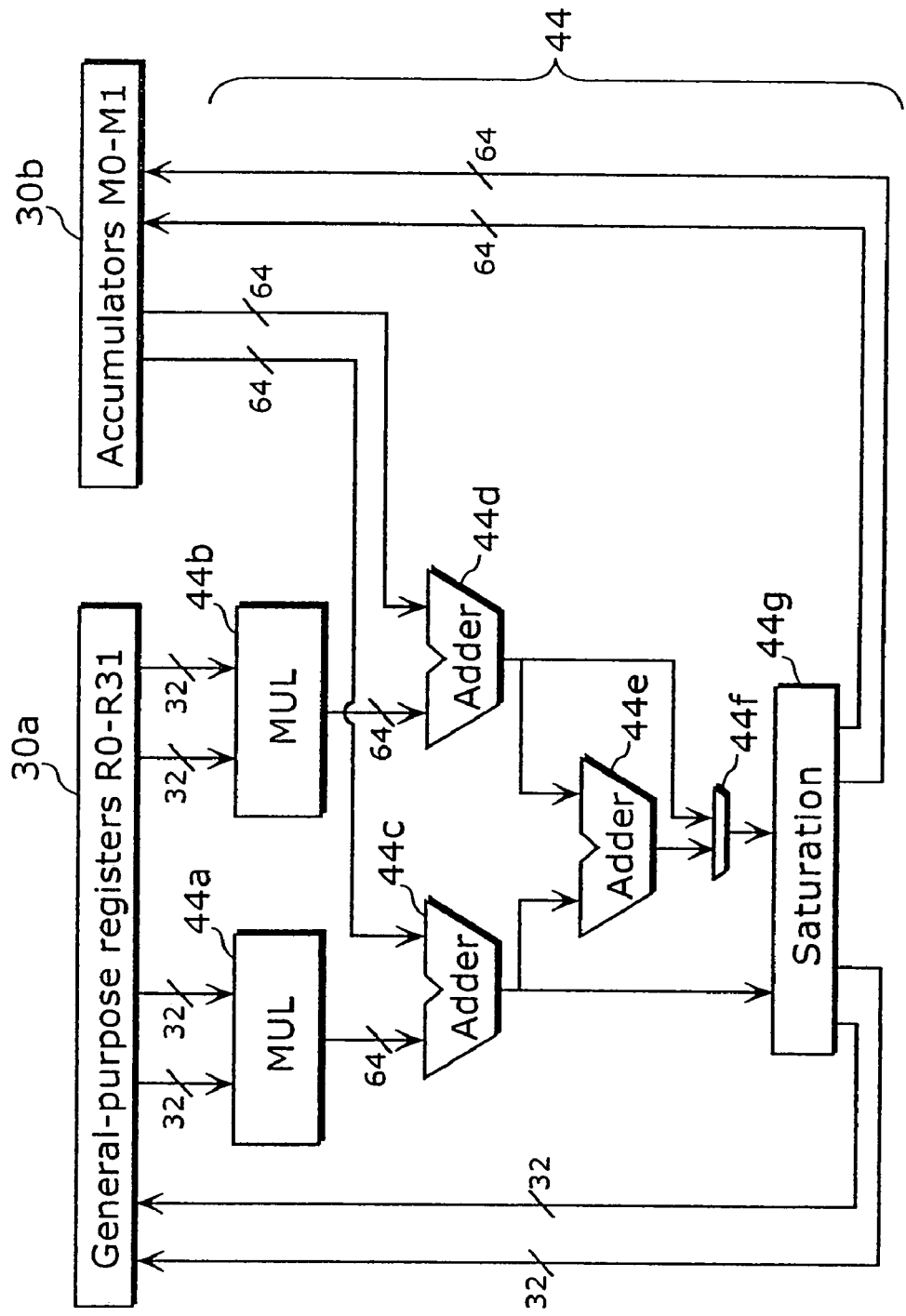
FIG. 6 is a block diagram showing a configuration of a multiplication/sum of products operation unit of the processor.

FIG. 6 is a block diagram showing the configuration of the multiplication/sum of products operation unit 44. The multiplication/sum of products operation unit 44, which is made up of two 32-bit multipliers (MUL) 44a and 44b, three 64-bit adders (Adder) 44c~44e, a selector 44f and a saturation processing unit (Saturation) 44g, performs the following multiplications and sums of products:

32×32-bit signed multiplication, sum of products, and difference of products;
32×32-bit unsigned multiplication;
16×16-bit signed multiplication, sum of products, and difference of products performed on two data elements in parallel; and
32×16-bit t signed multiplication, sum of products, and difference of products performed on two data elements in parallel;

The above operations are performed on data in integer and fixed point format (h1, h2, w1, and w2). Also, the results of these operations are rounded and saturated.

Figure 7:
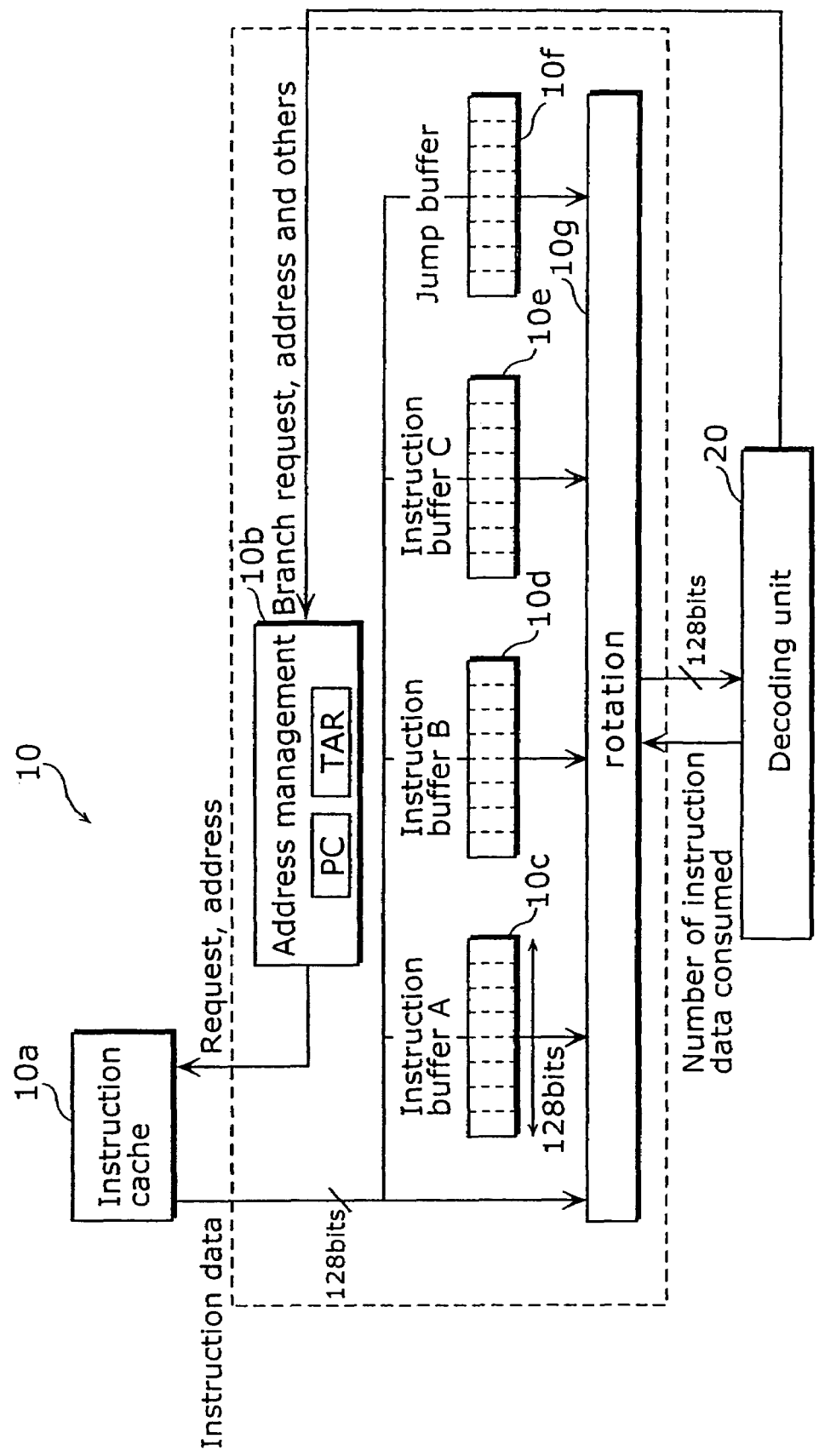
FIG. 7 is a block diagram showing a configuration of an instruction control unit of the processor.

FIG. 7 is a block diagram showing the configuration of the instruction control unit 10. The instruction control unit 10, which is made up of an instruction cache 10a, an address management unit 10b, instruction buffers 10c~10e, a jump buffer 10f, and a rotation unit (rotation) 10g, issues instructions at ordinary times and at branch points. Having three 128-bit instruction buffers (the instruction buffers 10c~10e) makes it possible to support the maximum number of parallel instruction execution. Regarding branch processing, the instruction control unit 10 stores in advance a branch target instruction into the jump buffer 10f and stores a branch target address into the below-described TAR register before performing a branch (settar instruction). Thus, the instruction control unit 10 performs the branch using the branch target address stored in the TAR register and the branch target instruction stored in the jump buffer 10f.

Note that the processor 1 is a processor employing the VLIW architecture. The VLIW architecture is an architecture allowing a plurality of instructions (e.g. load, store, operation, and branch) to be stored in a single instruction word, and such instructions are to be executed all at once. By programmers describing a set of instructions which can be executed in parallel as a single issue group, it is possible for such issue group to be processed in parallel. In this specification, the delimiter of an issue group is indicated by ";;" Notational examples are described below.

EXAMPLE 1 mov r1, 0x23;;
This instruction description indicates that only an instruction "mov" shall be executed.

EXAMPLE 2 mov r1, 0x38
add r0, r1, r2
sub r3, r1, r2;;
These instruction descriptions indicate that three instructions of "mov", "add" and "sub" shall be executed in parallel.

The instruction control unit 10 identifies an issue group and sends it to the decoding unit 20. The decoding unit 20 decodes the instructions in the issue group, and controls resources required for executing such instructions.

Next, an explanation is given for registers included in the processor 1.

Table 1 below lists a set of registers of the processor 1.

TABLE 1

| Register name | Bit width | No. of registers | Usage |
| --- | --- | --- | --- |
| R0~R31 | 32 bits | 32 | General-purpose registers. Used as data memory pointer, data storage and the like when operation instruction is executed. |
| TAR | 32 bits | 1 | Branch register. Used as branch address storage at branch point. |
| LR | 32 bits | 1 | Link register. |
| SVR | 16 bits | 2 | Save register. Used for saving condition flag (CFR) and various modes. |
| M0~M1 (MH0:ML0~MH1~ML1) | 64 bits | 2 | Operation registers. Used as data storage when operation instruction is executed. |

Table 2 below lists a set of flags (flags managed in a condition flag register and the like described later) of the processor 1.

TABLE 2

| Flag name | Bit width | No. of flags | Usage |
| --- | --- | --- | --- |
| C0~C7 | 1 | 8 | Condition flags. Indicate if condition is established or not. |
| VC0~VC3 | 1 | 4 | Condition flags for media processing extension instruction. Indicate if condition is established or not. |
| OVS | 1 | 1 | Overflow flag. Detects overflow at the time of operation. |
| CAS | 1 | 1 | Carry flag. Detects carry at the time of operation. |
| BPO | 5 | 1 | Specifies bit position. Specifies bit positions to be processed when mask processing instruction is executed. |
| ALN | 2 | 1 | Specified byte alignment. |
| FXP | 1 | 1 | Fixed point operation mode. |
| UDR | 32 | 1 | Undefined register. |

Figure 8:
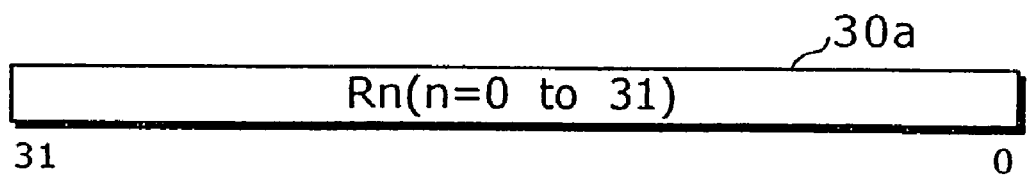
FIG. 8 is a diagram showing a configuration of general-purpose registers (R0~R31) of the processor.

FIG. 8 is a diagram showing the configuration of the general-purpose registers (R0~R31) 30a. The general-purpose registers (R0~R31) 30a are a group of 32-bit registers that constitute an integral part of the context of a task to be executed and that store data or addresses. Note that the general-purpose registers R30 and R31 are used by hardware as a global pointer and a stack pointer, respectively.

Figure 9:
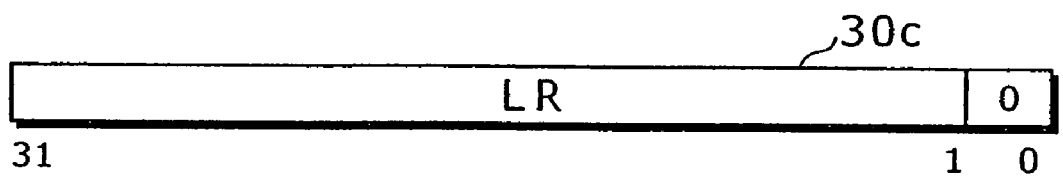
FIG. 9 is a diagram showing a configuration of a link register (LR) of the processor.

FIG. 9 is a diagram showing the configuration of a link register (LR) 30c. In connection with this link register (LR) 30c, the processor 1 also has a save register (SVR) not illustrated in the diagram. The link register (LR) 30c is a 32-bit register for storing a return address at the time of a function call. Note that the save register (SVR) is a 16-bit register for saving a condition flag (CFR.CF) of the condition flag register at the time of a function call. The link register (LR) 30c is used also for the purpose of increasing the speed of loops, as in the case of a branch register (TAR) to be explained later. 0 is always read out as the lower 1 bit, but 0 must be written at the time of writing.

For example, when "call (brl, jmpl)" instructions are executed, the processor 1 saves a return address in the link register (LR) 30c and saves a condition flag (CFR.CF) in the save register (SVR). When "jmp" instruction is executed, the processor 1 fetches the return address (branch target address) from the link register (LR) 30c, and restores a program counter (PC). Furthermore, when "ret (jmpr)" instruction is executed, the processor 1 fetches the branch target address (return address) from the link register (LR) 30c, and stores (restores) it in/to the program counter (PC). Moreover, the processor 1 fetches the condition flag from the save register (SVR) so as to store (restore) it in/to a condition flag area CFR.CF in the condition flag register (CFR) 32.

Figure 10:
FIG. 10 is a diagram showing a configuration of a branch register (TAR) of the processor.

FIG. 10 is a diagram showing the configuration of the branch register (TAR) 30d. The branch register (TAR) 30d is a 32-bit register for storing a branch target address, and is used mainly for the purpose of increasing the speed of loops. 0 is always read out as the lower 1 bit, but 0 must be written at the time of writing.

For example, when "jmp" and "jloop" instructions are executed, the processor 1 fetches a branch target address from the branch register (TAR) 30d, and stores it in the program counter (PC). When the instruction indicated by the address stored in the branch register (TAR) 30d is stored in a branch instruction buffer, a branch penalty will be 0. An increased loop speed can be achieved by storing the top address of a loop in the branch register (TAR) 30d.

FIG. 11 is a diagram showing the configuration of a program status register (PSR) 31. The program status register (PSR) 31, which constitutes an integral part of the context of a task to be executed, is a 32-bit register for storing the following processor status information:

Bit SWE: indicates whether the switching of VMP (Virtual Multi-Processor) to LP (Logical Processor) is enabled or disabled. "0" indicates that switching to LP is disabled and "1" indicates that switching to LP is enabled.

Bit FXP: indicates a fixed point mode. "0" indicates the mode 0 and "1" indicates the mode 1.

Bit IH: is an interrupt processing flag indicating that maskable interrupt processing is ongoing or not. "1" indicates that there is an ongoing interrupt processing and "0" indicates that there is no ongoing interrupt processing. This flag is automatically set on the occurrence of an interrupt. This flag is used to make a distinction of whether interrupt processing or program processing is taking place at a point in the program to which the processor returns in response to "rti" instruction.

Bit EH: is a flag indicating that an error or an NMI is being processed or not. "0" indicates that error/NMI interrupt processing is not ongoing and "1" indicates that error/NMI interrupt processing is ongoing. This flag is masked if an asynchronous error or an NMI occurs when EH=1. Meanwhile, when VMP is enabled, plate switching of VMP is masked.

Bit PL [1:0]: indicates a privilege level. "00" indicates the privilege level 0, i.e., the processor abstraction level, "01" indicates the privilege level 1 (non-settable), "10" indicates the privilege level 2, i.e., the system program level, and "11" indicates the privilege level 3, i.e., the user program level.

Bit LPIE3: indicates whether LP-specific interrupt 3 is enabled or disabled. "1" indicates that an interrupt is enabled and "0" indicates that an interrupt is disabled.

Bit LPIE2: indicates whether LP-specific interrupt 2 is enabled or disabled. "1" indicates that an interrupt is enabled and "0" indicates that an interrupt is disabled.

Bit LPIE1: indicates whether LP-specific interrupt 1 is enabled or disabled. "1" indicates that an interrupt is enabled and "0" indicates that an interrupt is disabled.

Bit LPIE0: indicates whether LP-specific interrupt 0 is enabled or disabled. "1" indicates that an interrupt is enabled and "0" indicates that an interrupt is disabled.

Bit AEE: indicates whether a misalignment exception is enabled or disabled. "1" indicates that a misalignment exception is enabled and "0" indicates that a misalignment exception is disabled.

Bit IE: indicates whether a level interrupt is enabled or disabled. "1" indicates that a level interrupt is enabled and "0" indicates a level interrupt is disabled.

Bit IM [7:0]: indicates an interrupt mask, and ranges from levels 0~7, each being able to be masked at its own level. Level 0 is the highest level. Of interrupt requests which are not masked by any IMs, only the interrupt request with the highest level is accepted by the processor 1. When an interrupt request is accepted, levels below the accepted level are automatically masked by hardware. IM[0] denotes a mask of level 0, IM[1] a mask of level 1, IM[2] a mask of level 2, IM[3] a mask of level 3, IM[4] a mask of level 4, IM[5] a mask of level 5, IM[6] a mask of level 6, and IM[7] a mask of level 7.

reserved: indicates a reserved bit. 0 is always read out. 0 must be written at the time of writing.

FIG. 12 is a diagram showing the configuration of the condition flag register (CFR) 32. The condition flag register (CFR) 32, which constitutes an integral part of the context of a task to be executed, is a 32-bit register made up of condition flags, operation flags, vector condition flags, an operation instruction bit position specification field, and a SIMD data alignment information field.

Bit ALN [1:0]: indicates an alignment mode. An alignment mode of "valnvc" instruction is set.

Bit BPO [4:0]: indicates a bit position. It is used in an instruction that requires a bit position specification.

Bit VC0~VC3: are vector condition flags. Starting from a byte on the LSB side or a half word through to the MSB side, each corresponds to a flag ranging from VC0 through to VC3.

Bit OVS: is an overflow flag (summary). It is set on the detection of saturation and overflow. If not detected, a value before the instruction is executed is retained. Clearing of this flag needs to be carried out by software.

Bit CAS: is a carry flag (summary). It is set when a carry occurs under "addc" instruction, or when a borrow occurs under "subc" instruction. If there is no occurrence of a carry under "addc" instruction, or a borrow under "subc" instruction, a value before the instruction is executed is retained. Clearing of this flag needs to be carried out by software.

Bit C0~C7: are condition flags. The value of the flag C7 is always 1. A reflection of a FALSE condition (writing of 0) made to the flag C7 is ignored.

reserved: indicates a reserved bit. 0 is always read out. 0 must be written at the time of writing.

FIGS. 13A and 13B are diagrams showing the configurations of accumulators (M0, M1) 30b. Such accumulators (M0, M1) 30b, which constitute an integral part of the context of a task to be executed, are made up of a 32-bit register MH0-MH1 (register for multiply and divide/sum of products (the higher 32 bits)) shown in FIG. 13A and a 32-bit register ML0-ML1 (register for multiply and divide/sum of products (the lower 32 bits)) shown in FIG. 13B.

The register MH0-MH1 is used for storing the higher 32 bits of operation results at the time of a multiply instruction, while used as the higher 32 bits of the accumulators at the time of a sum of products instruction. Moreover, the register MH0-MH1 can be used in combination with the general-purpose registers in the case where a bit stream is handled. Meanwhile, the register ML0-ML1 is used for storing the lower 32 bits of operation results at the time of a multiply instruction, while used as the lower 32 bits of the accumulators at the time of a sum of products instruction.

FIG. 14 is a diagram showing the configuration of a program counter (PC) 33. This program counter (PC) 33, which constitutes an integral part of the context of a task to be executed, is a 32-bit counter that holds the address of an instruction being executed.

FIG. 15 is a diagram showing the configuration of a PC save register (IPC) 34. This PC save register (IPC) 34, which constitutes an integral part of the context of a task to be executed is a 32-bit register.

FIG. 16 is a diagram showing the configuration of a PSR save register (IPSR) 35. This PSR save register (IPSR) 35, which constitutes an integral part of the context of a task to be executed, is a 32-bit register for saving the program status register (PSR) 31. 0 is always read out as a part corresponding to a reserved bit, but 0 must be written at the time of writing.

Next, an explanation is given for the memory space of the processor 1. In the processor 1, a linear memory space with a capacity of 4 GB is divided into 32 segments, and an instruction SRAM (Static RAM) and a data SRAM are allocated to 128-MB segments. With a 128-MB segment serving as one block, a target block to be accessed is set in a SAR (SRAM Area Register). A direct access is made to the instruction SRAM/data SRAM when the accessed address is a segment set in the SAR, but an access request shall be issued to a bus controller (BCU) when such address is not a segment set in the SAR. An on chip memory (OCM), an external memory, an external device, an I/O port and others are connected to the BUC. Data reading/writing from and to these devices is possible.

Figure 17:
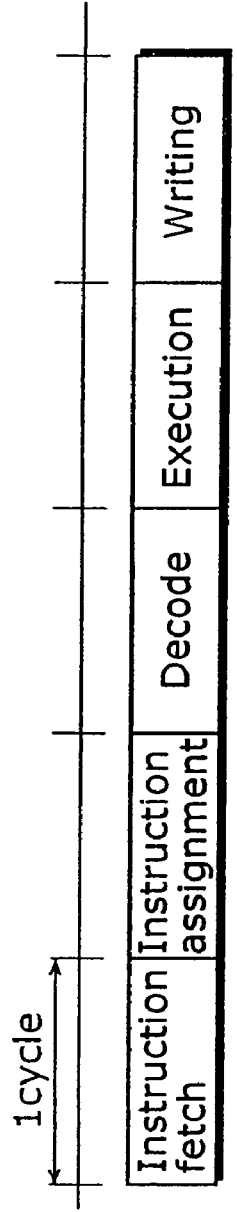
FIG. 17 is a timing diagram showing a pipeline behavior of the processor.

FIG. 17 is a timing diagram showing the pipeline behavior of the processor 1. As illustrated in the diagram, the pipeline of the processor 1 basically consists of the following five stages: instruction fetch; instruction assignment (dispatch); decode; execution; and writing.

Figure 18:
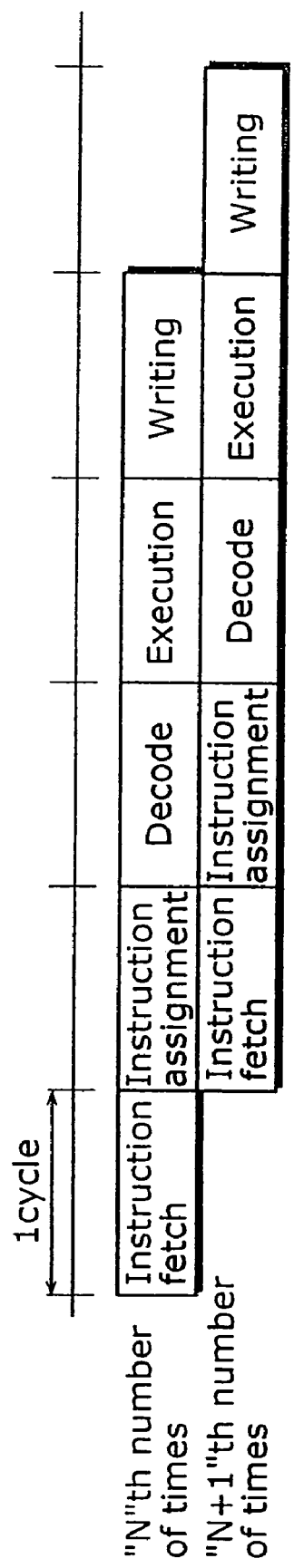
FIG. 18 is a timing diagram showing each stage of the pipeline behavior of the processor at the time of executing an instruction.

FIG. 18 is a timing diagram showing each stage of the pipeline behavior of the processor 1 at the time of executing an instruction. In the instruction fetch stage, an access is made to an instruction memory which is indicated by an address specified by the program counter (PC) 33, and the instruction is transferred to the instruction buffers 10c~10e and the like. In the instruction assignment stage, the output of branch target address information in response to a branch instruction, the output of an input register control signal, the assignment of a variable length instruction are carried out, which is followed by the transfer of the instruction to an instruction register (IR). In the decode stage, the IR is inputted to the decoding unit 20, and an operation unit control signal and a memory access signal are outputted. In the execution stage, an operation is executed and the result of the operation is outputted either to the data memory or the general-purpose registers (R0~R31) 30a. In the writing stage, a value obtained as a result of data transfer, and the operation results are stored in the general-purpose registers.

Figure 19:
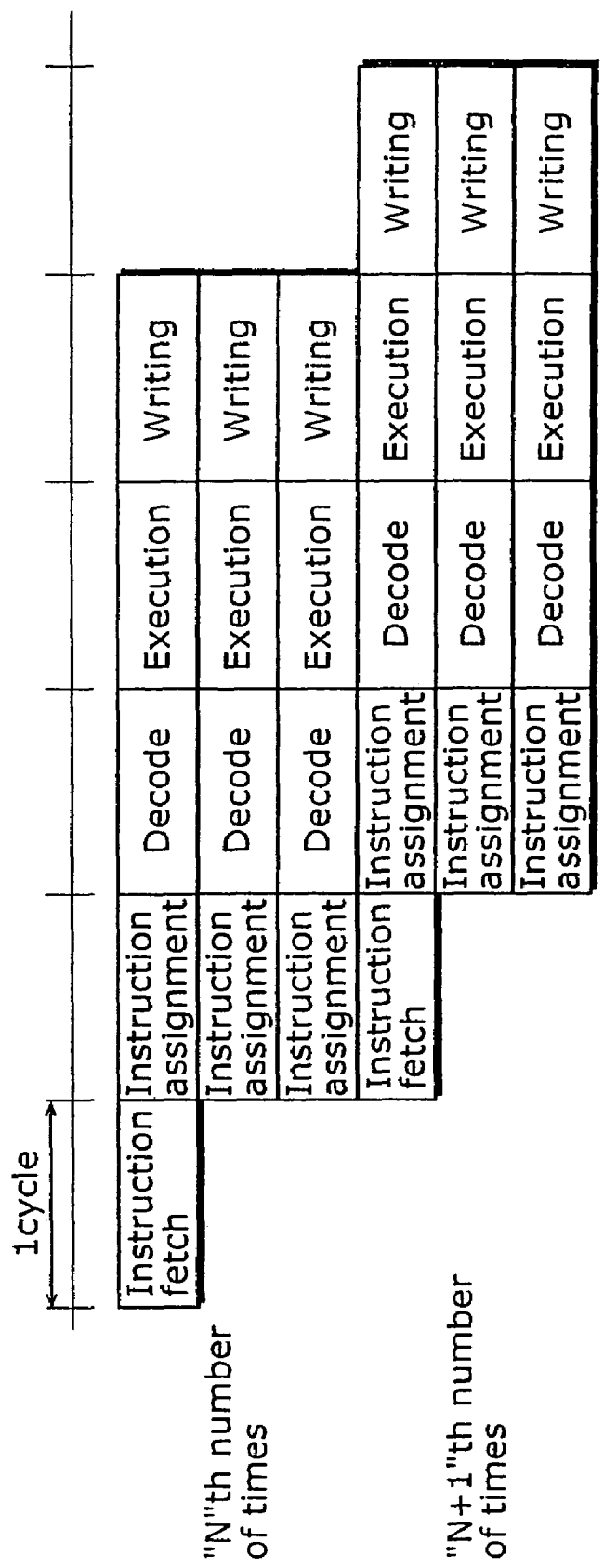
FIG. 19 is a diagram showing a parallel behavior of the processor.

The VLIW architecture of the processor 1 allows parallel execution of the above processing on a maximum of three data elements. Therefore, the processor 1 performs the behavior shown in FIG. 18 in parallel at the timing shown in FIG. 19.

Next, an explanation is given for a set of instructions executed by the processor 1 with the above configuration.

Tables 3~5 list categorized instructions to be executed by the processor 1.

TABLE 3

| Category | Operation unit | Instruction operation code |
|---|---|---|
| Memory transfer instruction (load) | M | ld, ldh, ldhu, ldb, ldbu, ldp, ldhp, ldbp, ldbh, ldbuh, ldbhp, ldbuhp |
| Memory transfer instruction (store) | M | st, sth, stb, stp, sthp, stbp, stbh, stbhp |
| Memory transfer instruction (others) | M | dpref, ldstb |
| External register transfer instruction | M | rd, rde, wt, wte |
| Branch instruction | B | br, brl, call, jmp, jmpl, jmpr, ret, jmpf, jloop, setbb, setlr, settar |
| Software interrupt instruction | B | rti, pi0, pi0l, pi1, pi1l, pi2, pi2l, pi3, pi3l, pi4, pi4l, pi5, pi5l, pi6, pi6l, pi7, pi7l, sc0, sc1, sc2, sc3, sc4, sc5, sc6, sc7 |
| VMP/interrupt control instruction | B | intd, inte, vmpsleep, vmpsus, vmpswd, vmpswe, vmpwait |
| Arithmetic operation instruction | A | abs, absvh, absvw, add, addarvw, addc, addmsk, adds, addsr, addu, addvh, addvw, neg, negvh, negvw, rsub, s1add, s2add, sub, subc, submsk, subs, subvh, subvw, max, min |
| Logical operation instruction | A | and, andn, or, sethi, xor, not |
| Compare instruction | A | cmpCC, cmpCCa, cmpCCn, cmpCCo, tstn, tstna, tstnn, tstno, tstz, tstza, tstzn, tstzo |
| Move instruction | A | mov, movcf, mvclcas, mvclovs, setlo, vcchk |
| NOP instruction | A | nop |
| Shift instruction1 | S1 | asl, aslvh, aslvw, asr, asrvh, asrvw, lsl, lsr, rol, ror |
| Shift instruction2 | S2 | aslp, aslpvw, asrp, asrpvw, lslp, lsrp |

TABLE 4

| Category | Operation unit | Instruction operation code |
|---|---|---|
| Extraction instruction | S2 | ext, extb, extbu, exth, exthu, extr, extru, extu |
| Mask instruction | C | msk, mskgen |
| Saturation instruction | C | sat12, sat9, satb, satbu, sath, satw |
| Conversion instruction | C | valn, valn1, valn2, valn3, valnvc1, valnvc2, valnvc3, valnvc4, vhpkb, vhpkh, vhunpkb, vhunpkh, vintlhb, vintlhh, vintllb, vintllh, vlpkb, vlpkbu, vlpkh, vlpkhu, vlunpkb, vlunpkbu, vlunpkh, vlunpkhu, vstovb, vstovh, vunpk1, vunpk2, vxchngh, vexth |
| Bit count instruction | C | bcnt1, bseq, bseq0, bseq1 |
| Others | C | byterev, extw, mskbrvb, mskbrvh, rndvh, movp |
| Multiply instruction1 | X1 | fmulhh, fmulhhr, fmulhw, fmulhww, hmul, lmul |
| Multiply instruction2 | X2 | fmulww, mul, mulu |
| Sum of products instruction1 | X1 | fmachh, fmachhr, fmachw, fmachww, hmac, lmac |
| Sum of products instruction2 | X2 | fmacww, mac |
| Difference of products instruction1 | X1 | fmsuhh, fmsuhhr, fmsuhw, fmsuww, hmsu, lmsu |
| Difference of products instruction2 | X2 | fmsuww, msu |
| Divide instruction | DIV | div, divu |
| Debugger instruction | DBGM | dbgm0, dbgm1, dbgm2, dbgm3 |

TABLE 5

| Category | Operation unit | Instruction operation code |
|---|---|---|
| SIMD arithmetic operation instruction | A | vabshvh, vaddb, vaddh, vaddhvc, vaddhvh, vaddrhvc, vaddsb, vaddsh, vaddsrb, vaddsrh, vasubb, vcchk, vhaddh, vhaddhvh, vhsubh, vhsubhvh, vladdh, vladdhvh, vlsubh, vlsubhvh, vnegb, vnegh, vneghvh, vsaddb, vsaddh, vsgnh, vsrsubb, vsrsubh, vssubb, vssubh, vsubb, vsubh, vsubhvh, vsubsh, |

TABLE 5-continued

| Category | Operation unit | Instruction operation code |
| --- | --- | --- |
| | | vsumh, vsumh2, vsumrh2, vxaddh, vxaddhvh, vxsubh, vxsubhvh, vmaxb, vmaxh, vminb, vminh, vmovt, vsel |
| SIMD compare instruction | A | vcmpeqb, vcmpeqh, vcmpgeb, vcmpgeh, vcmpgtb, vcmpgth, vcmpleb, vcmpleh, vcmpltb, vcmplth, vcmpneb, vcmpneh, vscmpeqb, vscmpeqh, vscmpgeb, vscmpgeh, vscmpgtb, vscmpgth, vscmpleb, vscmpleh, vscmpltb, vscmplth, vscmpneb, vscmpneh |
| SIMD shift instruction1 | S1 | vaslb, vaslh, vaslvh, vasrb, vasrh, vasrvh, vlslb, vlslh, vlsrb, vlsrh, vrolb, vrolh, vrorb, vrorh |
| SIMD shift instruction2 | S2 | vasl, vaslvw, vasr, vasrvw, vlsl, vlsr |
| SIMD saturation instruction | C | vsath, vsath12, vsath8, vsath8u, vsath9 |
| Other SIMD instruction | C | vabssumb, vrndvh |
| SIMD multiply instruction | X2 | vfmulh, vfmulhr, vfmulw, vhfmulh, vhfmulhr, vhfmulw, vhmul, vlfmulh, vlfmulhr, vlfmulw, vlmul, vmul, vpfmulhww, vxfmulh, vxfmulhr, vxfmulw, vxmul |
| SIMD sum of products instruction | X2 | vfmach, vfmachr, vfmacw, vhfmach, vhfmachr, vhfmacw, vhmac, vlfmach, vlfmachr, vlfmacw, vlmac, vmac, vpfmachww, vxfmach, vxfmachr, vxfmacw, vxmac |
| SIMD difference of products instruction | X2 | vfmsuh, vfmsuw, vhfmsuh, vhfmsuw, vhmsu, vlfmsuh, vlfmsuw, vlmsu, vmsu, vxfmsuh, vxfmsuw, vxmsu |

Note that "Operation units" in the above tables refer to operation units used in the respective instructions. More specifically, "A" denotes ALU instruction, "B" branch instruction, "C" conversion instruction, "DIV" divide instruction, "DBGM" debug instruction, "M" memory access instruction, "S1" and "S2" shift instruction, and "X1" and "X2" multiply instruction.

Figure 20:
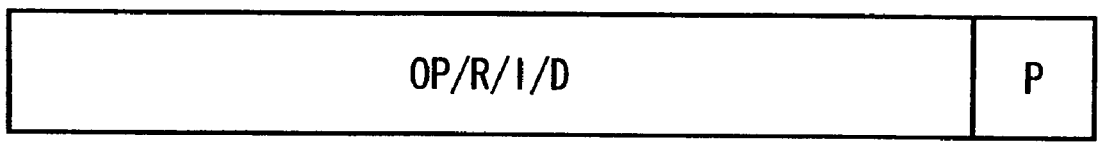
FIG. 20 is a diagram showing format of instructions executed by the processor.

FIG. 20 is a diagram showing the format of the instructions executed by the processor 1.

The following describes what acronyms stand for in the diagrams: "P" is predicate (execution condition: one of the eight condition flags C0~C7 is specified); "OP" is operation code field; "R" is register field; "I" is immediate field; and "D" is displacement field. Furthermore, predicates, which are flags for controlling whether or not an instruction is executed based on values of the condition flags C0~C7, serve as a technique that allows instructions to be selectively executed without using a branch instruction and therefore that accelerates the speed of processing.

FIGS. 21~36 are diagrams explaining outlined functionality of the instructions executed by the processor 1. More specifically, FIG. 21 explains an instruction belonging to the category "ALUadd (addition) system)"; FIG. 22 explains an instruction belonging to the category "ALUsub (subtraction) system)"; FIG. 23 explains an instruction belonging to the category "ALUlogic (logical operation) system and others"; FIG. 24 explains an instruction belonging to the category "CMP (comparison operation) system"; FIG. 25 explains an instruction belonging to the category "mul (multiplication) system"; FIG. 26 explains an instruction belonging to the category "mac (sum of products operation) system"; FIG. 27 explains an instruction belonging to the category "msu (difference of products) system"; FIG. 28 explains an instruction belonging to the category "MEMld (load from memory) system"; FIG. 29 explains an instruction belonging to the category "MEMstore (store in memory) system"; FIG. 30 explains an instruction belonging to the category "BRA (branch) system"; FIG. 31 explains an instruction belonging to the category "BSasl (arithmetic barrel shift) system and others"; FIG. 32 explains an instruction belonging to the category "BSlsr (logical barrel shift) system and others"; FIG. 33 explains an instruction belonging to the category "CNVvaln (arithmetic conversion) system"; FIG. 34 explains an instruction belonging to the category "CNV (general conversion) system"; FIG. 35 explains an instruction belonging to the category "SATvlpk (saturation processing) system"; and FIG. 36 explains an instruction belonging to the category "ETC (et cetera) system".

The following describes the meaning of each column in these diagrams: "SIMD" indicates the type of an instruction (distinction between SISD (SINGLE) and SIMD); "Size" indicates the size of individual operand to be an operation target; "Instruction" indicates the operation code of an operation; "Operand" indicates the operands of an instruction; "CFR" indicates a change in the condition flag register; "PSR" indicates a change in the processor status register; "Typical behavior" indicates the overview of a behavior; "Operation unit" indicates a operation unit to be used; and "3116" indicates the size of an instruction.

FIGS. 37~82 are diagrams explaining the detailed functionality of the instructions executed by the processor 1. Note that the meaning of each symbol used for explaining the instructions is as described in Tables 6~10 below.

TABLE 6

| Symbol | Meaning |
| --- | --- |
| $X[i]$ | Bit number i of X |
| $X[i:j]$ | Bit number j to bit number i of X |
| X:Y | Concatenated X and Y |
| $\{n\{X\}\}$ | n repetitions of X |
| sextM(X,N) | Sign-extend X from N bit width to M bit width. Default of M is 32. |

TABLE 6-continued

| Symbol | Meaning |
|---|---|
| | Default of N is all possible bit widths of X. |
| uextM(X,N) | Zero-extend X from N bit width to M bit width. Default of M is 32. Default of N is all possible bit widths of X. |
| smul(X,Y) | Signed multiplication X * Y |
| umul(X,Y) | Unsigned multiplication X * Y |
| sdiv(X,Y) | Integer part in quotient of signed division X/Y |
| smod(X,Y) | Modulo with the same sign as dividend. |
| udiv(X,Y) | Quotient of unsigned division X/Y |
| umod(X,Y) | Modulo |
| abs(X) | Absolute value |
| bseq(X,Y) | for (i=0; i<32; i++) { if (X[31−i] != Y) break; } result = i; |
| bcnt(X,Y) | S = 0; for (i=0; i<32; i++) { if (X[i] == Y) S++; } result = S; |
| max(X,Y) | result = (X > Y)? X : Y |
| min(X,Y) | result = (X < Y)? X : Y; |
| tstz(X,Y) | X & Y == 0 |
| tstn(X,Y) | X & Y != 0 |

TABLE 7

| Symbol | Meaning |
|---|---|
| Ra Ra[31:0] | Register numbered a (0 <= a <= 31) |
| Ra+1 R(a+1)[31:0] | Register numbered a+1 (0 <= a <= 30) |
| Rb Rb[31:0] | Register numbered b (0 <= b <= 31) |
| Rb+1 R(b+1)[31:0] | Register numbered b+1 (0 <= b <= 30) |
| Rc Rc[31:0] | Register numbered c (0 <= c <= 31) |
| Rc+1 R(c+1)[31:0] | Register numbered c+1Register (0 <= c <= 30) |
| Ra2 Ra2[31:0] | Register numbered a2 (0 <= a2 <= 15) |
| Ra2+1 R(a2+1)[31:0] | Register numbered a2+1 (0 <= a2 <= 14) |
| Rb2 Rb2[31:0] | Register numbered b2 (0 <= b2 <= 15) |
| Rb2+1 R(b2+1)[31:0] | Register numbered b2+1 (0 <= b2 <= 14) |
| Rc2 Rc2[31:0] | Register numbered c2 (0 <= c2 <= 15) |
| Rc2+1 R(c2+1)[31:0] | Register numbered c2+1 (0 <= c2 <= 14) |
| Ra3 Ra3[31:0] | Register numbered a3 (0 <= a3 <= 7) |
| Ra3+1 R(a3+1)[31:0] | Register numbered a3+1 (0 <= a3 <= 6) |
| Rb3 Rb3[31:0] | Register numbered b3 (0 <= b3 <= 7) |
| Rb3+1 R(b3+1)[31:0] | Register numbered b3+1 (0 <= b3 <= 6) |
| Rc3 Rc3[31:0] | Register numbered c3 (0 <= c3 <= 7) |
| Rc3+1 R(c3+1)[31:0] | Register numbered c3+1 (0 <= c3 <= 6) |
| Rx Rx[31:0] | Register numbered x (0 <= x <= 3) |

TABLE 8

| Symbol | Meaning | |
|---|---|---|
| + | Addition | |
| − | Subtraction | |
| & | Logical AND | |
| \| | Logical OR | |
| ! | Logical NOT | |
| << | Logical shift left (arithmetic shift left) | |
| >> | Arithmetic shift right | |
| >>> | Logical shift right | |
| ^ | Exclusive OR | |
| ~ | Logical NOT | |
| == | Equal | |
| != | Not equal | |
| > | Greater than | Signed(regard left-and right-part MSBs as sign) |
| >= | Greater than or equal to | Signed(regard left-and right-part MSBs as sign) |
| >(u) | Greater than | Unsigned(Not regard left-and right-part MSBs as sign) |
| >=(u) | Greater than or equal to | Unsigned(Not regard left-and right-part MSBs as sign) |
| < | Less than | Signed(regard left-and right-part MSBs as sign) |
| <= | Less than or equal to | Signed(regard left-and right-part MSBs as sign) |
| <(u) | Less than | Unsigned(Not regard left-and right-part MSBs as sign) |
| <=(u) | Less than or equal to | Unsigned(Not regard left-and right-part MSBs as sign) |

TABLE 9

| Symbol | Meaning |
|---|---|
| | D(addr) Double word data corresponding to address "addr" in Memory |
| | W(addr) Word data corresponding to address "addr" in Memory |
| | H(addr) Half data corresponding to address "addr" in Memory |
| | B(addr) Byte data corresponding to address "addr" in Memory |
| | B(addr,bus_lock) Access byte data corresponding to address "addr" in Memory, and lock used bus concurrently (unlockable bus shall not be locked) |

TABLE 9-continued

| Symbol | Meaning |
|---|---|
| B(addr,bus_unlock) | Access byte data corresponding to address "addr" in Memory, and unlock used bus concurrently (unlock shall be ignored for unlockable bus and bus which has not been locked) |
| EREG(num) | Extended register numbered "num" |
| EREG_ERR | To be 1 if error occurs when immediately previous access is made to extended register. To be 0, when there was no error. |
| <- | Write result |
| => | Synonym of instruction (translated by assembler) |
| reg#(Ra) | Register number of general-purpose register Ra(5-bit value) |
| 0x | Prefix of hexadecimal numbers |
| 0b | Prefix of binary numbers |
| tmp | Temporally variable |
| UD | Undefined value (value which is implementation-dependent value or which varies dynamically) |
| Dn | Displacement value (n is a natural value indicating the number of bits) |
| In | Immediate value (n is a natural value indicating the number of bits) |

TABLE 10

| Symbol | Meaning |
|---|---|
| ○Explanation for syntax | |
| if (condition) {<br>    Executed when condition is met;<br>} else {<br>    Executed when condition is not met;<br>} | |
| Executed when condition A is met, if (condition A);<br>* Not executed when condition A is not met | |
| for (Expression1;Expression2;Expression3) | *Same as C language |
| (Expression1)? Expression2:Expression3 | *Same as C language |
| ○Explanation for terms | |
| The following explains terms used for explanations: | |
| Integer multiplication | Multiplication defined as "smul" |
| Fixed point multiplication | Arithmetic shift left is performed after integer operation. When PSR.FXP is 0, the amount of shift is 1 bit, and when PSR.FXP is 1, 2 bits. |
| SIMD operation straight/cross/high/low/pair | Higher 16 bits and lower 16 bits of half word vector data is RH and RL, respectively. When operations performed on at Ra register and Rb register are defined as follows: |
| straight | Operation is performed between RHa and RHb |
| cross | Operation is performed between RHa and RLb, and RLa and RHb |
| high | Operation is performed between RHa and RHb, and RLa and RHb |
| low | Operation is performed between RHa and RLb, and RLa and RLb |
| pair | Operation is performed between RH and RHb, and RH and RLb |
| (RH is 32-bit data) | |

[Instruction vcchk]

Figure 37:
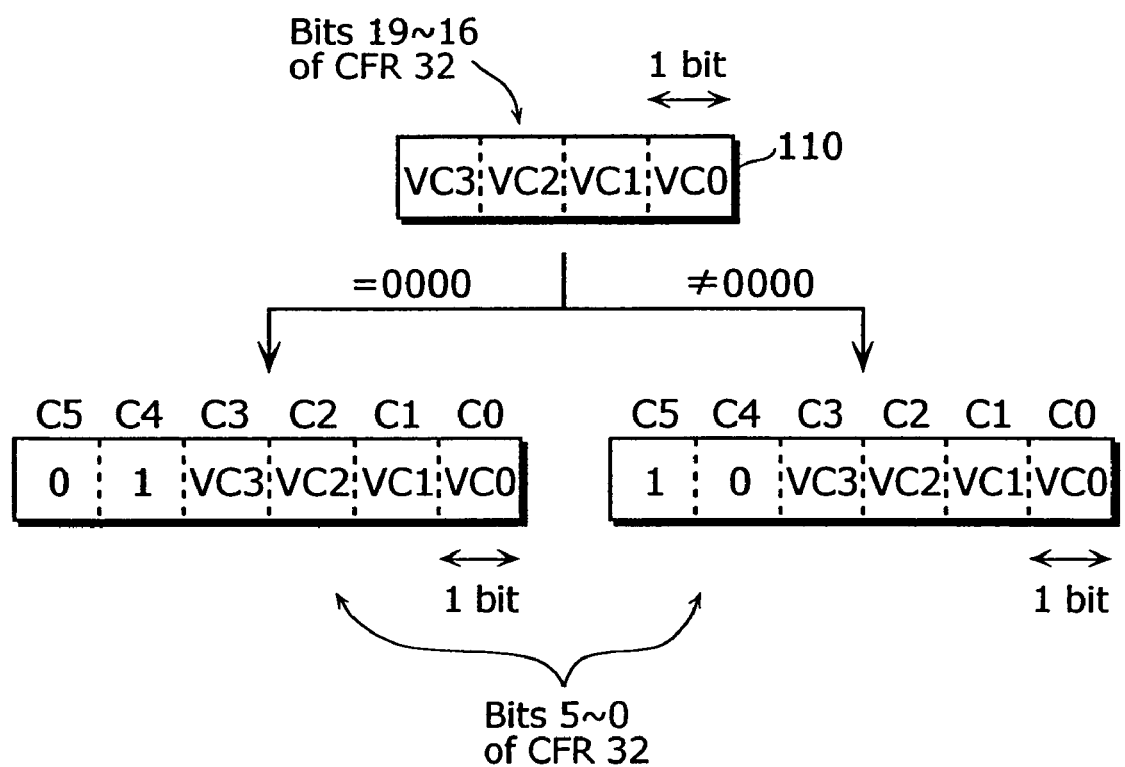
FIG. 37 is a diagram showing a behavior of the processor when executing Instruction "vcchk".

Instruction vcchk is a SIMD instruction for judging whether results of a SIMD compare instruction (e.g. vcmpCCb) are all zero or not, and setting the results to the condition flag register (CFR) 32. For example, when vcchk the processor judges, as illustrated in FIG. 37, whether the vector condition flags VC0~VC3 (110) in the condition flag register (CFR) 32 are all zero or not, and sets the condition flags C4 and C5 in the condition flag resister (CFR) 32 to 1 and 0 respectively when all of the vector condition flags VC0~VC3 (110) are zero, while setting the condition flags C4 and C5 in the condition flag resister (CFR) 32 to 0 and 1 respectively when not all the vector condition flags VC0~VC3 (110) are zero. Then, the vector condition flags VC0~VC3 are stored in the condition flags C0~C3. A detailed behavior is as shown in FIG. 38.

This instruction allows a faster extraction of results of SIMD compare instructions (especially, agreement/disagreement of results), and is effective when detecting the EOF (End Of File) of a file and other purposes.

[Instruction stbh, stbhp]

Figure 39:
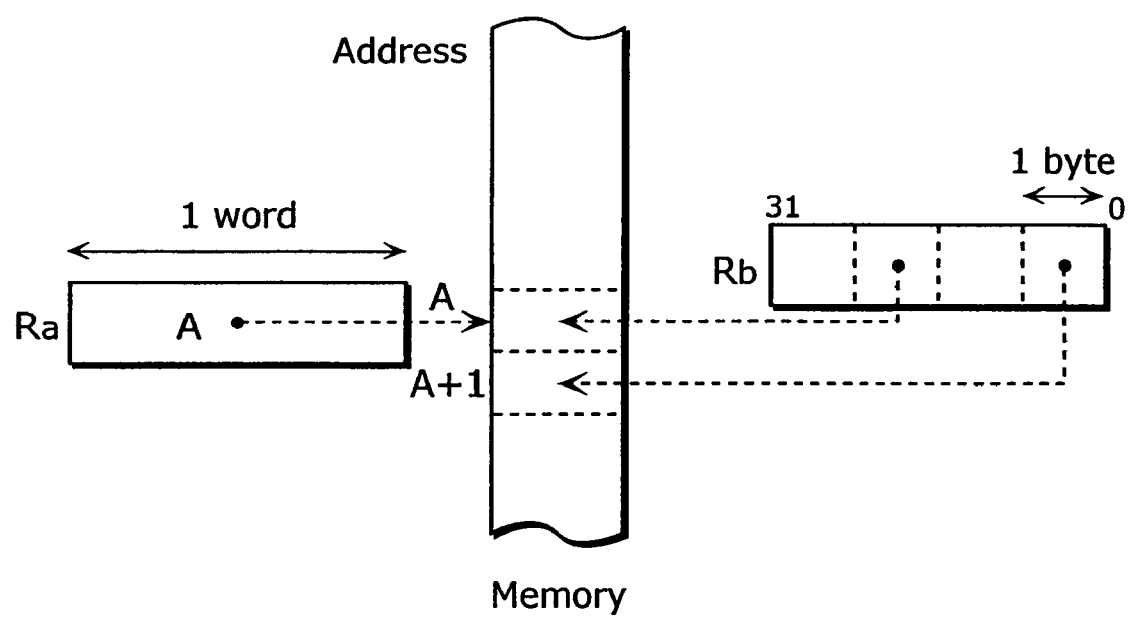
FIG. 39 is a diagram showing a behavior of the processor when executing Instruction "stbh (Ra),Rb".

Instruction stbh is an instruction for storing, into a memory and the like, two pieces of byte data stored in one register (byte data stored in the higher 16 bits and byte data stored in the lower 16 bits). This instruction is paired with Instruction Idbh (for moving data in the opposite direction). For example, when stbh (Ra), Rb the processor 1, using the I/F unit 50 and others, stores two pieces of byte data stored in the register Rb (the 16~23th bits and the 0~7th bits in the register Rb) into storage locations indicated by addresses specified by the register Ra, as illustrated in FIG. 39. A detailed behavior is as shown in FIG. 40.

Figure 41:
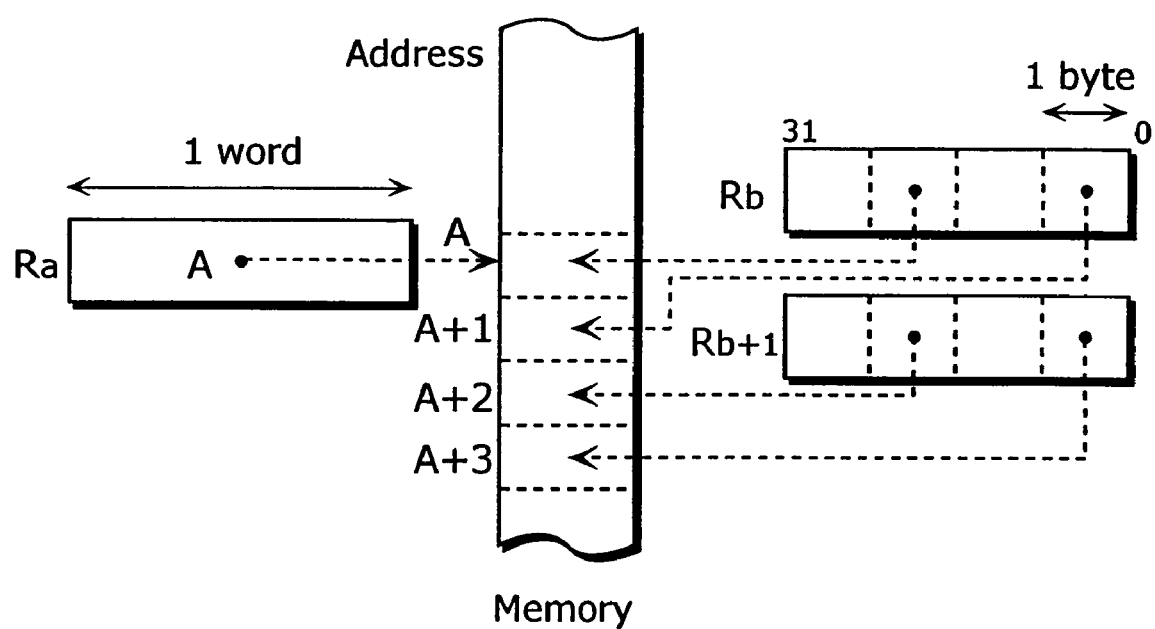
FIG. 41 is a diagram showing a behavior of the processor when executing Instruction "stbhp (Ra),Rb:Rb+1".

Instruction stbhp is an instruction for storing, into a memory and the like, four pieces of byte data stored in two registers (pair registers) (two pieces of byte data stored in the higher 16 bits of the respective registers and two pieces of byte data stored in the lower 16 bits of the respective registers). This instruction is paired with Instruction Idbhp (for moving data in the opposite direction). For example, when stbhp (Ra), Rb: Rb+1 the processor 1, using the I/F unit 50 and others, stores four pieces of byte data stored in the registers Rb and Rb+1 (the 16~23th bits and the 0~7th bits in the respective registers) into storage locations indicated by addresses specified by the register Ra, as illustrated in FIG. 41. A detailed behavior is as shown in FIG. 42.

These instructions eliminate the need for data type conversions when byte data is handled in 16-bit SIMD, leading to a faster processing speed.

[Instruction sethi]

Figure 43:
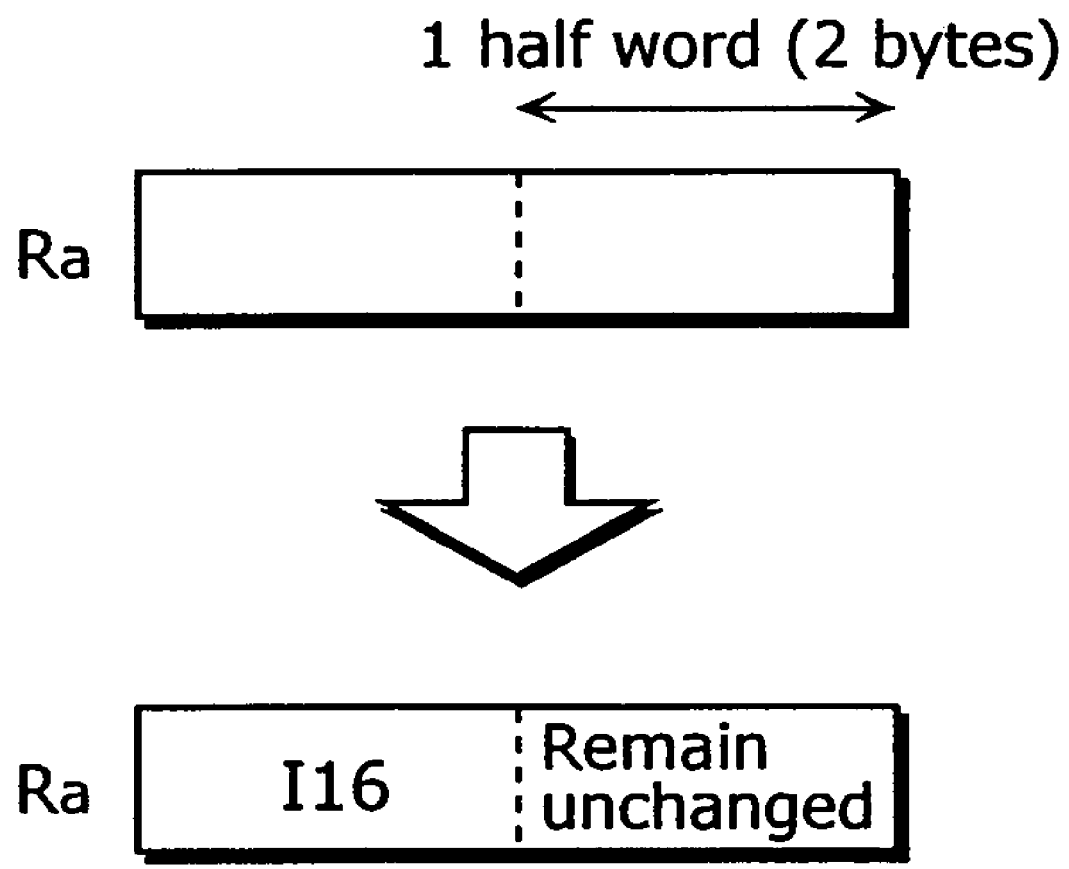
FIG. 43 is a diagram showing a behavior of the processor when executing Instruction "sethi Ra,I16".

Instruction sethi is an instruction for storing an immediate value in the higher 16 bits of a register without changing the lower 16 bits of the register. For example, when sethi Ra, I16 the processor 1 stores a 16-bit immediate value (I16) in the higher 16 bits of the register Ra, as shown in FIG. 43. When this is done, there is no change in the lower 16 bits of the register Ra. A detailed behavior is as shown in FIG. 44.

This instruction, when combined with Instruction "mov Rb, I16", makes it possible for a 32-bit immediate value to be set in a register.

[Instruction vaddhvc, vaddrhvc]

Figure 45:
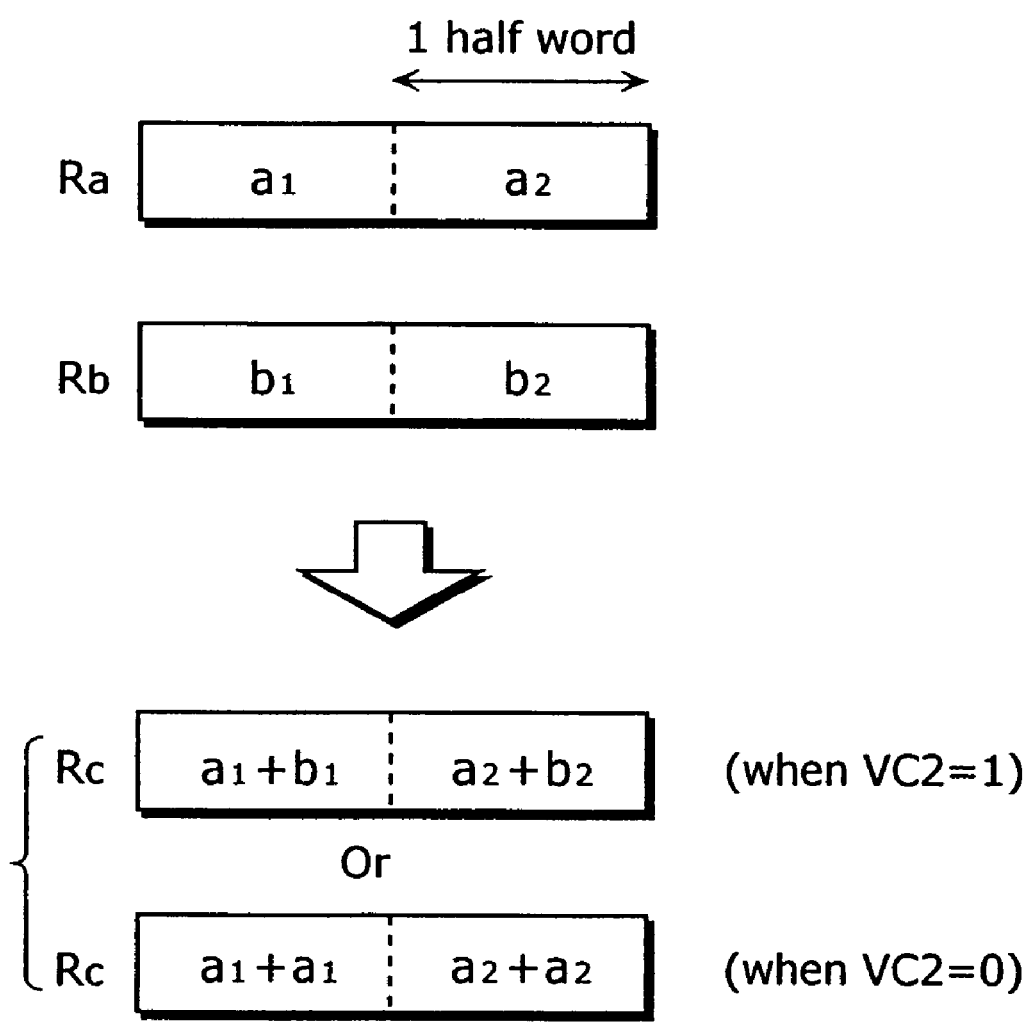
FIG. 45 is a diagram showing a behavior of the processor when executing Instruction "vaddhvc Rc,Ra,Rb".

Instruction vaddhvc is a SIMD instruction for making a switch of objects to be added, depending on the value of a vector condition flag. For example, when vaddhvc Rc, Ra, Rb the processor 1, using the operation unit 40 and others, adds the value held in the register Ra with the value held in the register Ra or Rb in the half word vector format, and stores the result into the register Rc, as shown in FIG. 45. When this is done, whether the value held in Ra or the value held in Rb is added depends on a value of the vector condition flag VC2. More specifically, when the vector condition flag VC2=1, the value held in the register Ra and the value held in the register Rb are added, and when VC2=0, the value held in the register Ra and the value held in the register Ra are added. A detailed behavior is as shown in FIG. 46.

Figure 47:
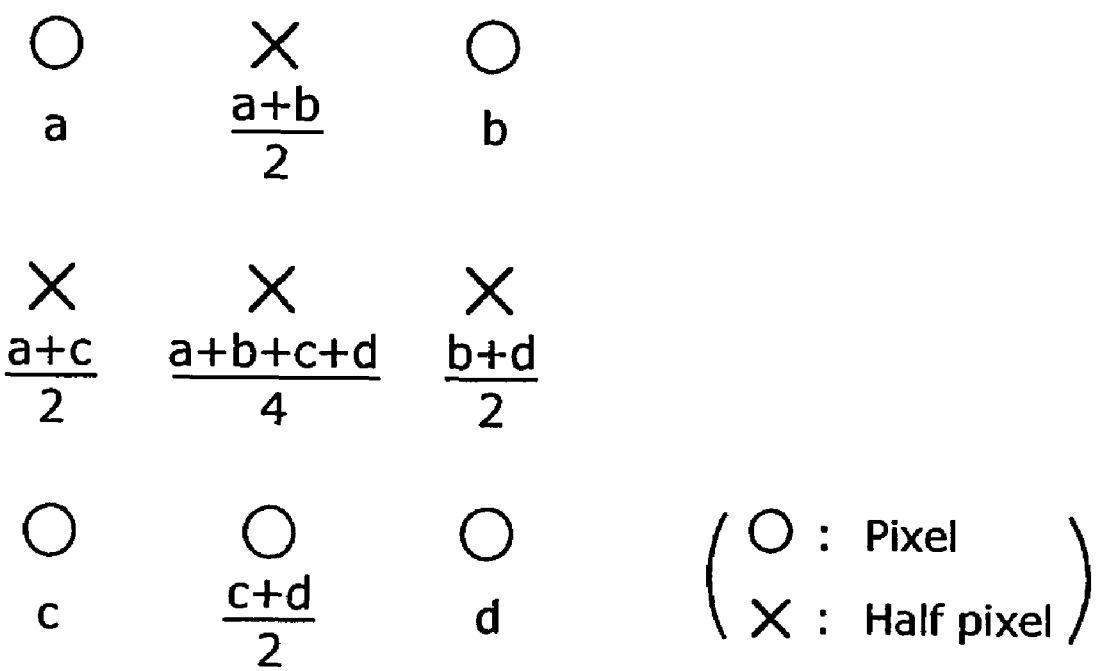
FIG. 47 is a diagram explaining motion estimation in image processing.

This instruction is effective when used for motion compensation in image processing. Since a value which resulted from dividing the value held in the addition result register Rc by 2 serves as the average value of Ra or the average value of Ra and Rb, there is an advantage that a single program can support half-pel motion compensation (motion compensation performed on a per-half-pixel basis) regardless of whether pixels are integer pixels or half pixels, as shown in FIG. 47.

Figure 48:
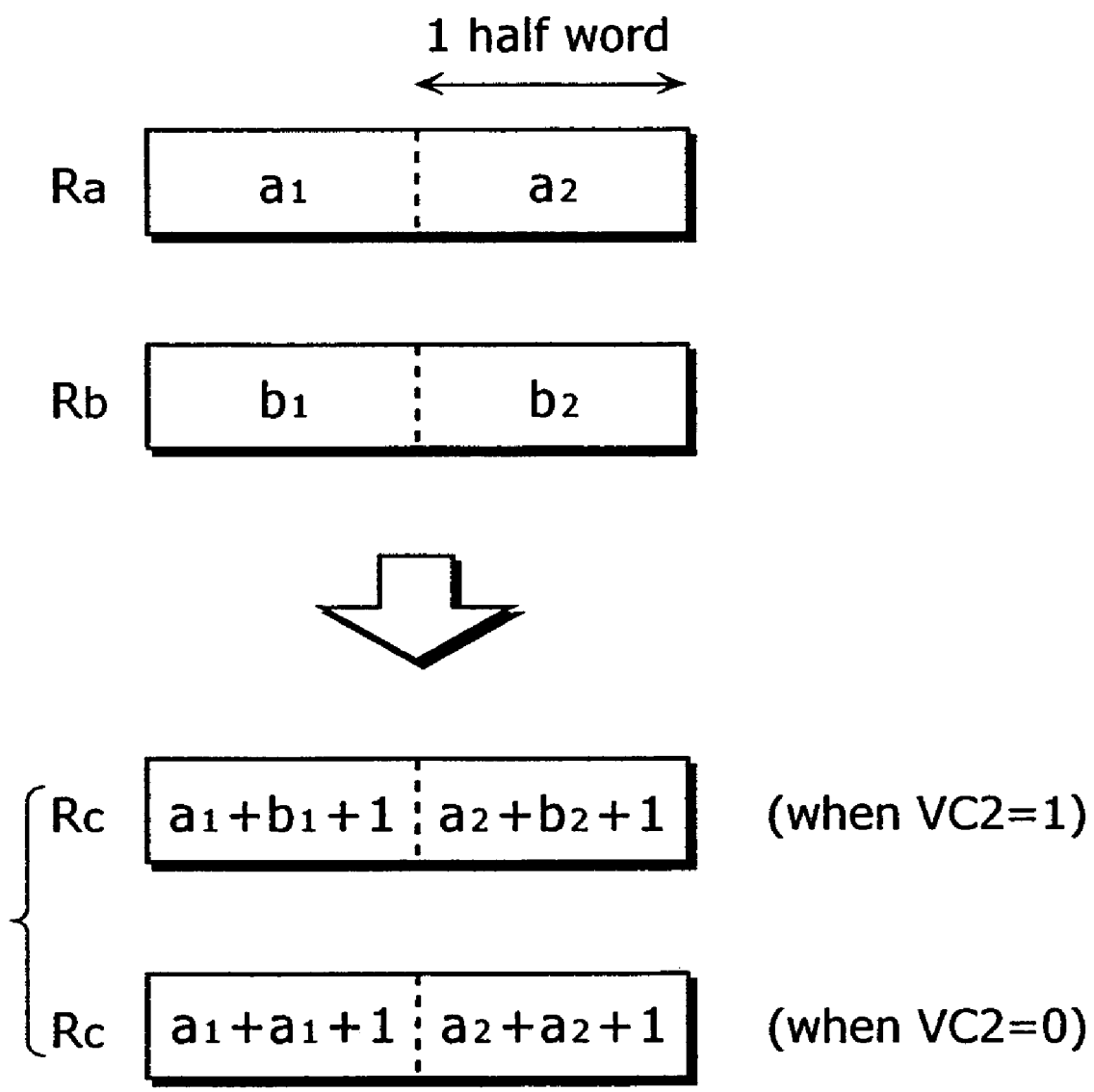
FIG. 48 is a diagram showing a behavior of the processor when executing Instruction "vaddrhvc Rc,Ra,Rb".

Meanwhile, Instruction vaddrhvc is equivalent to an instruction in which rounding is performed in addition to processing of the above-explained Instruction vaddhvc. For example, when vaddrhvc Rc, Ra, Rb the processor 1, using the arithmetic and logic/comparison operation unit 41 and others, adds the value held in the register Ra with the value held in the register Ra or Rb in the half word vector format and further adds 1 for rounding, and stores the result into the register Rc, as shown in FIG. 48. Other behavior is equivalent to that of Instruction vaddhvc. A detailed behavior is as shown in FIG. 49.

This instruction is also effective when used for motion compensation in image processing.

Note that as a functionality of each of the above instructions vaddhvc and vaddrhvc, 1-bit shift right (processing to perform a division by 2) may be added. Such functionality enables a processor to directly determine pixel values of integer pixels and half pixels.

Moreover, it may also be possible to define an instruction having functionalities of both Instruction vaddhvc and Instruction vaddrhvc. An example of such instruction is one which is capable of behaving either as Instruction vaddhvc or Instruction vaddhrvc depending on a value of a condition flag. Such an instruction allows a single program to perform processing regardless of whether rounding is performed or not.

[Instruction vsgnh]

Figure 50:
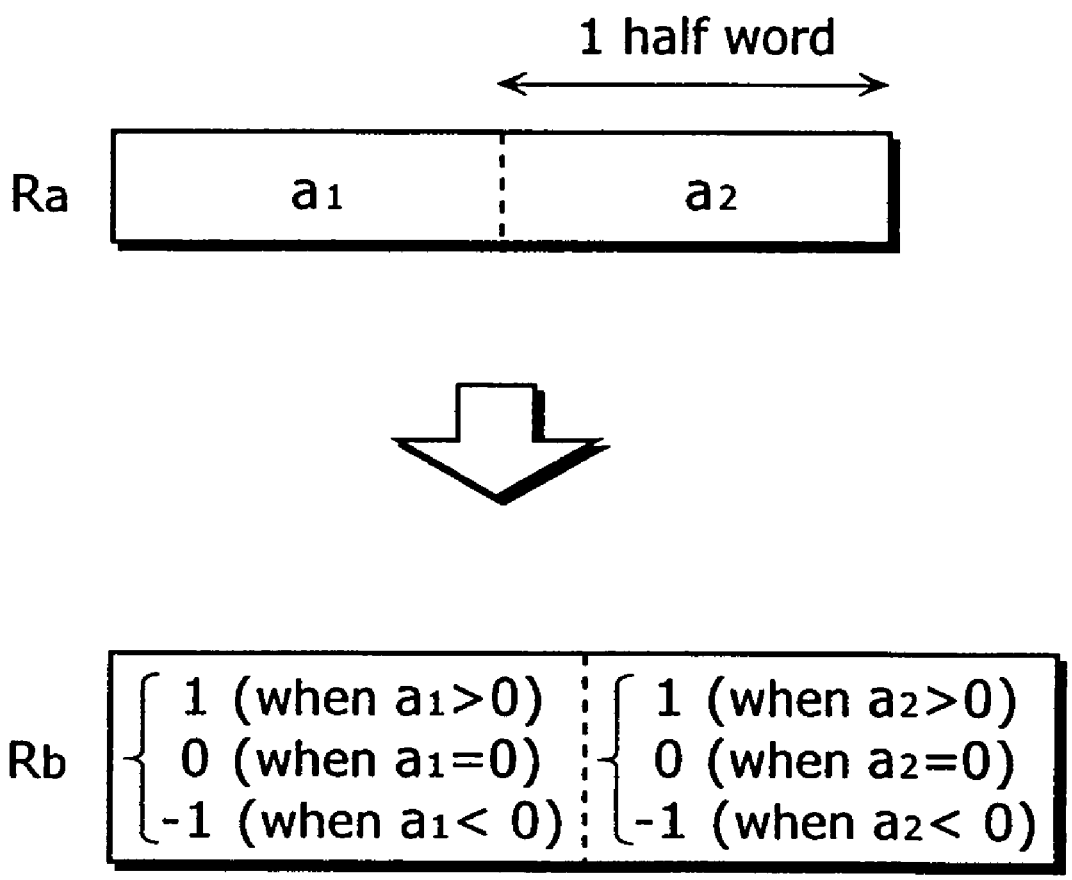
FIG. 50 is a diagram showing a behavior of the processor when executing Instruction "vsgnh Ra,Rb".

Instruction vsgnh is a SIMD instruction for generating a value depending on the sign (positive/negative) of the value held in a register and whether a value held in a register is zero or not. For example, when vsgnh Ra, Rb the processor 1 stores one of the following values into the register Rb in half word vector format, as shown in FIG. 50:(i) 1 when the value held in the register Ra is positive, (ii) −1 when the value held in the register Ra is negative, and (iii) 0 when the value held in the register Ra is 0. A detailed behavior is as shown in FIG. 51.

This instruction is effective when used for inverse quantization in image processing since 1 is outputted when a certain value is positive, −1 when negative, and 0 when 0. In the processor 1, in particular, values on which SIMD operations are difficult to be performed can be calculated at an increased speed.

[Instruction valnvc1, valnvc2, valnvc3, valnvc4]

Figure 52:
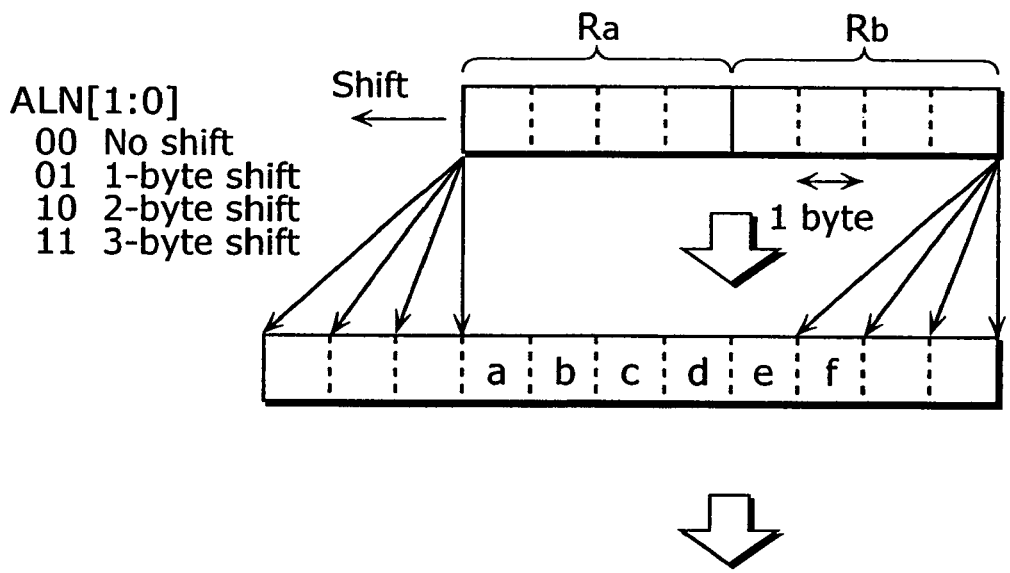
FIG. 52 is a diagram showing a behavior of the processor when executing Instruction "valnvc1 Rc,Ra,Rb".

Instruction valnvc1 is a SIMD instruction for byte-aligning data and extracting different byte data depending on a vector condition flag. For example, when valnvc1Rc, Ra, Rb the processor 1, performs byte-alignment by shifting a bit string resulted from concatenating the registers Ra and Rb according to a value indicated by Bit ALN[1:0] of the condition flag register (CFR) 32, and stores four pieces of byte data which have been extracted depending on a value of the vector condition flag VC0, as shown in FIG. 52. More specifically, the processor 1 extracts four pieces of byte data "a, a, b, and b" from byte-aligned data and stores them in the register Rc when the vector condition flag VC0=0, while extracting four pieces of byte data "a, b, b, and c" from byte-aligned data and stores them in the register Rc when the vector condition flag VC0=1. A detailed behavior is as shown in FIG. 53.

This instruction is effective when used for motion compensation in image processing. Since a value resulted from dividing the value held in the addition result register Rc by 2 on a per-half word vector basis equals to "a" and "b", or (a+b)/2 and (b+c)/2, there is an advantage that a single program can support half-pel motion compensation (motion compensation performed on a per-half-pixel basis) regardless of whether pixels are integer pixels or half pixels, as shown in FIG. 47.

Note that basic behavior of each of Instructions valnvc2, valnvc3, and valnvc4 is the same as that of the above-explained Instruction valnvc1, other than that where in byte-aligned data pieces of byte data are extracted, as shown in FIG. 52. A detailed behavior of the respective instructions is as shown in FIGS. 54, 55 and 56. Thus, these instructions are also effective when used for motion compensation in image processing.

Also note that the present invention is not limited to byte as a unit of alignment, and therefore that half word and half byte may also serve as a unit of alignment.

[Instruction addarvw]

Figure 57:
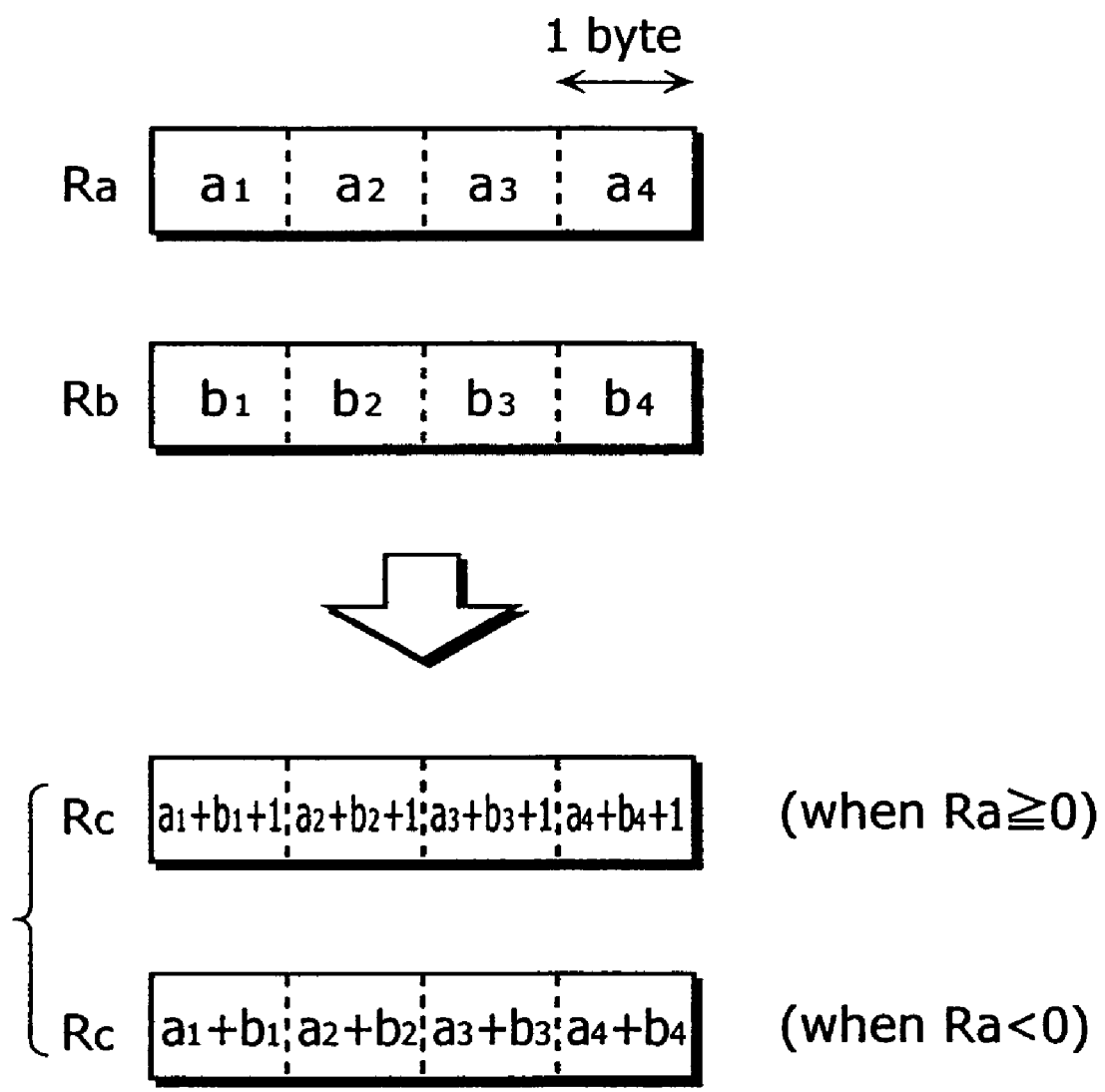
FIG. 57 is a diagram showing a behavior of the processor when executing Instruction "addarvw Rc,Rb,Ra".

Instruction addarvw is an instruction for adding two values and further adding 1 when one of such values is positive. For example, when addarvw Rc, Rb, Ra the processor 1, using the arithmetic and logic/comparison operation unit 41 and others, adds the value held in the register Ra and the value held in the register Rb, as shown in FIG. 57. When this is done, the processor 1 further adds 1 when the value held in the register Ra is positive. A detailed behavior is as shown in FIG. 58.

Figures 59, 60:
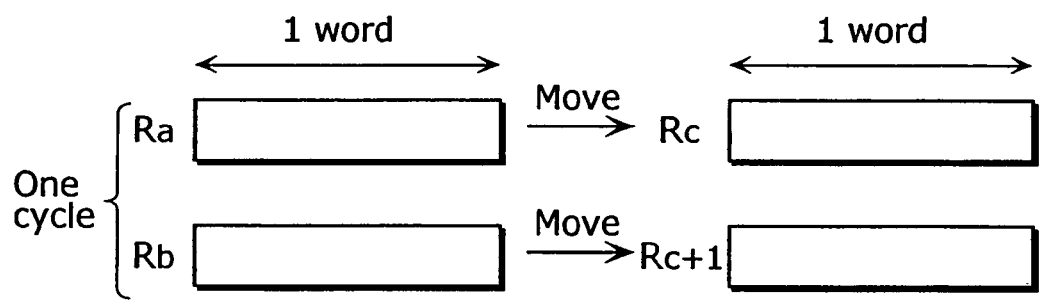
FIG. 59 is a diagram showing a behavior when performing "rounding of absolute values (away from zero)".
FIG. 60 is a diagram showing a behavior of the processor when executing Instruction "movp Rc:Rc+1,Ra,Rb".

This instruction is effective when used for "rounding of an absolute value (away from zero)". As shown in FIG. 59, a value to be rounded is stored in the register Ra, and a value resulted from filling, with 1, a bit corresponding to one lower than the bit to be rounded shall be stored in the register Rb.

When this instruction is executed after this, a result generated by rounding the absolute value of the value held in the register Ra (here, the most significant bit is a sign bit, and therefore the value held in Ra is fixed point data which has a point between the second bit and the third bit from the most significant bit) is to be stored in the register Rc. In an example illustrated in FIG. 58, by masking bits other than the higher 2 bits of the register Ra, +1 is obtained for +0.5, and −1 is obtained for −0.5, and absolute value rounding is realized. Thus, this instruction is effective when used for rounding absolute values in image processing.

[Instruction movp]

Instruction movp is an instruction for moving values held in arbitrary two registers to two consecutive registers. For example, when movp Rc: Rc+1, Ra, Rb the processor 1, using the I/F unit 50 and others, moves the value held in the register Ra to the register Rc, and moves the value held in the register Rb to the register Rc+1, as shown in FIG. 60. A detailed behavior is as shown in FIG. 61.

Since values held in independent two registers are moved in one cycle under this instruction, an effect of reducing the number of cycles in a loop can be achieved. Also, this instruction, which does not involve register renaming (destruction of a register value), is effective when data is moved between loop generations (iterations).

Note that move ("mov") is not an exclusive type of operations, and therefore unary operations (e.g. "neg") and binary operations ("add") are also in the scope of the present invention. For example, regarding an add instruction in which arbitrary two registers (R0 and R6) and two consecutive registers (R2 and R3) are specified, two add operations, i.e. "R0+R2→R2" and "R6+R3→R3" are performed in a single instruction (in one cycle).

[Instruction jloop, settar]

Instruction jloop is an instruction for performing branches and setting condition flags (predicates, here) in a loop. For example, when jloop C6, Cm, TAR, Ra the processor 1 behaves as follows, using the address management unit 10*b* and others: (i) sets 1 to the condition flag Cm; (ii) sets 0 to the condition flag C6 when the value held in the register Ra is smaller than 0; (iii) adds −1 to the value held in the register Ra and stores the result into the register Ra; and (iv) branches to an address specified by the branch register (TAR) 30*d*. When not filled with a branch instruction, the jump buffer 10*f* (branch instruction buffer) is filled with a branch target instruction. A detailed behavior is as shown in FIG. 62.

Meanwhile, Instruction settar is an instruction for storing a branch target address in the branch register (TAR) 30*d*, and setting condition flags (predicates, here). For example, when settar C6, Cm, D9 the processor 1 behaves as follows, using the address management unit 10*b* and others: (i) stores an address resulted from adding the value held in the program counter (PC) 33 and a displacement value (D9) into the branch register (TAR) 30*d*; (ii) fetches the instruction corresponding to such address and stores it in the jump buffer 10*f* (branch instruction buffer); and (iii) sets the condition flag C6 to 1 and the condition flag Cm to 0. A detailed behavior is as shown in FIG. 63.

These instructions jloop and settar, which are usually used in pairs, are effective when used for increasing a loop speed by means of PROLOG/EPILOG removal software pipelining. Note that software pipelining, which is a technique to increase a loop speed used by a compiler, allows efficient parallel execution of a plurality of instructions by converting a loop structure into a PROLOG portion, a KERNEL portion and an EPILOG portion, and by overlapping each iteration with the previous iteration and the following iteration regarding the KERNEL portion.

"PROLOG/EPILOG removal" is intended to visually remove a PROLOG portion and an EPILOG portion by using the PROLOG portion and the EPILOG portion as condition execution instructions to be performed according to predicates, as shown in FIG. 64. In PROLOG/EPILOG removal 2-stage software pipelining shown in FIG. 64, the condition flags C6 and C4 are illustrated as predicates for an EPILOG instruction (Stage 2) and a PROLOG instruction (Stage 1), respectively.

The following gives an explanation for the significance of the above Instructions jloop and settar's functionality of moving flags (setting of the condition flag Cm), in comparison with ordinary instructions jloop and settar without such functionality.

When Instruction jloop and Instruction settar according to the present embodiment are not included in an instruction set, i.e. when an instruction set includes only ordinary jloop and settar instructions, the condition flag Cm needs to be moved in the respective ordinary jloop and settar instructions in an independent manner. For this reason, the following problems occur:

(1) There is an increase in the number of flag move instructions, which are unrelated to the original functionality of a loop execution, and the performance of a processor is degraded due to PROLOG/EPILOG removal software pipelining;

(2) Dependency on data among flags grows stronger, and the performance of a processor is degraded due to data dependency among flags, locational limitations and the like; and (3) There arises the need that there shall be an inter-flag move instruction, which is not originally required to be included in an instruction set, and therefore there will be a scarcity of the bit field space of the instruction set.

For example, when the ordinary jloop and settar instructions are used in a source program written in the C language shown in FIG. 65, a compiler generates a machine language program shown in FIG. 66 by means of PROLOG/EPILOG removal software pipelining. As indicated by the loop part in such machine language program (Label L00023~Instruction jloop), 3 cycles are involved in loop execution since an instruction for setting the condition flag C4 (Instruction cmpeq) is required. Furthermore, two instructions are required for the setting and resetting of the condition flag C4, reducing the effect of PROLOG/EPILOG removal.

In contrast, when Instruction jloop and Instruction settar according to the present embodiment are included in an instruction set, a compiler generates a machine language program shown in FIG. 67. As indicated by the loop part in such machine language program (Label L00023~Instruction jloop), the setting and resetting of the condition flag C4 are conducted under Instructions jloop and settar, respectively. This reduces the need for any special instructions, allowing loop execution to complete in 2 cycles.

As is obvious from the above, Instruction "jloop C6, Cm, TAR, Ra" and Instruction "settar C6, Cm, D9" are effective for reducing the number of execution cycles in 2-stage PROLOG/EPILOG removal software pipelining.

Note that the processor 1 supports instructions which are applicable not only to 2-stage software pipelining, but also to 3-stage software pipelining: Instruction "jloop C6, C2: C4, TAR, Ra" and Instruction "settar C6, C2: C4, D9". These instructions "jloop C6, C2: C4, TAR, Ra" and "settar C6, C2: C4, D9" are equivalent to instructions in which the register Cm in the above-described 2-stage instructions "jloop C6, Cm, TAR, Ra" and "settar C6, Cm, D9" are extended to the registers C2, C3 and C4.

To put it another way, when jloop C6, C2: C4, TAR, Ra the processor 1 behaves as follows, using the address management unit 10b and others: (i) sets the condition flag C4 to 0 when the value held in the register Ra is smaller than 0; (ii) moves the value of the condition flag C3 to the condition flag C2 and moves the value of the condition flag C4 to the condition flags C3 and C6; (iii) adds −1 to the register Ra and stores the result into the register Ra; and (iv) branches to an address specified by the branch register (TAR) 30d. When not filled with a branch instruction, the jump buffer 10f (branch instruction buffer) is filled with a branch target instruction. A detailed behavior is as shown in FIG. 68.

Also, when settar C6, C2: C4, D9 the processor 1 behaves as follows, using the address management unit 10b and others: (i) stores an address resulted from adding the value held in the program counter (PC) 33 and a displacement value (D9) into the branch register (TAR) 30d; (ii) fetches the instruction corresponding to such address and stores it in the jump buffer 10f (branch instruction buffer); and (iii) sets the condition flags C4 and C6 to 1 and the condition flags C2 and C3 to 0. A detailed behavior is as shown in FIG. 69.

FIGS. 70A and 70B show the role of the condition flags in the above 3-stage instructions "jloop C6, C2: C4, TAR, Ra" and "settar C6, C2: C4, D9". As shown in FIG. 70A, in PROLOG/EPILOG removal 3-stage software pipelining, the condition flags C2, C3 and C4 are predicates intended for Stage 3, Stage 2 and Stage 1, respectively. FIG. 70B is a diagram showing how instruction execution is going on when moving flags in such a case.

FIGS. 71~73 show program examples illustrating the significance of moving flags in the above instructions "jloop C6, C2: C4, TAR, Ra" and "settar C6, C2: C4, D9". FIG. 71 shows an example of a source program, FIG. 72 shows an example of a machine language program created by using ordinary instructions jloop and settar without the functionality of moving flags, and FIG. 73 shows an example of a machine language program created by using Instruction jloop and Instruction settar according to the present embodiment that have the functionality of moving flags. As is obvious from the comparison between FIG. 72 and FIG. 73, the use of Instruction jloop and Instruction settar according to the present embodiment that have the functionality of moving flags reduces the number of instructions by five as well as the number of times a loop is executed by one cycle.

Note that the above description applies to software pipelining involving four or more stages, and the number of condition flags for predicate simply needs to be increased in such a case.

In addition to the characteristic instructions described above, the processor 1 is also capable of executing the following characteristic instructions which are not shown in FIGS. 21~36.

[Instruction vsada]

Figure 74:
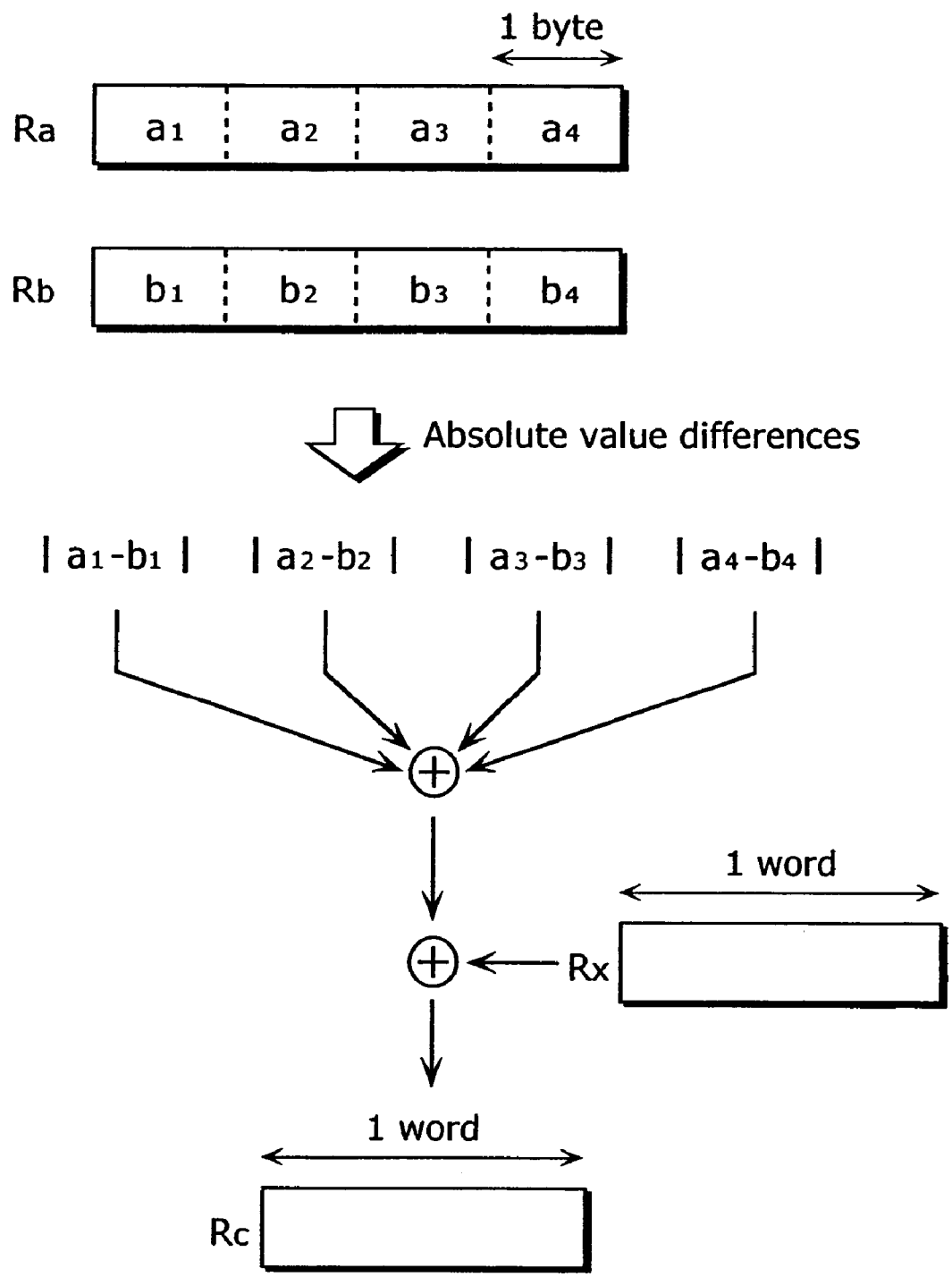
FIG. 74 is a diagram showing a behavior of the processor when executing Instruction "vsada Rc,Ra,Rb,Rx".

Instruction vsada is a SIMD instruction for determining a sum of absolute value differences. For example, when vsada Rc, Ra, Rb Rx the processor 1, using the arithmetic and logic/comparison operation unit 41 and others, performs SIMD operations for determining differences between the values held in the register Ra and the values held in the register Rb on a byte-by-byte basis (determines the difference between the respective four byte pairs), as shown in FIG. 74, determines the absolute value of each of the four results so as to add them, adds the value held in the register Rx to this addition result, and stores the final result into the register Rc. A detailed behavior is as shown in FIG. 75A.

Note that the processor 1 is also capable of executing an instruction which does not include the last operand (Rx) in the format of the above Instruction vsada. For example, when vsada Rc, Ra, Rb the processor 1, using the arithmetic and logic/comparison operation unit 41 and others, performs SIMD operations for determining differences between the values held in the register Ra and the values held in the register Rb on a byte-by-byte basis (determines the difference between the respective four byte pairs), determines the absolute value of each of the four results so as to add them, and stores the result into the register Rc. A detailed behavior is as shown in FIG. 75B.

These instructions vsada are instructions which resulted from compounding Instruction vasubb and Instruction vabssumb. Instruction vasubb is a SIMD instruction for performing subtractions on four pairs of SIMD data on a byte-by-byte basis, and storing the resulting four signs in the condition flag register. Instruction vabssumb, on the other hand, is a SIMD instruction for adding the absolute values of four pairs of SIMD data on a byte-by-byte basis according to the condition flag register, and adding this addition result to another 4-byte data.

Thus, Instruction vsada makes it possible for a sum of absolute value differences to be determined in one cycle and therefore makes the speed of operations faster, as compared with the case where Instruction vasubb and Instruction vabssumb are used in succession. Instruction vasada is effective when used for summing up absolute value differences in motion prediction as part of image processing.

Note that data does not have to be in byte, and therefore half word, half byte and other units are also in the scope of the present invention.

[Instruction satss, satsu]

Figure 76B:
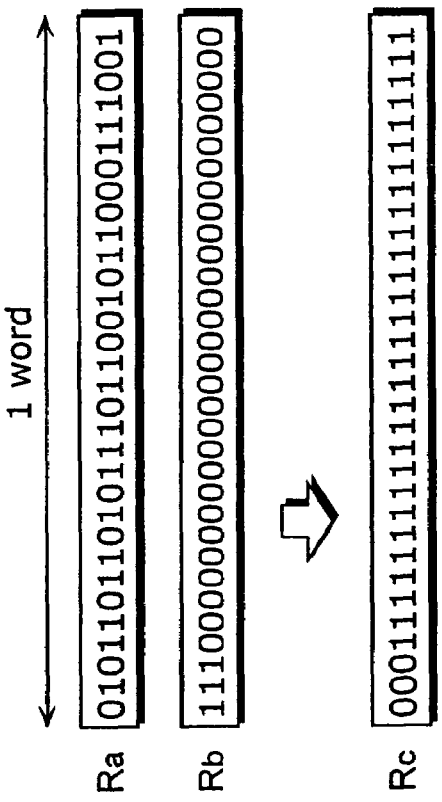
FIG. 76 is a diagram showing a behavior of the processor when executing Instruction "satss Rc,Ra,Rb".
Figure 76A:
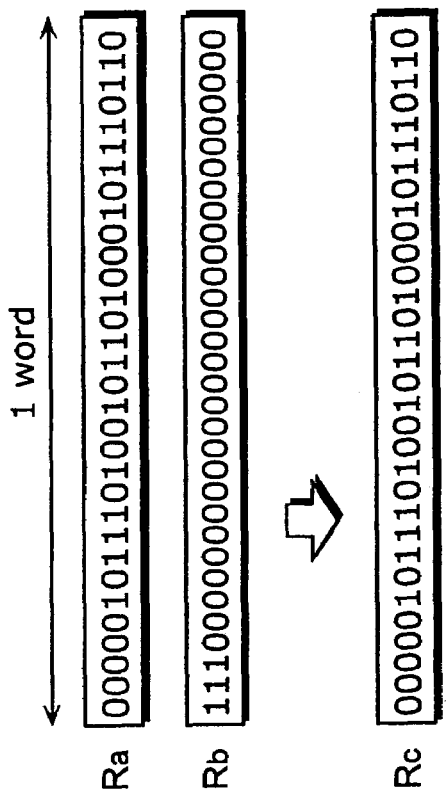

Instruction satss is an instruction for converting a signed value into a saturated signed value at an arbitrary position (digit). For example, when satss Rc, Ra, Rb the processor 1, using the saturation block (SAT) 47a and others, stores, into the register Rc, a saturated value (complement on 1 of the register Rb) specified by the register Rb when the value held in the register Ra is larger than such saturated value, and stores the value held in the register Ra into the register Rc when the value held in the register Ra is equal to or smaller than the saturated value, as illustrated in FIG. 76. A detailed behavior is as shown in FIG. 77A.

Meanwhile, Instruction satsu is an instruction for converting an unsigned value into a saturated signed value at an arbitrary position (digit). For example, when satsu Rc, Ra, Rb the processor 1, using the saturation block (SAT) 47*a* and others, stores a saturated value specified by the register Rb into the register Rc when the value held in the register Ra is larger than such saturated value, and stores the value held in the register Ra into the register Rc when the value held in the register Ra is equal to or smaller than the saturated value. A detailed behavior is as shown in FIG. 77B.

The above Instruction satss and Instruction satsu allow saturation processing to be performed at an arbitrary position. This facilitates programming since there is no need for setting a position where saturation is performed to a specific position at the time of assembler programming.

[Instruction bytesel]

Figure 78:
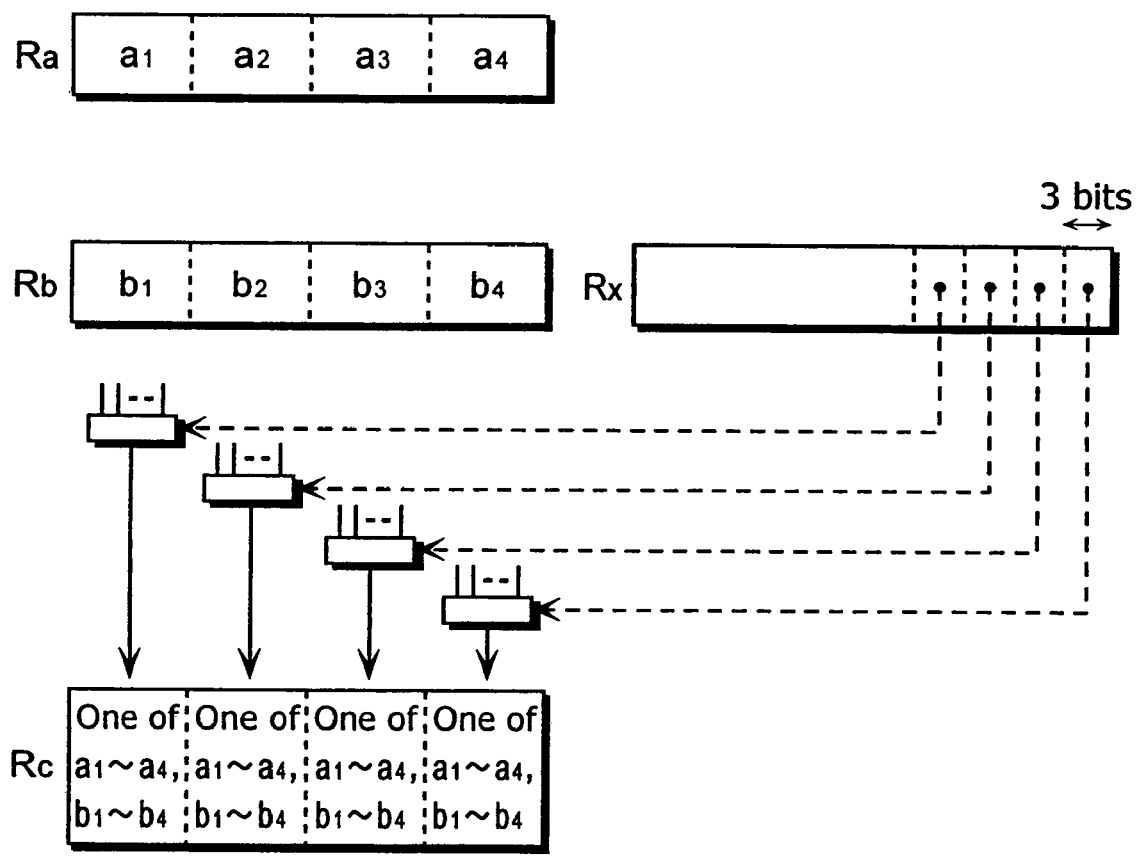
FIG. 78 is a diagram showing a behavior of the processor when executing Instruction "bytesel Rc,Ra,Rb,Rx".

Instruction bytesel is an instruction for selecting one of the values held in two registers on a byte-by-byte basis. For example, when bytesel Rc, Ra, Rb, Rx the processor 1, using the operation unit 40 and others, stores one of eight pieces of byte data held in the register Ra and the register Rb into the register Rc, on the basis of a value indicated by the register Rx, as illustrated in FIG. 78. This behavior is performed on four pieces of bytes in the register Rc in parallel. A detailed behavior is shown in FIG. 79A, and a relationship between the register Rx and byte data to be selected is shown in FIG. 79B.

Note that the processor 1 behaves in an equivalent manner also for Instruction bytesel in the following format: when bytesel Rc, Ra, Rb, I12 the processor 1, using the operation unit 40 and others, stores one of eight pieces of byte data held in the register Ra and the register Rb into the register Rc, on the basis of a 12-bit immediate value. This behavior is performed on four pieces of bytes in the register Rc in parallel. A detailed behavior is shown in FIG. 79C, and a relationship between an immediate value I12 and byte data to be selected is shown in FIG. 79D.

Instruction bytesel allows byte data to be stored at an arbitrary position in a register, and therefore makes repetitions of data reshuffling faster. Moreover, this instruction has an effect of increasing the flexibility of SIMD operations.

Note that whether the above byte data is to be stored or not in each of Rc[31:24], Rc[23:16], Rc[15:8], and Rc[7:0] may be specifiable in Instruction "bytesel Rc, Ra, Rb, Rx" explained above, utilizing an empty digit or the like in the register Rx. This allows a byte-by-byte basis selection of whether the value held in the register Rc is to be updated or not.

Note that data does not have to be in byte, and therefore half word, half byte and other units are also in the scope of the present invention.

[Instructions for Extending Results of SIMD Operations]

The processor 1 is also capable of executing SIMD operation-related complementary processing, in addition to the above-explained instructions.

Figure 80A:
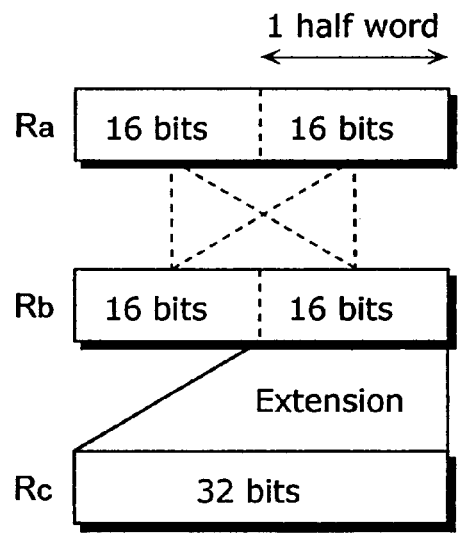
FIGS. 80A and 80B are diagrams showing a part of SIMD operation results being performed of bit extension (sign-extension or zero-extension).
Figure 80B:
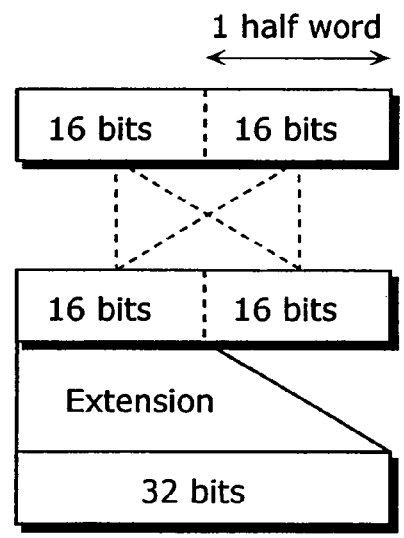

For example, the processor 1, when a certain instruction is issued, performs complementary processing for extending a part of results of SIMD operations (sign extension or zero extension), as illustrated in FIGS. 80A and 80B, which show the processor 1 performing SIMD operations on data at the same positions in respective registers (to be referred to also as "straight positions" hereinafter) or on data at diagonally crossed positions, on a per-half word basis. FIG. 80A illustrates processing for extending the lower half word of a required result to a word, and FIG. 80B illustrates processing for extending the higher half word of a required result to a word.

Note that Instruction vaddh is an example instruction for performing SIMD operations on data at straight positions on a per-half word basis, while Instruction vxaddh is an example instruction for performing SIMD operations on data at diagonally crossed positions on a per-half word basis.

Figure 81:
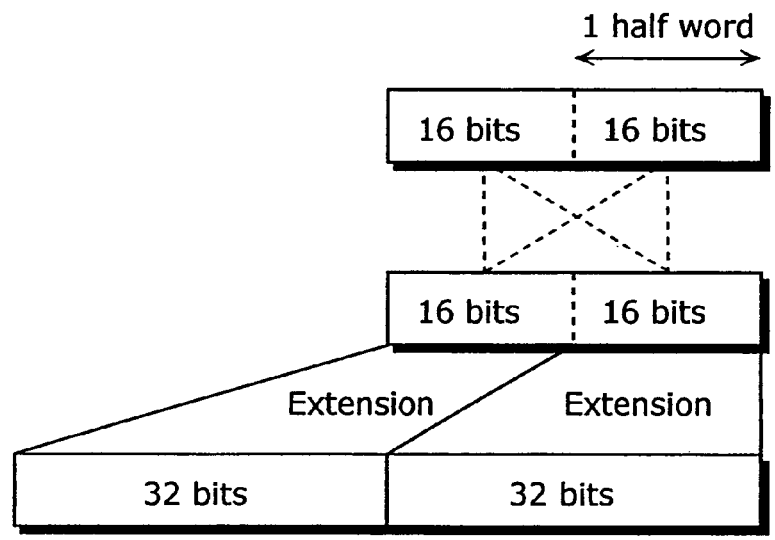
FIG. 81 is a diagram showing all of SIMD operation results being performed of bit-extension.

Also note that the processor 1, when a certain instruction is issued, performs complementary processing for extending all results of SIMD operations, as illustrated in FIG. 81. FIG. 81 illustrates the processor 1 performing SIMD operations on pieces of data stored at straight positions or diagonally crossed positions in two registers on a per-half word basis, as well as extending each of resulting two half words to a word.

Such an instruction for extending results of SIMD operation as above is effective when making data size all the same by performing sign extension or zero extension after performing the SIMD operations, enabling SIMD operations and extension processing to be performed in one cycle.

Figure 82:
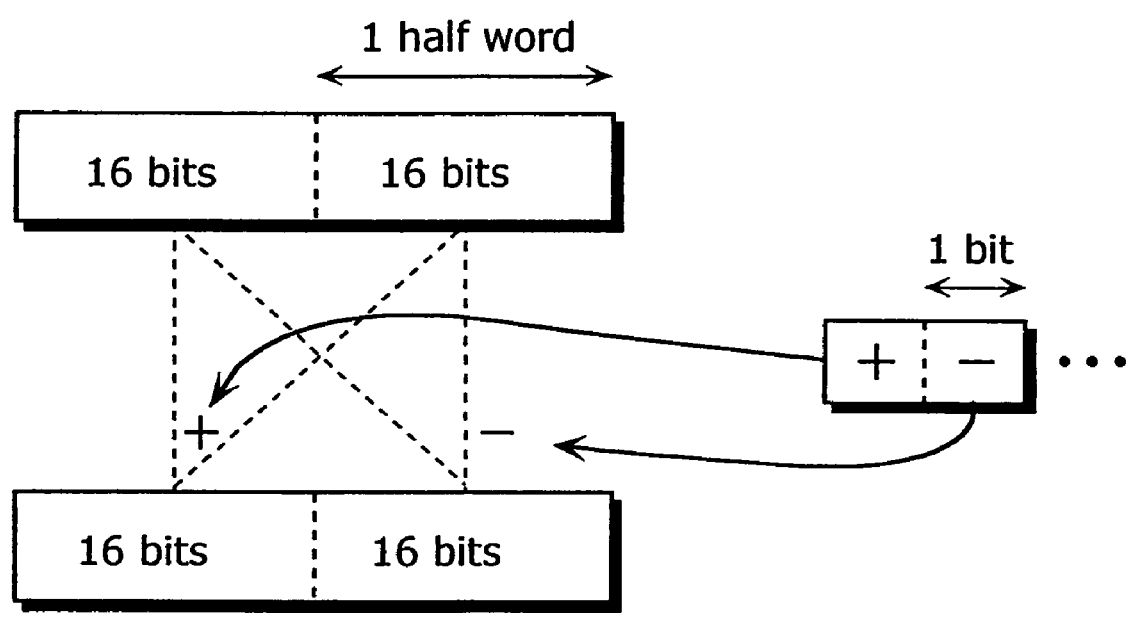
FIG. 82 is a diagram showing a SIMD operation specified by condition flags and the like being performed.

Furthermore, the processor 1 is also capable of executing SIMD operations specified by condition flags and the like, as SIMD operation-related complementary instructions. For example, the processor 1, when condition flags specify that the first and the second operations should be "addition" and "subtraction" respectively, performs additions and subtractions on each of data pairs in two registers at straight positions or diagonally crossed positions on a per-half word basis, as illustrated in FIG. 82.

For example, when the condition flags C0 and C1 are "1 and 0", the processor 1 behaves as follows, using the arithmetic and logic/comparison operation unit 41 and others:

(1) adds the higher half word of the register Ra with the higher half word of the register Rb, and stores this addition result into the higher half word of the register Rc; and, (2) subtracts the lower half word of the register Rb from the lower half word of the register Ra, and stores this subtraction result into the lower half word of the register Rc.

Such an instruction in which types of SIMD operations are specifiable is effective for processing in which types of operations to be performed are not fixed, and therefore in which an operation shall be determined depending on a result of other processing.

Note that present invention is applicable to a case where the register Rb is not used in the above operations (1) and (2). For example, the processor 1 may:

(1) add the higher half word of the register Ra with the lower half word of the register Ra, and store this addition result into the higher half word of the register Rc; and (2) subtract the lower half word of the register Ra from the higher half word of the register Ra, and store this subtraction result into the lower half word of the register Rc.

What is claimed is:

1. A processor for decoding and executing instructions, comprising:

a decoding unit configured to decode an instruction; and an execution unit configured to execute the instruction based on a result of the decoding performed by the decoding unit, wherein the execution unit, when the decoding unit decodes an add instruction including operands specifying first data and second data, generates (i) a result obtained by adding the first data, the second data, and 1 when the first data is zero or positive, and (ii) a result obtained by adding the first data and the second data when the first data is negative, wherein the first data is an object of rounding away from zero, and wherein the second data specifies a digit in the first data to be an object of rounding away from zero.

2. The processor according to claim 1,
wherein the second data is a value in which at least one digit lower than the digit in the first data to be an object of rounding away from zero is 1 and other digits in the first data are 0.

* * * * *